US012592007B2

(12) United States Patent
Lindholm

(10) Patent No.: US 12,592,007 B2
(45) Date of Patent: Mar. 31, 2026

(54) LYRICS AND KARAOKE USER INTERFACES, METHODS AND SYSTEMS

(71) Applicant: Apple Inc., Cupertino, CA (US)

(72) Inventor: Erik Lindholm, Stockholm (SE)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 18/528,712

(22) Filed: Dec. 4, 2023

(65) Prior Publication Data

US 2024/0185481 A1 Jun. 6, 2024

Related U.S. Application Data

(60) Provisional application No. 63/506,118, filed on Jun. 4, 2023, provisional application No. 63/385,988, filed on Dec. 4, 2022.

(51) Int. Cl.
| | |
|---|---|
| *G06F 3/0481* | (2022.01) |
| *G06F 3/0485* | (2022.01) |
| *G06T 11/00* | (2006.01) |
| *G06T 11/60* | (2006.01) |
| *G06T 13/00* | (2011.01) |
| *G06F 3/16* | (2006.01) |

(52) U.S. Cl.
CPC .......... *G06T 11/001* (2013.01); *G06F 3/0481* (2013.01); *G06F 3/0485* (2013.01); *G06T 11/60* (2013.01); *G06T 13/00* (2013.01); *G06F 3/167* (2013.01); *G06T 2200/24* (2013.01)

(58) Field of Classification Search
CPC ... G06T 11/001; G06T 11/60; G06T 2200/24; G06F 3/0481; G06F 3/0485; G06F 3/167
See application file for complete search history.

(56) References Cited

U.S. PATENT DOCUMENTS

| | | | |
|---|---|---|---|
| 5,613,909 | A | 3/1997 | Stelovsky |
| 6,323,846 | B1 | 11/2001 | Westerman et al. |
| 6,357,042 | B2 | 3/2002 | Srinivasan et al. |
| 6,570,557 | B1 | 5/2003 | Westerman et al. |
| 6,677,932 | B1 | 1/2004 | Westerman |
| 7,614,008 | B2 | 11/2009 | Ording |

(Continued)

FOREIGN PATENT DOCUMENTS

| | | |
|---|---|---|
| CN | 102014081 A | 4/2011 |
| CN | 103593142 A | 2/2014 |

(Continued)

OTHER PUBLICATIONS

Stackexchange et al., Presenting lyrics for two singers, https://music. stackexchange.com/questions/39521/presenting lyrics for two singers, Nov. 19, 2015, pp. 1/5 (Year: 2015).*

(Continued)

*Primary Examiner* — Tam T Tran
(74) *Attorney, Agent, or Firm* — Kubota & Basol LLP

(57) ABSTRACT

In some embodiments, an electronic device changes a value of a first visual characteristic with which lyrics are displayed in response to detecting a change in a performer of lyrics associated with a song or other type of content item. In some embodiments, an electronic device displays a vocal attenuation control element and changes a vocal volume (e.g., a volume of vocals) of a content item, such as a song, in response to input directed to the vocal attenuation control element.

63 Claims, 27 Drawing Sheets

700

(56) References Cited

U.S. PATENT DOCUMENTS

| | | |
|---|---|---|
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,689,920 B2 | 3/2010 | Robbin et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,199,160 B2 | 6/2012 | Hauke |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,433,431 B1 | 4/2013 | Master et al. |
| 8,479,122 B2 | 7/2013 | Hotelling et al. |
| 8,601,372 B1 | 12/2013 | Gentile et al. |
| 9,002,410 B2 | 4/2015 | Tsui et al. |
| 9,176,658 B1 | 11/2015 | Latin-Stoermer et al. |
| 9,280,905 B2 | 3/2016 | Campiranon et al. |
| 9,348,458 B2 | 5/2016 | Hotelling et al. |
| 9,472,113 B1 * | 10/2016 | Hwang .................. G09B 5/062 |
| 9,933,937 B2 | 4/2018 | Lemay et al. |
| 9,977,584 B2 | 5/2018 | Latin-stoermer et al. |
| 10,678,427 B2 | 6/2020 | Xu |
| 11,777,881 B2 | 10/2023 | Reese et al. |
| 2002/0015024 A1 | 2/2002 | Westerman et al. |
| 2004/0205334 A1 | 10/2004 | Rennels |
| 2004/0266337 A1 | 12/2004 | Radcliffe et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2007/0204288 A1 | 8/2007 | Candelore |
| 2008/0163283 A1 | 7/2008 | Tan et al. |
| 2008/0184870 A1 | 8/2008 | Toivola |
| 2009/0083281 A1 | 3/2009 | Sarig et al. |
| 2009/0153288 A1 | 6/2009 | Hope et al. |
| 2009/0177966 A1 | 7/2009 | Chaudhri |
| 2009/0228544 A1 | 9/2009 | Demers et al. |
| 2010/0251121 A1 | 9/2010 | Rosser et al. |
| 2010/0293464 A1 * | 11/2010 | Harada .................. G10H 1/361 715/716 |
| 2011/0137920 A1 | 6/2011 | Cohen et al. |
| 2011/0276333 A1 | 11/2011 | Wang et al. |
| 2012/0033948 A1 | 2/2012 | Rodriguez et al. |
| 2012/0047437 A1 | 2/2012 | Chan |
| 2012/0079384 A1 | 3/2012 | Chuang |
| 2012/0221975 A1 | 8/2012 | Juristovski et al. |
| 2012/0304111 A1 | 11/2012 | Queru |
| 2013/0132904 A1 | 5/2013 | Primiani et al. |
| 2013/0269019 A1 | 10/2013 | Garmark et al. |
| 2013/0275506 A1 | 10/2013 | Warner |
| 2013/0297697 A1 | 11/2013 | Haimovitch et al. |
| 2015/0339787 A1 | 11/2015 | Evans |
| 2016/0011761 A1 | 1/2016 | Latin-stoermer et al. |
| 2016/0255025 A1 | 9/2016 | Valverde et al. |
| 2017/0068402 A1 | 3/2017 | Lochhead et al. |
| 2017/0083214 A1 | 3/2017 | FuresjÖ et al. |
| 2017/0093943 A1 | 3/2017 | Alsina et al. |
| 2017/0357421 A1 | 12/2017 | Dye et al. |
| 2018/0088896 A1 | 3/2018 | Olson |
| 2018/0309636 A1 | 10/2018 | Strom et al. |
| 2018/0366097 A1 | 12/2018 | Sharp |
| 2019/0034075 A1 | 1/2019 | Smochko et al. |
| 2019/0087082 A1 | 3/2019 | Chaudhri et al. |
| 2019/0172166 A1 | 6/2019 | Evans |
| 2019/0355337 A1 | 11/2019 | Steinwedel et al. |
| 2020/0204868 A1 | 6/2020 | Peng et al. |
| 2020/0356221 A1 | 11/2020 | Behzadi et al. |
| 2020/0356593 A1 | 11/2020 | Azzinnari et al. |
| 2020/0379715 A1 | 12/2020 | Won et al. |
| 2021/0055905 A1 | 2/2021 | Moldover et al. |
| 2022/0247703 A1 | 8/2022 | Deva et al. |
| 2022/0248187 A1 | 8/2022 | Reese et al. |
| 2023/0305799 A1 | 9/2023 | Lindholm et al. |
| 2025/0244865 A1 | 7/2025 | Schoberl et al. |

FOREIGN PATENT DOCUMENTS

| | | |
|---|---|---|
| EP | 2533548 A1 | 12/2012 |
| EP | 3179354 A1 | 6/2017 |
| EP | 3367257 A1 | 8/2018 |
| JP | 2004302232 A | 10/2004 |
| JP | 2005234121 A | 9/2005 |
| JP | 2012159575 A | 8/2012 |
| JP | 2013045131 A | 3/2013 |
| KR | 20150054375 A | 5/2015 |
| WO | 2013/169849 A2 | 11/2013 |
| WO | 2014/105276 A1 | 7/2014 |
| WO | 2020023376 A1 | 1/2020 |

OTHER PUBLICATIONS

Min-Yen Kan et al., LyricAlly: Automatic Synchronization of Textual Lyrics to Acoustic Music Signals, Feb. 1, 2008, IEEE Transactions On Audio—Speech—and Language Processing, vol. 16, No. 2, pp. 338-349 (Year: 2008).*

Hiromasa Fujihara et al., LyricSynchronizer: Automatic Synchronization System Between Musical Audio Signals and Lyrics, Oct. 1, 2011, IEEE Journal Of Selected Topics in Signal Processing, vol. 5, No. 6, pp. 1252-1261 (Year: 2011).*

International Search Report received for PCT Patent Application No. PCT/US2023/082395, mailed on Jun. 6, 2024, 7 pages.

Notice of Allowance received for U.S. Appl. No. 18/319,939, mailed on May 16, 2025, 8 pages.

European Search Report received for European Patent Application No. 20746437.1, mailed on Feb. 16, 2024, 5 pages.

Examiner's Answer to Appeal Brief received for U.S. Appl. No. 16/584,715, mailed on Apr. 29, 2022, 33 pages.

Final Office Action received for U.S. Appl. No. 16/584,715, mailed on Jun. 8, 2020, 25 pages.

Final Office Action received for U.S. Appl. No. 16/584,715, mailed on May 17, 2021, 30 pages.

Final Office Action received for U.S. Appl. No. 18/319,939, mailed on Nov. 1, 2024, 12 pages.

International Search Report received for PCT Patent Application No. PCT/US2020/035465, mailed on Nov. 2, 2020, 6 pages.

International Search Report received for PCT Patent Application No. PCT/US2022/014451, mailed on Apr. 8, 2022, 3 pages.

Looking ahead in the YouTube Player, YouTube Official Blog, Mar. 6, 2012, 5 pages.

Non-Final Office Action received for U.S. Appl. No. 16/584,715, mailed on Feb. 24, 2020, 25 pages.

Non-Final Office Action received for U.S. Appl. No. 16/584,715, mailed on Nov. 24, 2020, 26 pages.

Non-Final Office Action received for U.S. Appl. No. 18/319,939, mailed on May 3, 2024, 13 pages.

Notice of Allowance received for U.S. Appl. No. 16/584,715, mailed on Feb. 7, 2023, 10 pages.

Notice of Allowance received for U.S. Appl. No. 17/587,965, mailed on Jan. 26, 2023, 9 pages.

Notice of Allowance received for U.S. Appl. No. 17/587,965, mailed on Jun. 1, 2023, 10 pages.

Notice of Allowance received for U.S. Appl. No. 17/657,311, mailed on Feb. 21, 2023, 9 pages.

Notice of Allowance received for U.S. Appl. No. 18/319,939, mailed on Jan. 27, 2025, 8 pages.

Patent Board Decision received for U.S. Appl. No. 16/584,715, mailed on Nov. 14, 2022, 11 pages.

Search Report received for Chinese Patent Application No. 202111665846.3, mailed on Nov. 1, 2024, 5 pages (2 pages of English Translation and 3 pages of Official Copy).

Anonymous, "Create Song with Duets", Jun. 19, 2021 [online], Retrieved from <https://www.powerkaraoke.com/help/karaokecdgcreator/_hm_print_window.htm?creat_song_with_duets.html>, [retrieved on Mar. 12, 2024], 5 pages.

Anonymous, "Duet Settings", Jun. 19, 2021 [online], Retrieved from <https://www.powerkaraoke.com/help/karaokecdgcreator/_hm_print_window.htm?duet_settings.html>, [retrieved on Mar. 12, 2024], 1 page.

(56) References Cited

OTHER PUBLICATIONS

Anonymous, "Formatting—How to Display a Duet in Lyrics?—Writing Stack Exchange", Aug. 9, 2019 [online], Retrieved from <https://writing.stackexchange.com/questions/47218/how-to-display-a-duet-in-lyrics>, [retrieved on Mar. 12, 2024], 6 pages.

* cited by examiner

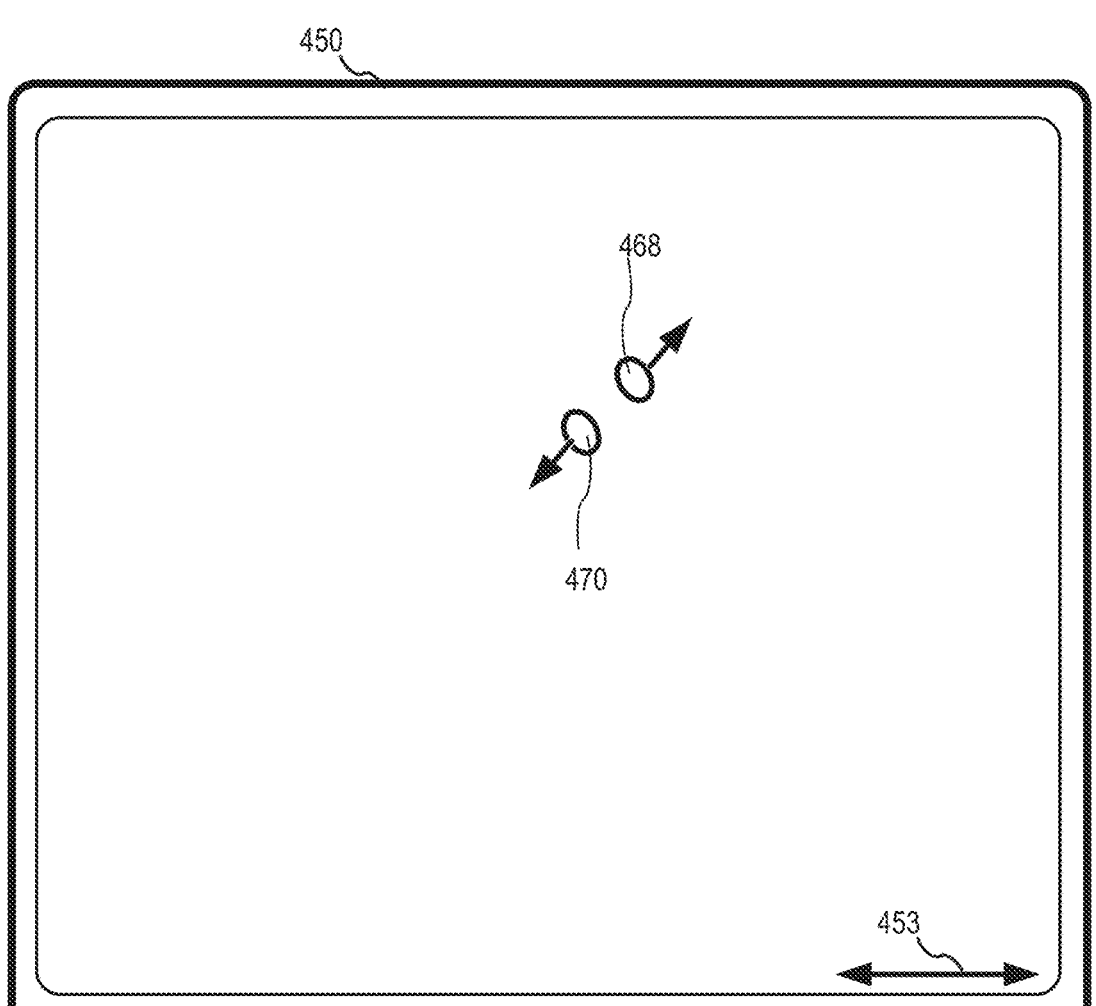
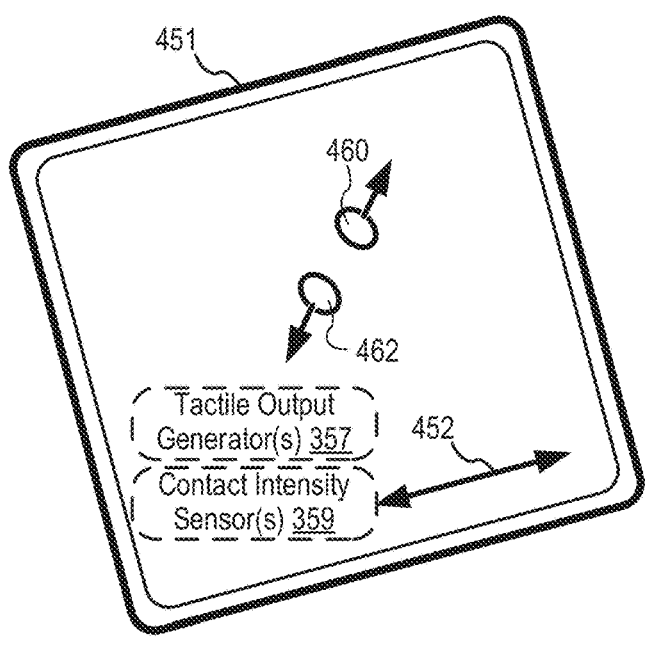
*FIG. 4B*

700

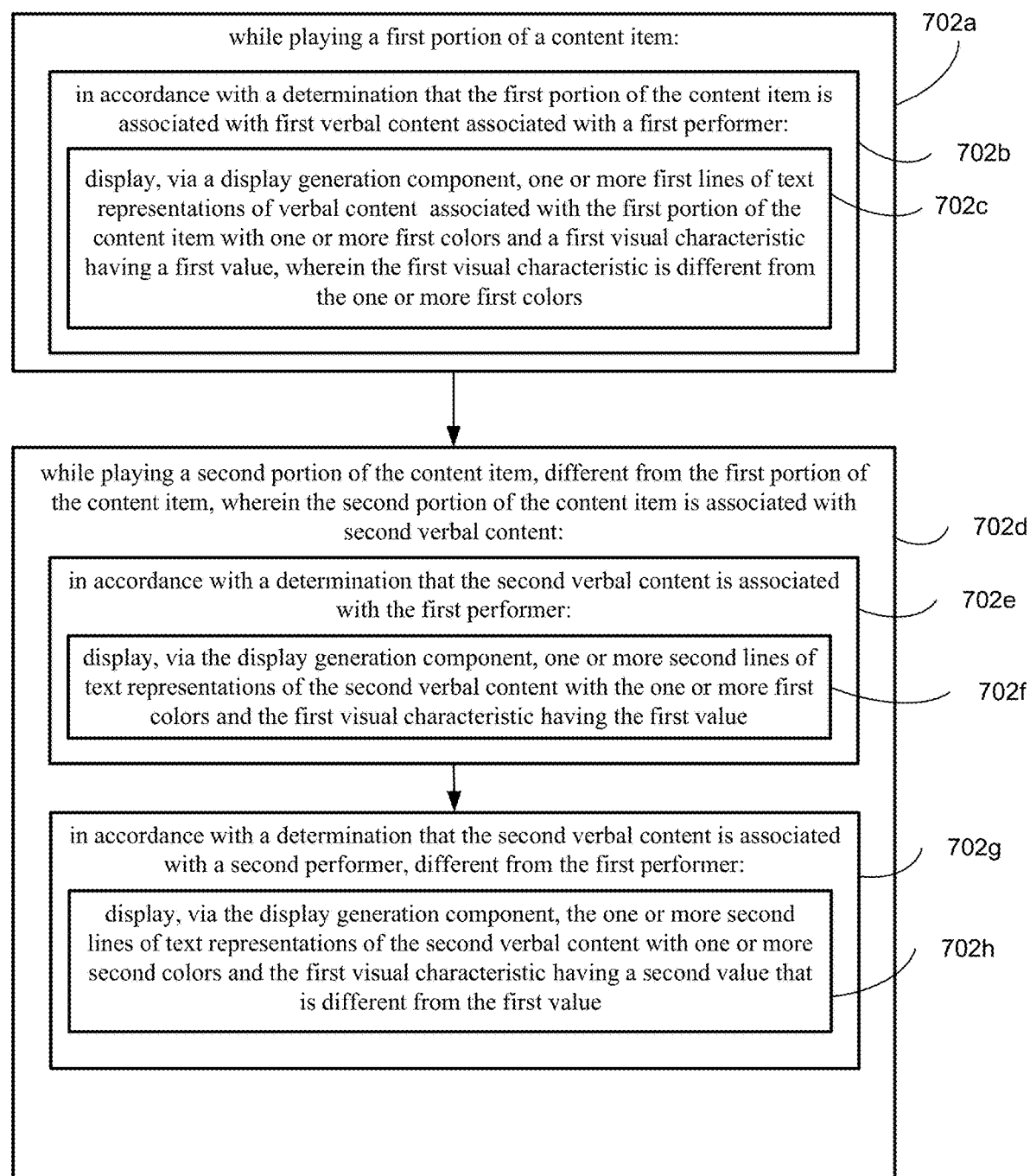

while playing a first portion of a content item:

in accordance with a determination that the first portion of the content item is associated with first verbal content associated with a first performer:

display, via a display generation component, one or more first lines of text representations of verbal content associated with the first portion of the content item with one or more first colors and a first visual characteristic having a first value, wherein the first visual characteristic is different from the one or more first colors 702a 702b 702c while playing a second portion of the content item, different from the first portion of the content item, wherein the second portion of the content item is associated with second verbal content:

in accordance with a determination that the second verbal content is associated with the first performer:

display, via the display generation component, one or more second lines of text representations of the second verbal content with the one or more first colors and the first visual characteristic having the first value 702d 702e 702f in accordance with a determination that the second verbal content is associated with a second performer, different from the first performer:

display, via the display generation component, the one or more second lines of text representations of the second verbal content with one or more second colors and the first visual characteristic having a second value that is different from the first value 702g 702h

LYRICS AND KARAOKE USER INTERFACES, METHODS AND SYSTEMS

CROSS-REFERENCE TO RELATED APPLICATIONS

This application claims the benefit of U.S. Provisional Application No. 63/385,988, filed Dec. 4, 2022, and U.S. Provisional Application No. 63/506,118, filed Jun. 4, 2023, the contents of which are herein incorporated by reference in their entireties for all purposes.

FIELD OF THE DISCLOSURE

This disclosure relates generally to playback user interfaces, such as playback user interfaces that includes lyrics and/or playback controls.

BACKGROUND OF THE DISCLOSURE

User interaction with electronic devices has increased significantly in recent years. These devices can be devices such as computers, tablet computers, televisions, multimedia devices, or mobile devices. Sometimes a user may wish to use a device to play content items including verbal/vocal content.

SUMMARY OF THE DISCLOSURE

Some embodiments described in this disclosure are directed to electronic devices changing a value of a first visual characteristic with which lyrics are displayed in response to detecting a change in a performer of lyrics associated with a song or other type of content item. Some embodiments described in this disclosure are directed to electronic devices displaying a vocal attenuation control element and changing a vocal volume of a content item, such as a song, in response to input directed to the vocal attenuation control element. Enhancing a user's interactions with an electronic device in performing the above actions improves the user's experience with the one or more electronic devices, which is particularly important where input devices are battery-operated. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments of the disclosure.

FIG. 7 is a flow diagram illustrating a method of changing a value of a first visual characteristic with which lyrics are displayed in response to detecting a change in a performer of lyrics associated with a song in accordance with some embodiments of the disclosure.

DETAILED DESCRIPTION

Figure 1A:
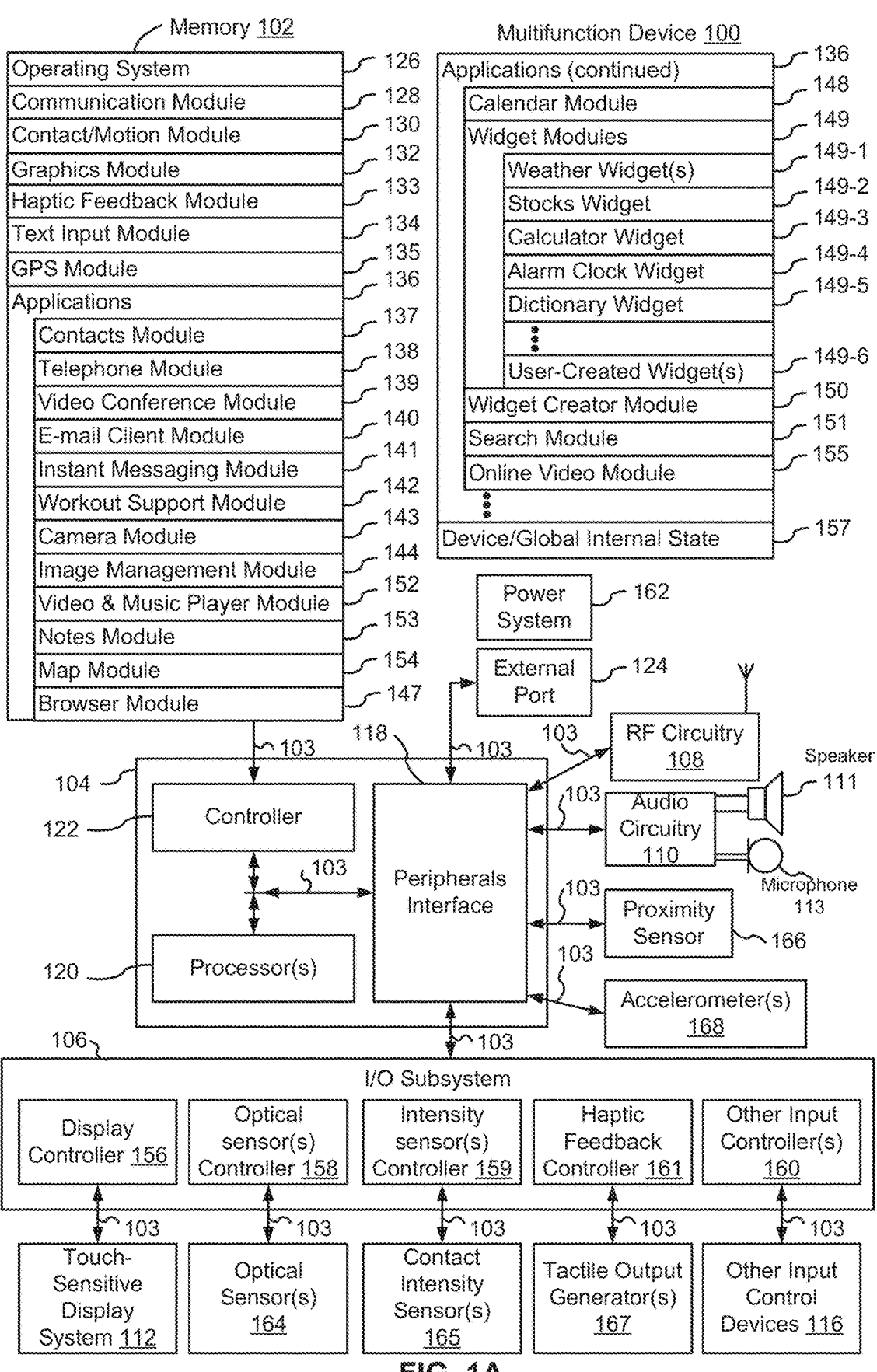
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices that provide efficient ways of displaying communication user interfaces and media user interfaces associated with a synchronized media and communication session. In some implementations, if a respective user is associated with a first electronic device and a second electronic device in a synchronized media and communication session, the first electronic device plays the media item currently playing in the synchronized media and communication session, and the second electronic device displays a communication user interface associated with the synchronized media and communication session. In some implementations, if the respective user is only associated with the first electronic device in the synchronized media and communication session, the first electronic device displays both the media playing in the synchronized media and communication session and the communication user interface associated with the synchronized media and communication session. Such techniques can reduce the cognitive burden on a user who uses such devices. Further, such techniques can reduce processor and battery power otherwise wasted on redundant user inputs.

There is also a need for electronic devices that provide efficient ways of joining a synchronized media and communication session. In some embodiments, an electronic device joins a synchronized media and communication session that is associated with a second electronic device. Such techniques can reduce the cognitive burden on a user who uses such devices. Further, such techniques can reduce processor and battery power and streamline a process for joining a synchronized media and communication session.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (e.g., CPUs) 120, peripherals interface 118, RF circuitry 108, audio circuitry 110, speaker 111, microphone 113, input/ output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to one or more processors 120 and memory 102. The one or more processors 120 run or execute various software programs and/or sets of instructions stored in memory 102 to perform various functions for device 100 and to process data.

In some embodiments, peripherals interface 118, one or more processors 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both cars) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch-sensitive display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-sensitive display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's car (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
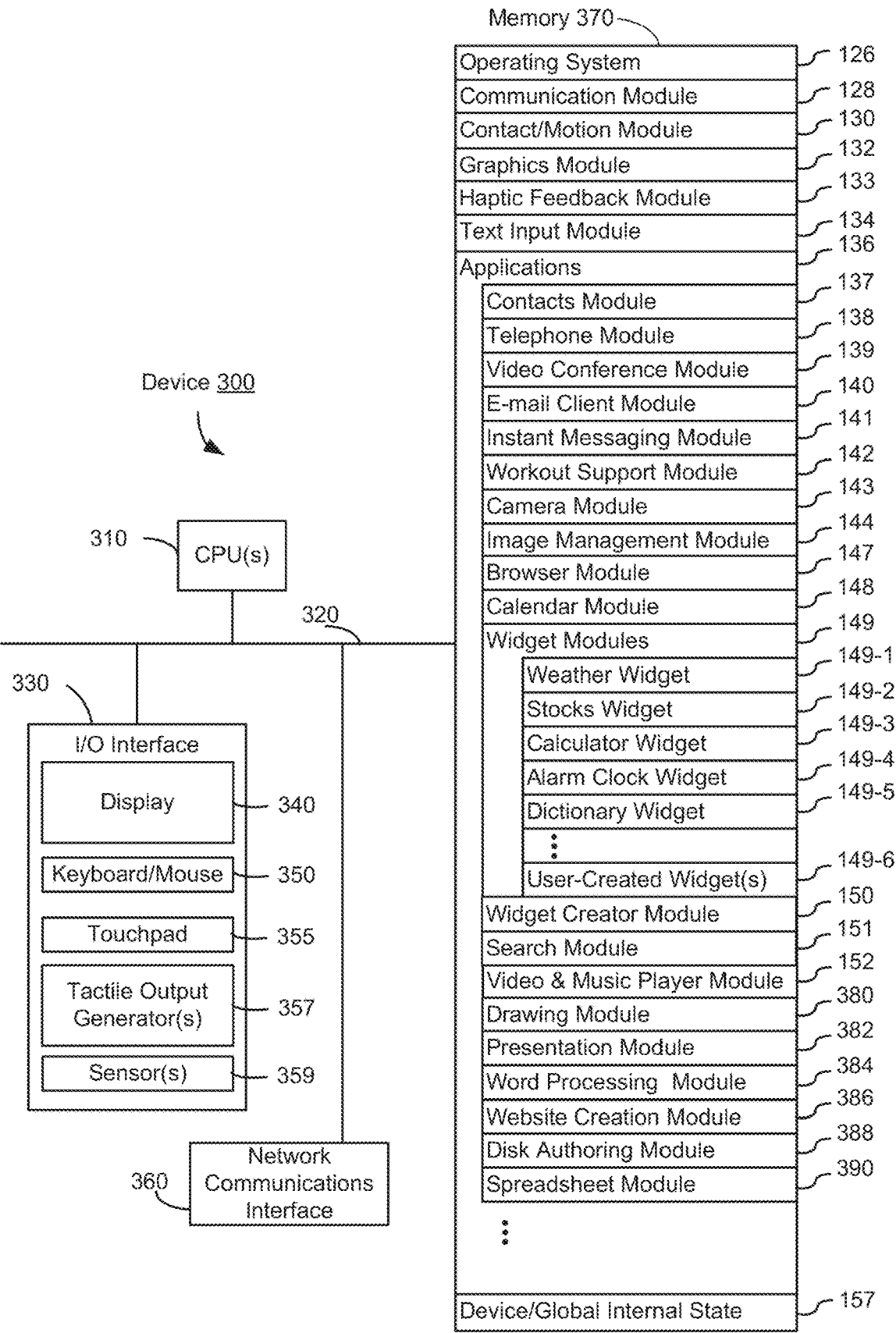
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
    telephone module 138;
    video conference module 139;
    e-mail client module 140;
    instant messaging (IM) module 141;
    workout support module 142;
    camera module 143 for still and/or video images;
    image management module 144;
    video player module;
    music player module;
    browser module 147;
    calendar module 148;
    widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
    widget creator module 150 for making user-created widgets 149-6;
    search module 151;
    video and music player module 152, which merges video player module and music player module;
    notes module 153;
    map module 154; and/or
    online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
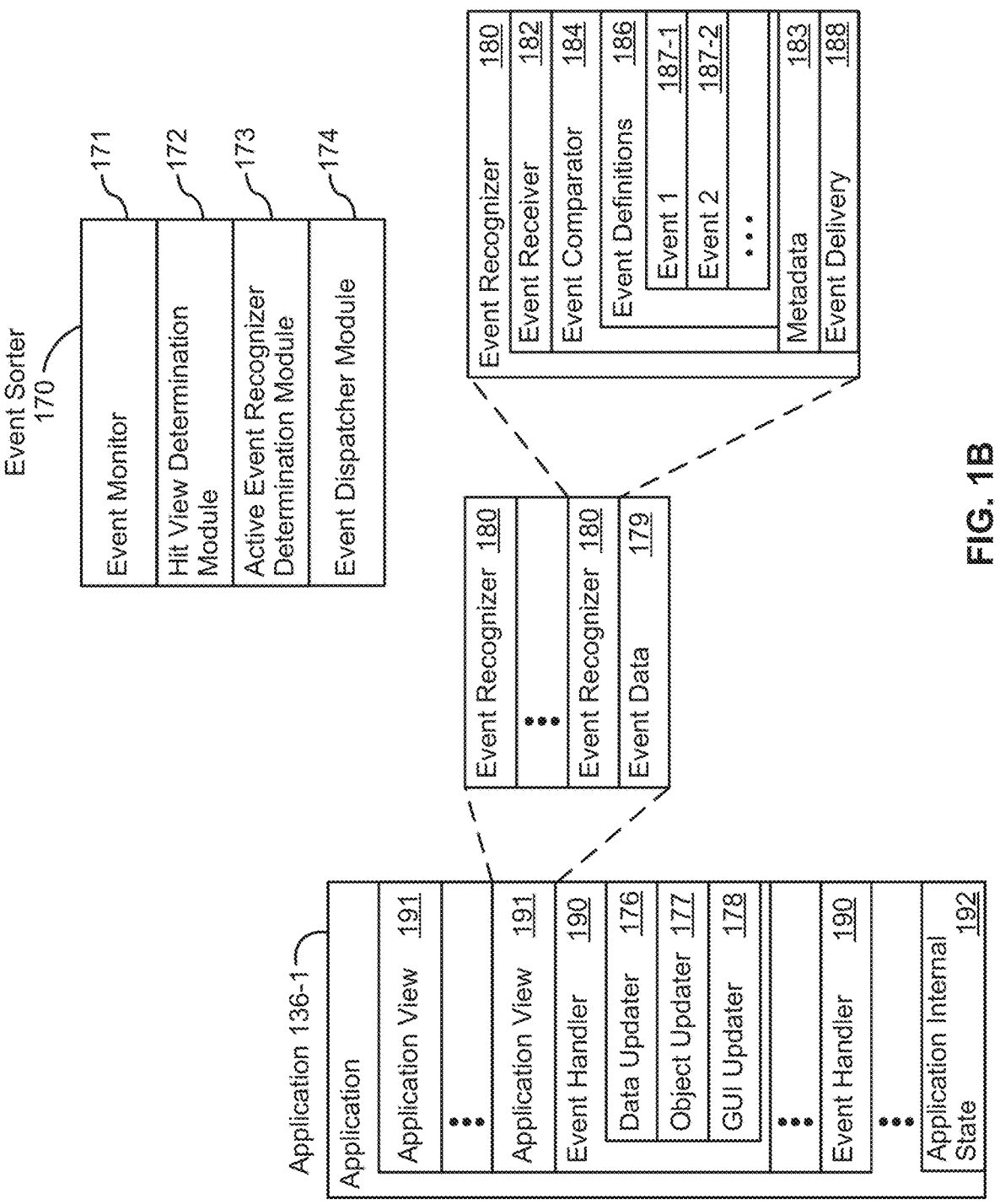
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
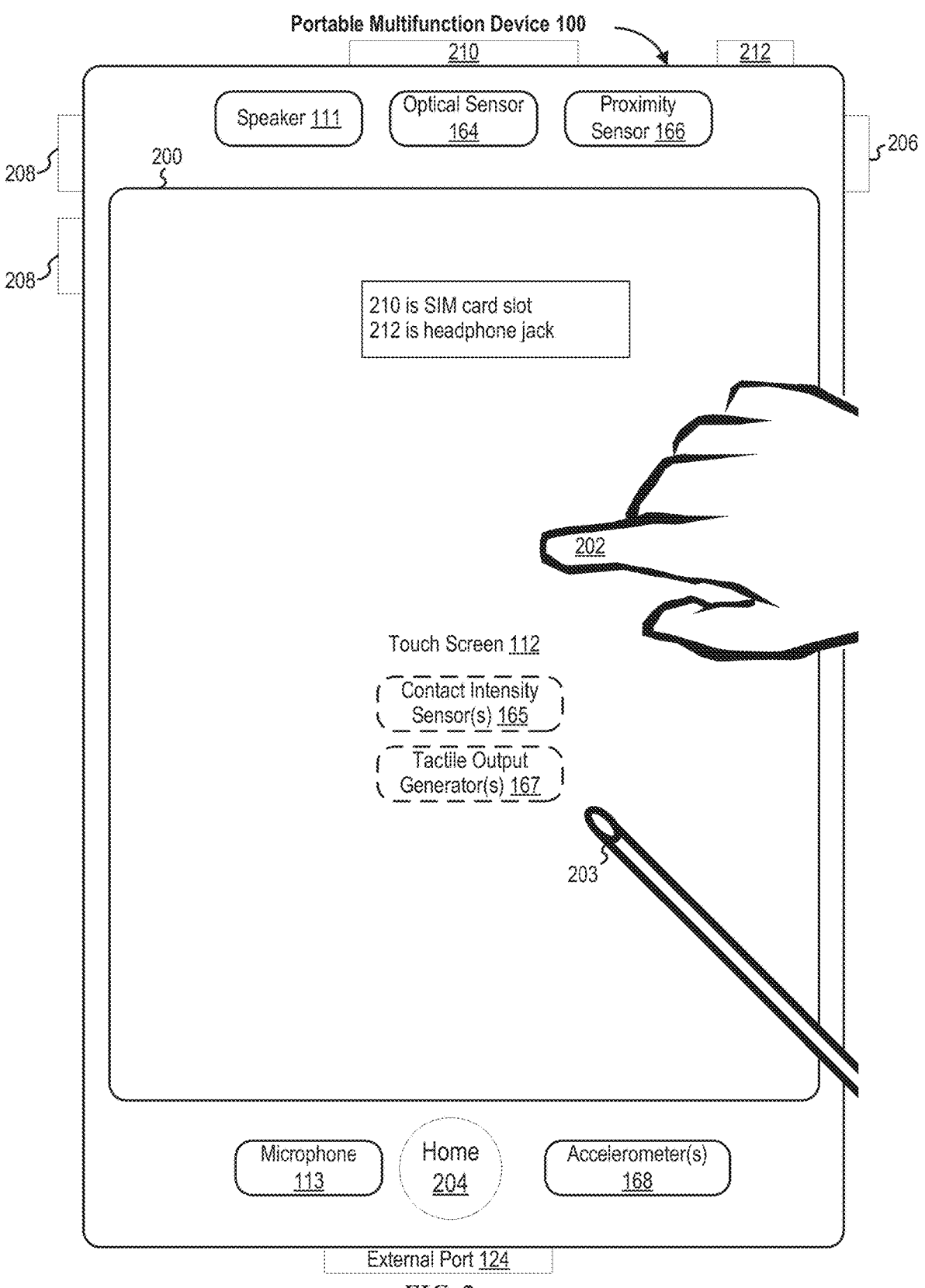
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units 310 (e.g., (CPUs), one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
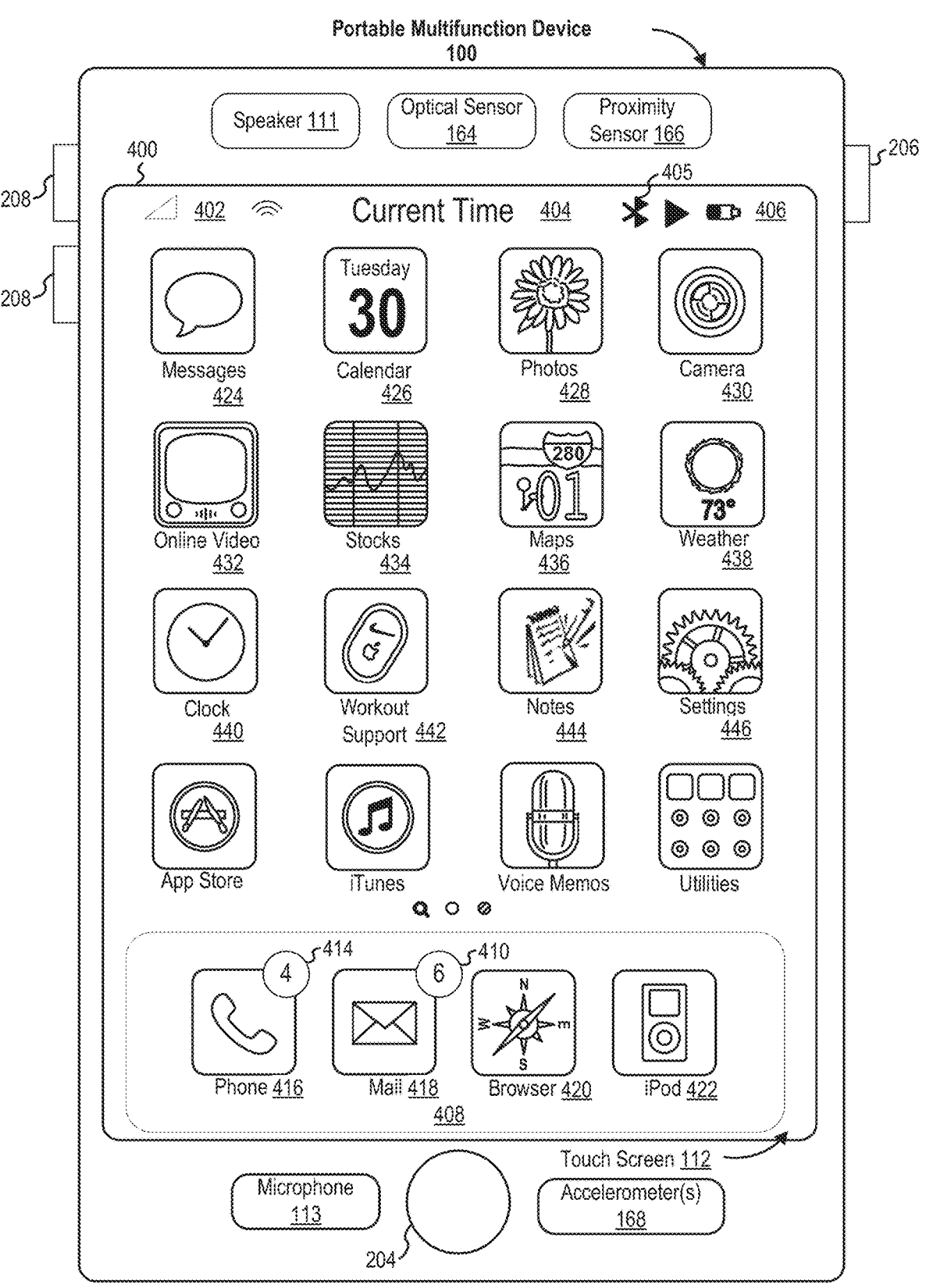
FIG. 4A illustrates an exemplary user interface for a menu of applications on a portable multifunction device in accordance with some embodiments of the disclosure.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch-sensitive display 112). Device 300 also, optionally, includes one or more contact intensity sensors (e.g., one or more of sensors 359) for detecting intensity of contacts on touch-sensitive surface

451 and/or one or more tactile output generators 357 for generating tactile outputs for a user of device 300.

Although some of the examples that follow will be given with reference to inputs on touch-sensitive display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For case of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
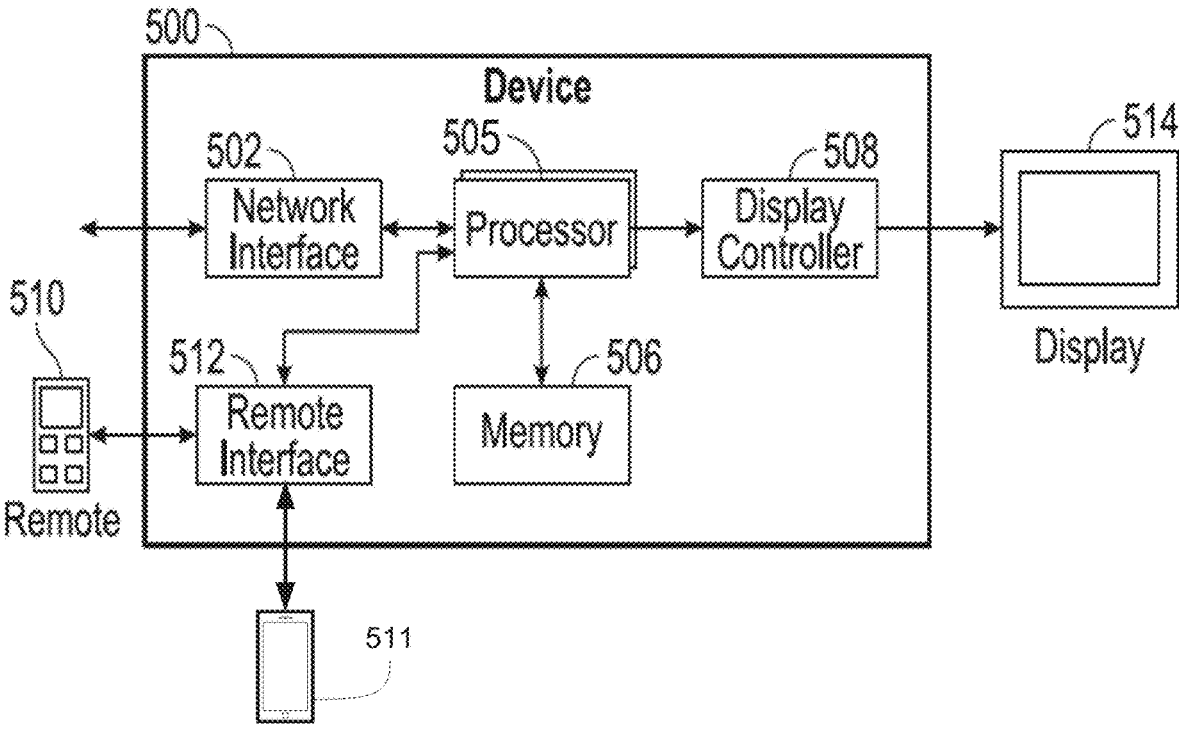
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 505 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 505 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 510 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/ mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
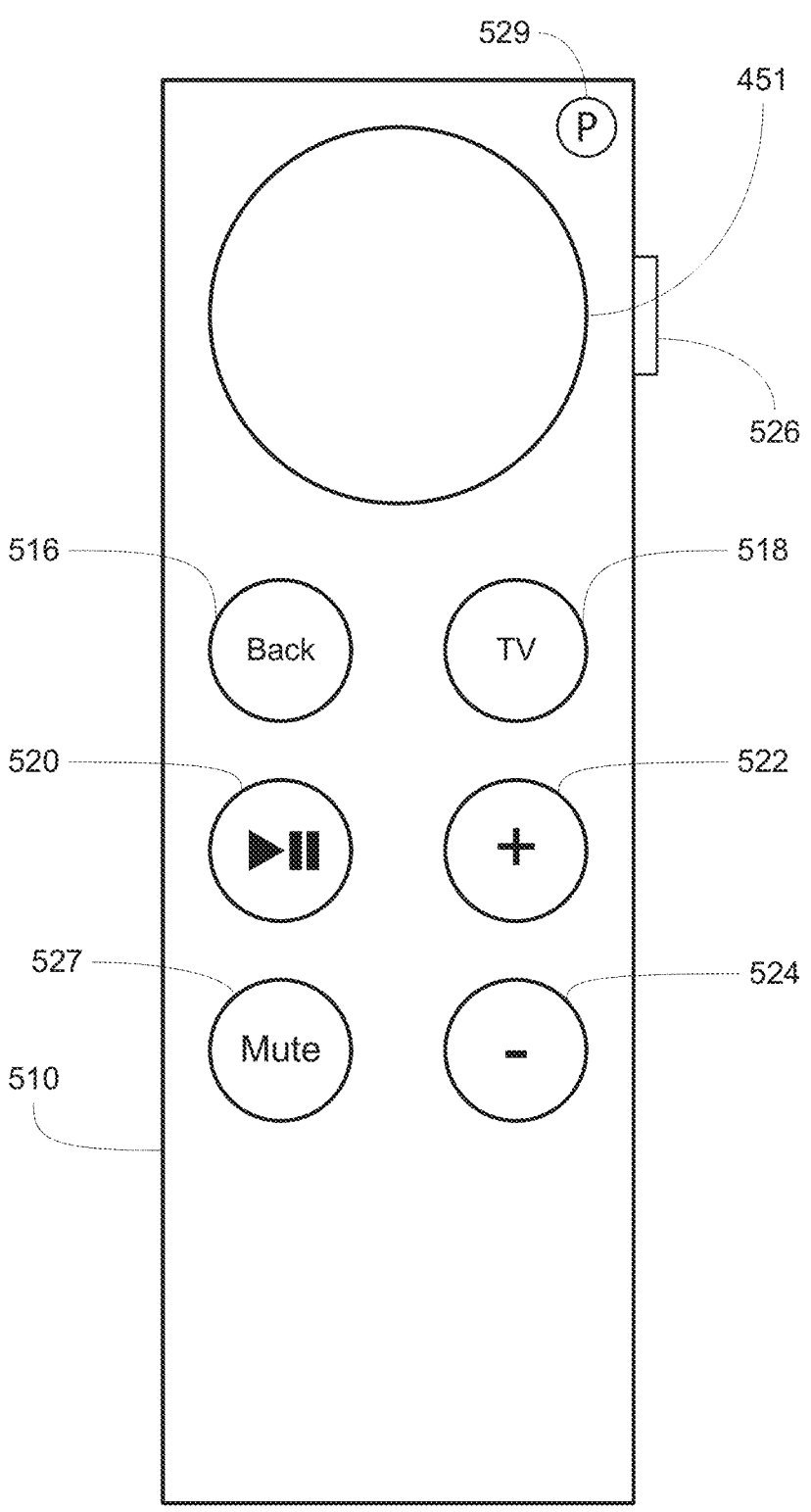

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524, 526, 527 and 529. Buttons 516, 518, 520, 522, 524, 526, 527 and 529 are optionally mechanical buttons or mechanical button alternatives that are able to sense contact with, or depression of, such buttons to initiate corresponding action(s) on, for example, device 500. In some embodiments, selection of "back" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "TV" button 518 by a user navigates device 500 to a main, home, media browsing user interface or root user interface from any user interface that is displayed on device 500 (e.g., to a home screen of device 500 that optionally includes one or more applications accessible on device 500 or to a media browsing user interface of device 500 that includes representations of media available for viewing via device 500). In some embodiments, selection of the "TV" button 518 causes the electronic device to navigate to a unified media browsing application. In some embodiments, selection of "play/ pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/ pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 (e.g., which is optionally a button on the side surface of remote 510, rather than on the surface of remote 510 that includes buttons 516, 518, 520, 522, 524 and 527) by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote. In some embodiments, selection of "Mute" button 527 toggles the audio reproduced by device 500 on and off. In some embodiments, selection of "Power" button 529 causes device 500 (and/or external devices coupled to device 500, such as display 514) to toggle between entering or exiting a low or off power state.

Figure 5C:
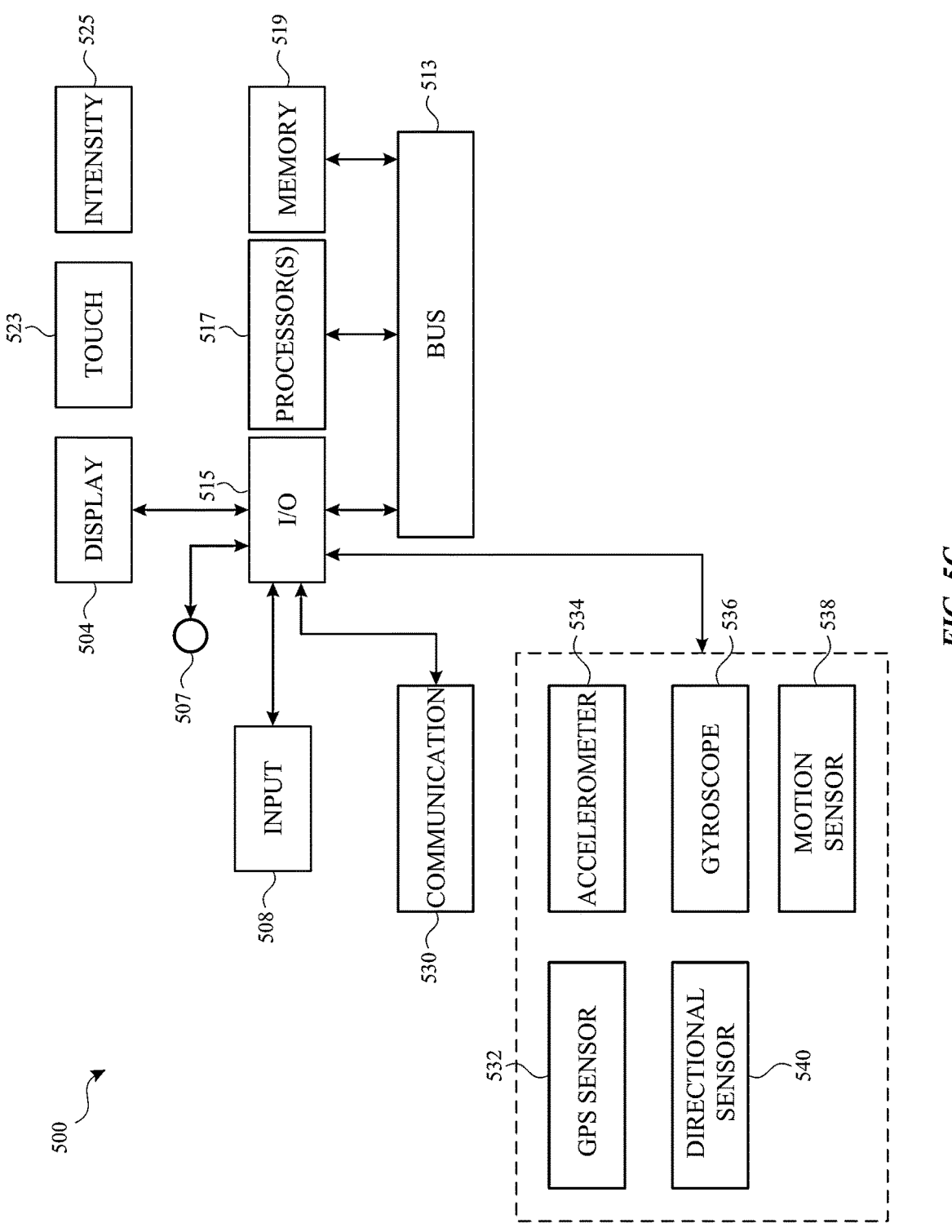

FIG. 5C depicts exemplary personal electronic device 500. In some embodiments, device 500 can include some or all of the components described with respect to FIGS. 1A, 1B, and 3. Device 500 has bus 513 that operatively couples I/O section 515 with one or more computer processors 517 and memory 519. I/O section 515 can be connected to display 504, which can have touch-sensitive component 523 and, optionally, intensity sensor 525 (e.g., contact intensity sensor). In addition, I/O section 515 can be connected with communication unit 530 for receiving application and operating system data, using Wi-Fi, Bluetooth, near field communication (NFC), cellular, and/or other wireless communication techniques. Device 500 can include input mechanisms 507 and/or 508. Input mechanism 507 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, acceler-ometer 534, directional sensor 540 (e.g., compass), gyro-scope 536, motion sensor 538, and/or a combination thereof, all of which can be operatively connected to I/O section 515.

Memory 519 of personal electronic device 500 can include one or more non-transitory computer-readable stor-age mediums, for storing computer-executable instructions, which, when executed by one or more computer processors 517, for example, can cause the computer processors to perform the techniques described below, including processes described with reference to FIGS. 7 and 9. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |

30

TABLE 1-continued

| Type of Tactile Output Sequence | Waveform | Textural (continuous) or Discrete |
|---|---|---|
| "Major-reduced" | MiniTap at 200 Hz | Discrete |
| "Minor-Reduced" | MicroTap at 200 Hz | Discrete |

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for per-forming the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "execut-ing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not run-ning, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application", filed Mar. 24, 2019), "User Interfaces For a Media Browsing Application", filed Mar. 24, 2019), and "User Interface Specific to Respective Content Items", filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

User Interfaces for Time-Synchronized Lyrics

Users interact with electronic devices in many different manners, including using electronic devices to play content items, such as songs. The embodiments described below provide ways in which an electronic device displays time-synced lyrics of a song with different visual characteristics for lyrics associated with different performers, such as text alignment, though other visual characteristics are possible. Providing efficient manners of displaying time-synced lyrics provides an efficient way for a user to interact with the lyrics associated with content items, thus reducing the amount of time a user needs to switch between different interfaces of a synchronized media and communication, and reducing the power usage of the electronic device, which increases battery life for battery-powered devices. It is understood that people use devices. When a person uses a device, that person is optionally referred to as a user of the device.

FIGS. 6A-6K illustrate lyrics user interfaces in accordance with some embodiments of the present disclosure. Among other things, FIGS. 6A-6K illustrate ways an electronic device 500a changes the appearance with which lyrics are displayed in response to detecting a change in a performer associated with the current lyrics of a content item (e.g., a song), and such features are described in detail below. The embodiments in these figures are used to illustrate the processes described below, including the processes described with reference to FIG. 7. Although FIGS. 6A-6K illustrate various examples of ways an electronic device 500a is able to perform the processes described below with reference to FIG. 7, it should be understood that these examples are not meant to be limiting, and the electronic device 500a is able to perform one or more processes described below with reference to FIG. 7 in ways not expressly described with reference to FIGS. 6A-6K.

Figure 6B:
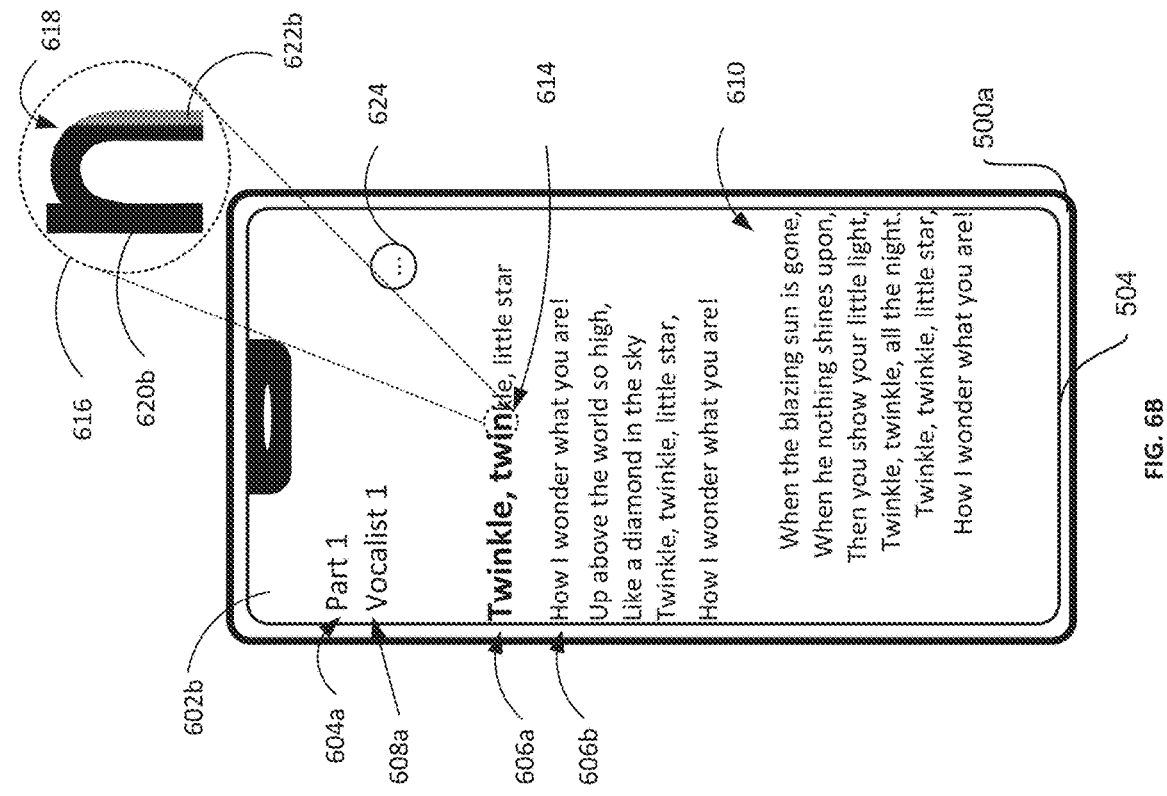
FIGS. 6A-6K illustrate ways an electronic device changes a value of a first visual characteristic with which lyrics are displayed in response to detecting a change in a performer of lyrics associated with a song in accordance with some embodiments of the disclosure.
Figure 6A:
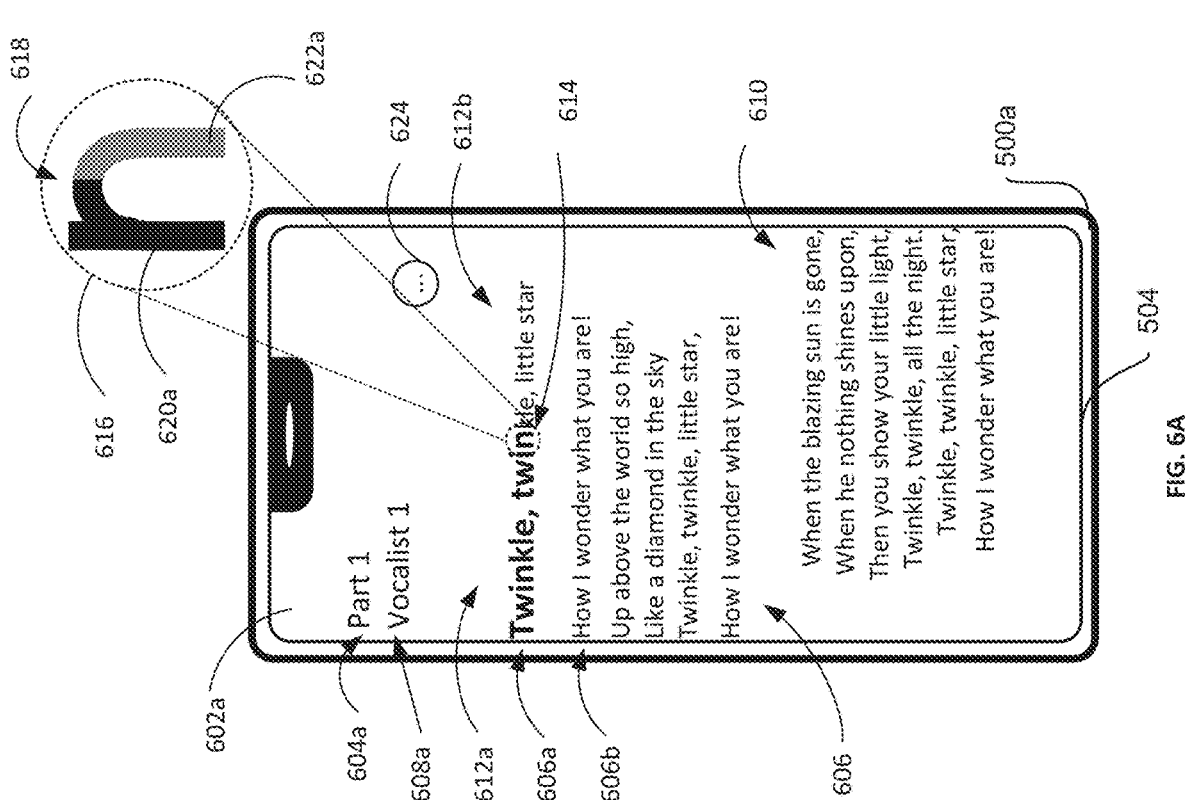

FIG. 6A illustrates an example of an electronic device 500a displaying, via display 504, a lyrics user interface 602a. In some embodiments, the lyrics user interface 602a is a user interface of a content playback application. In some embodiments, the electronic device 500a displays the lyrics user interface 602a in response to an input corresponding to a request to display the content playback application or in response to selection of a user interface element corresponding to a time-synced lyrics option in the content playback application. For example, the electronic device 500a optionally displays the content playback user interface while playing a content item or while playback of the content item is paused. In some embodiments, the electronic device 500a displays the lyrics user interface 602a and generates audio corresponding to the content item. Example content items, including songs, are described below with reference to the method 700. Although examples herein are described with respect to lyrics of the content item, in some embodiments, the examples can be applied to written representations of other verbal content included in a content item, such as transcripts (e.g., of podcasts) and/or subtitles (e.g., of movies), for example.

In FIG. 6A, the lyrics user interface 602a includes a first lyrics part 606 (e.g., lines 606a, 606b) having a first visual characteristic having a first value and a second lyrics part 610 having the first visual characteristic having the second value. The first visual characteristic is optionally different from color (e.g., different from a color-based characteristic). In FIG. 6A, the first visual characteristic is a text alignment, and first lyrics part 606 displayed with the first visual characteristic having the first value includes the first lyrics part 606 displayed left-aligned on the display of device 500a and/or in user interface 602a, and the second lyrics part 610 displayed with the first visual characteristic having the second value includes the second lyrics part 610 displayed right-aligned on the display of device 500a and/or in user interface 602a. As will be described in detail below, the value of the first visual characteristic with which the second lyrics part 610 is displayed is different from the value of the first visual characteristic with which the first lyrics part 606 is displayed, optionally because the electronic device 500a detects a difference in performer in the content item between a performer of the first lyrics part 606 and a performer of the second lyrics part 610. For example, when playing the content item including playing verbal content (e.g., one or more singers singing), the first lyrics part 606 is sung by a first singer and the second lyrics part 610 is sung by a second singer. In some embodiments, the electronic device 500a displays the first lyrics part 606 and the second lyrics part 610 as shown in FIG. 6A with different text alignments for first lyrics part 606 associated with the first singer and second lyrics part 610 associated with second singer while forgoing playback of the verbal content of the content item, such as while forgoing playback of the verbal content of the content item in response to a user input corresponding to a request to reduce or mute the playback volume of the verbal content of the content item in accordance with method 900. In some embodiments, the electronic device 500a plays the content item. In some embodiments, playback of the content item does not include playback of verbal content (e.g., the electronic device 500a does not output audio of the verbal content or the content item is an instrumental version of a song) and the electronic device 500a nevertheless displays time-synced lyrics that are time-synced with playback of the content item, in accordance with playback of the content item, such as illustrated in FIGS. 6A-6K. In some embodiments, the first visual characteristics is different than alignment, and further description of visual characteristics and values thereof are provided below with reference to the method 700.

In FIG. 6A, the lyrics user interface 602*a* includes a selectable option 624, which is optionally selectable to display a user interface including selectable options for sharing the song (e.g., the content item), adding the song to a playlist, showing an album of the song, and/or other selectable options, a first indication 604*a* of a current part of a song in playback, and a second indication 608*a* of a current performer of the current part of the song in playback. For example, in FIG. 6A, the first indication 604*a* identifies a section of the song in playback and second indication 608*a* identifies the performer that corresponds to the first lyrics part 606 (e.g., the line of lyrics 606*a*), such as via the name of the performer, an image of the performer, or the like. In some embodiments, the electronic device 500*a* displays indications similar to the first indication 604*a* and/or the second indication 608*a* for an upcoming performer or an upcoming part of the song in playback, such as a performer that corresponds to the second lyrics part 610 different from the current performer. Further details regarding the display of the indications are discussed in detail below.

In FIG. 6A, the electronic device 500*a* displays the lyrics 606*a* in the focus line with a color gradient 618. The focus line corresponds to a line of lyrics that represents the current playback position of the song. For example, the line 606*a* is the focus line in the lyrics user interface 602*a* of FIG. 6A because the portion of the song that is currently playing corresponds to the lyrics on line 606*a* (e.g., the vocal and/or non-vocal portion(s) of the song in playback currently being outputted by device 500*a* corresponds to line 606*a*). In FIG. 6A, a magnified view 616 illustrates a specific location of the color gradient 618 on the letter "n" of the word "twinkle" in the line 606*a*. In FIG. 6A, the location of the color gradient 618 is optionally related to a duration of playback of the song that corresponding to the syllable associated with the letter "n" in the word in which the color gradient 618 exists, as described in further detail below. As shown in the magnified view 616 of FIG. 6A, a first portion 620*a* of the letter "n" includes a color characteristic having a first value (e.g., a first color, first shade of color, a first hue, a first brightness, a first saturation, a first translucency, or another color characteristic) and a second portion 622*a* of the letter "n" includes the color characteristic having a second value different from the first value (e.g., a second color, second shade of color, a second hue, a second brightness, a second saturation, a second translucency, or another color characteristic). In FIG. 6A, the line 606*a* includes a first section 612*a* and a second section 612*b*. In some embodiments, the first section 612*a* includes lyrics of the first lyrics part 606 that are time-synced to portions of the song that have already played (e.g., previously played and not upcoming in playback); the electronic device 500*a* displays such lyrics with the color characteristic having the first value. In some embodiments, the second section 612*b* includes lyrics of the first lyrics part 606 that are time-synced to portions of the song that have not already played (e.g., upcoming in playback and/or not already played); the electronic device 500*a* displays such lyrics with the color characteristic having the second value. More generally, in FIG. 6A, the electronic device 500*a* displays lyrics of the first lyrics part 606 that are time-synced to portions of the song that have already played (e.g., not upcoming in playback) with the color characteristic having the first value (e.g., the lyrics in first section 612*a* of the line 606*a*) and displays the lyrics of the first lyrics part 606 that are time-synced to portions of the song that have not already played (e.g., is not already played and/or is upcoming in playback) with the color characteristic having the second value (e.g., the lyrics in the second section 612*b* and/or the lyrics in the line 606*b*).

The lyrics user interface 602*a* of FIG. 6A optionally corresponds to a paused state or a playback state of the song. If playback of the song is paused in FIG. 6A, when the playback of the song begins, playback of the song optionally starts from the paused position in FIG. 6A and the color gradient 618 will progress to the right in accordance with continued playback of the song. The lyrics user interface 602*a* of FIG. 6A optionally corresponds to a playback state, such as a "play" state, in which playback is not paused. If playback of the song is not paused in FIG. 6A, but in the "play" state, playback of the song optionally continues from corresponding position in FIG. 6A and the color gradient 618 will progress to the right in the line 606*a* in accordance with continued playback of the song. From FIG. 6A to FIG. 6B, the electronic device 500*a* moves (e.g., shifts rightward within the letter "n") the color gradient 618, such that in the lyrics user interface 602*b* of FIG. 6B, the portion 620*b* of the letter "n" now includes the color characteristic having the first value and the portion 622*b* of the letter "n" now includes the color characteristic having the second value. During the movement of the color gradient 618 from its position in FIG. 6A to its position in FIG. 6B, the electronic device 500*a* optionally plays the part of the song that is time-synced with the lyrics in the line 606*a*, such that the location of the color gradient 618 is time-synced with playback of the syllables of the lyrics of the line 606*a*, as described in detail below with reference to the method 700. For example, the (average) speed of movement of the color gradient 618 in FIGS. 6A and 6B across the word "Twinkle" (on which the color gradient 618 appears in FIGS. 6A and 6B) optionally corresponds to a playback duration of the portion of the content item (e.g., vocal and/or non-vocal portion) that corresponds to the word "Twinkle", with the electronic device 500*a* moving the color gradient faster when playback of the portion of the content item that corresponds to the word "Twinkle" has a shorter duration and moving the color gradient slower when playback of the portion of the content item that corresponds to the word "Twinkle" of the lyrics has a longer duration. Additionally, in another example, the speed of the color gradient 618 across portions of the word "Twinkle" (on which the color gradient 618 appears in FIGS. 6A and 6B) optionally corresponds to a playback duration of respective portions of the content item (e.g., vocal and/or non-vocal portion) that corresponds to a respective syllable of word "Twinkle", as performed, with, for example, the electronic device 500*a* moving the color gradient slower when playback of the portion of the content item that corresponds to the first syllable of the word "Twinkle" has a longer duration and moving the color gradient faster when playback of the second syllable of the word "Twinkle" has a shorter duration. Also, it should be noted that in some embodiments, the electronic device 500*a* alternatively or additionally displays gradient(s) or other differences in visual appearance (e.g., an alignment gradient, font style gradient, text styling gradient (e.g., bold, italic, strikethrough, and/or underline), font size gradient, translucency gradient, and/or placement gradient) other than color gradient, with similar visual functionality as the described color gradient, and further details regarding such features are described below.

Returning to FIG. 6A, as discussed earlier, the line 606*a* includes a first section 612*a* and a second section 612*b*. In FIG. 6A, the first section 612*a* includes textual representations that are increased in font size (e.g., display size or amount of pixels corresponding to the display size) compared to the font size of the second section 612*b*. In FIG. 6A, the font size increase optionally occurs when any of the line 606*a* is in playback, such as when the playback corresponding to the first textual representation of the lyrics of the line 606*a* is in playback. In some embodiments, the font size increase occurs for a particular word (or other textual representation) when playback is time-synced with the particular word (e.g., when the portion of the song time-synced with the particular word is in playback). In some embodiments, the textual representations of the line 606*a* are increased in display size (e.g., compared with the line 606*b*) when the line 606*a* is in the focus line. In some embodiments, the scaling of the particular word (or other textual representation) is a function of a time duration of playback of the portion of the content item that corresponds to the particular word (or other textual representation), such that a longer time duration results in more scaling than a shorter time duration. Further details regarding the change in amount of pixels corresponding to the display of the textual representations and words of the lyrics are provided below with reference to the method 700.

Figure 6D:
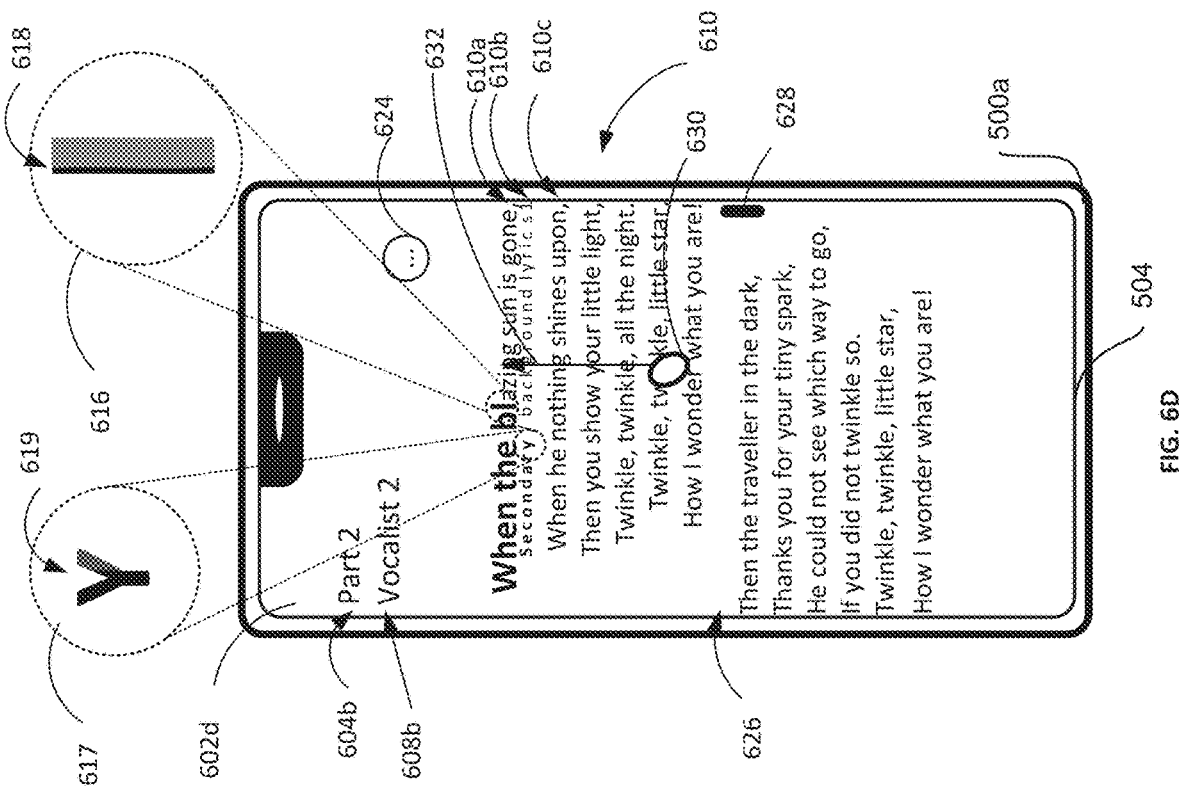
Figure 6C:
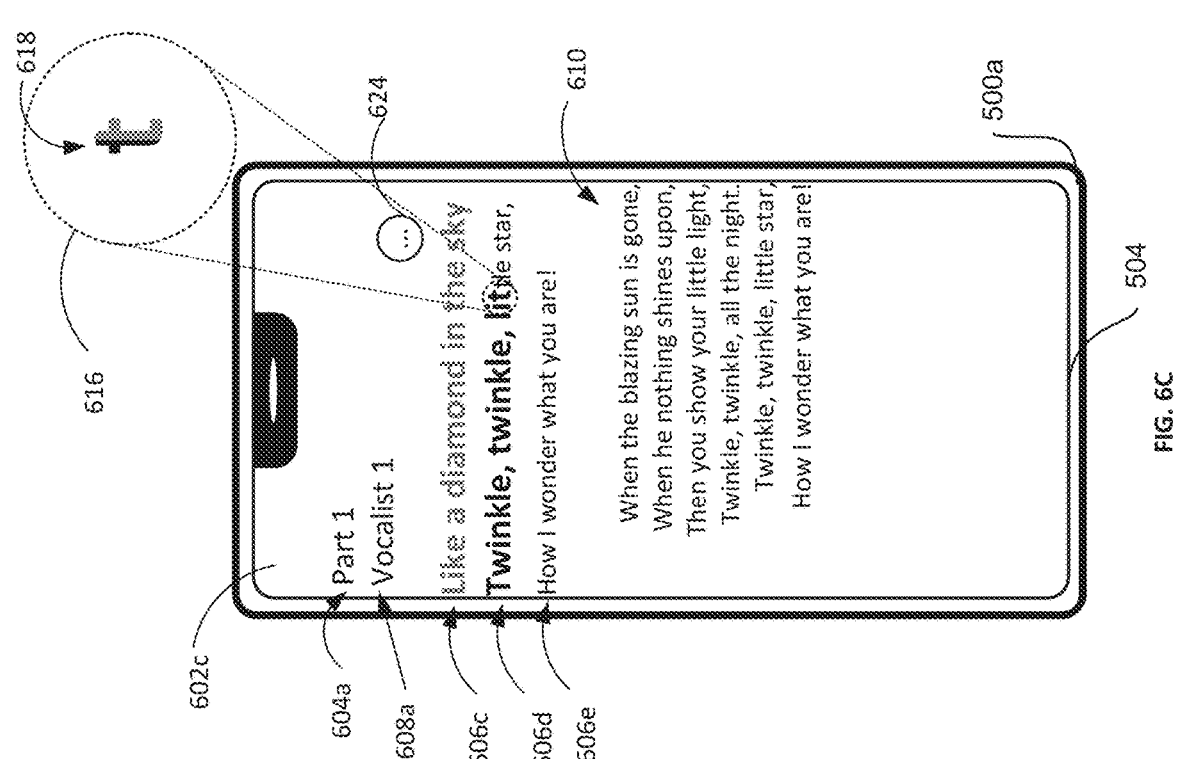

FIG. 6C illustrates an example of an electronic device 500*a* displaying a lyrics user interface 602*c*. For example, as the electronic device 500*a* plays the song (e.g., the content item described below with reference to the method 700), the electronic device 500*a* scrolls (e.g., automatically) the displayed lyrics of the song, including the first lyrics part 606 and the second lyrics part 610, such that the line 606*d* enters the focus line when the electronic device 500*a* begins playing the portion of the song that is time synced with the line 606*d*. In FIG. 6C, the line 606*d* of the first lyrics part 606 is in the focus line described above. The color gradient 618 is in the line of lyrics 606*d* on the letter "t" of the word "little", as shown in the magnified view 616 of FIG. 6C. Further, in FIG. 6C, the electronic device 500*a* continues displaying the lyrics of the line 606*c*, which were displayed in the lyrics user interface 602*a* of FIG. 6A and in the lyrics user interface 602*b* of FIG. 6B. However, in FIG. 6C, the lyrics of the line 606*c* are displayed with the color characteristic having a third value, optionally to indicate to a user of the electronic device 500*a* that the electronic device 500*a* already played the part of the song that is time-synced with the line 606C.

FIG. 6D illustrates an example of the electronic device 500*a* displaying a lyrics user interface 602*d* while receiving an input corresponding to a request to scroll forward in the lyrics (e.g., contact 630 on a touch-sensitive surface with movement, as indicated by the arrow 632). In FIG. 6D, the electronic device 500*a* displays the lyrics user interface 602*d* when the electronic device 500*a* detects a beginning of the input (e.g., detects the contact 630 with or without the movement indicated by the arrow 632). It should be noted however that in some embodiments, before the electronic device 500*a* detects the input, the electronic device 500*a* displays one or more or all elements of the lyrics user interface 602*d* of FIG. 6D without the scrolling navigation indicator 628, as shown in FIGS. 6A-6C, for example.

In FIG. 6D, the lyrics user interface 602*d* includes the second lyrics part 610, a third lyrics part 626, an indication 604*b* of a current part of a song in playback, and an indication 608*b* of the current performer of or associated with the current part of the song in playback. The indication 604*b* and the indication 608*b* of FIG. 6D indicates a different part and a different performer than the first indication 604*a* and the second indication 608*a* of FIGS. 6A-6C because a different performer (e.g., a different performer of main or primary vocals) is associated with the second lyrics part 610

(e.g., the lines of lyrics 610*a*-*c*), which is in the focus line in FIG. 6D. Specifically, the line 610*a* of the second lyrics part 610 is in the focus line. The line 610*a* optionally includes lyrics corresponding to vocals of a primary or main vocalist (e.g., the performer) and the line 610*b* optionally includes lyrics corresponding to vocals of a background or backup vocalist (e.g., a performer of background or backup lyrics), which is illustrated as "Secondary/background lyrics". In the illustrated embodiment of FIG. 6C, the electronic device 500*a* displays the backup/background lyrics that are time-synced with the primary line 610*a* that is in the focus line without displaying backup/background lyrics that are time-synced with other lines of lyrics in the content item. An alternative embodiment is illustrated in lyrics user interface 602*g* in FIG. 6G, in which the electronic device 500*a* displays the backup/background lyrics that correspond to primary lines of lyrics that are in focus and primary lines of lyrics that are not in focus (e.g., lines of lyrics that are of the same part of the song). Returning to FIG. 6D, as shown in the magnified views 616 and 617, the electronic device 500*a* displays two color gradients—the color gradient 618 in the primary lyrics line 610*a* and a separate color gradient 619 in the backup/background lyrics line 610*b*. These two color gradients 618 and 619 optionally proceed on the respective lines in accordance with playback of the song corresponding to the respective syllables of the respective words in the lyrics, such as described above with reference to FIGS. 6A and 6B. As such, it is possible for the color gradients 618 and 619 to not be vertically and/or horizontally aligned with one another during playback. Further details regarding these color gradients 618 and 619 are provided above with reference to FIGS. 6A, 6B, and below with reference to the method 700. It should also be noted that the backup/background lyrics optionally share the same alignment (or other first visual characteristic as described herein) with their corresponding primary or main lyrics. For example, in FIG. 6D, the line 610*b* (which is a backup/background line of lyrics) has the same alignment as the line 610*a* (which is a primary or main line of lyrics).

In FIG. 6D, the electronic device 500*a* detects, via a touch sensitive surface such as a touch screen of display 504, movement of contact 630 in the direction indicated by the arrow 632 corresponding to a request to scroll through the lyrics of the song. In response to the input illustrated in FIG. 6D, the electronic device 500*a* displays the scrolling navigation indicator 628 corresponding to a location in the lyrics of the song to which the displayed lyrics correspond, and scrolls the lyrics, as shown in FIG. 6E.

Figure 6F:
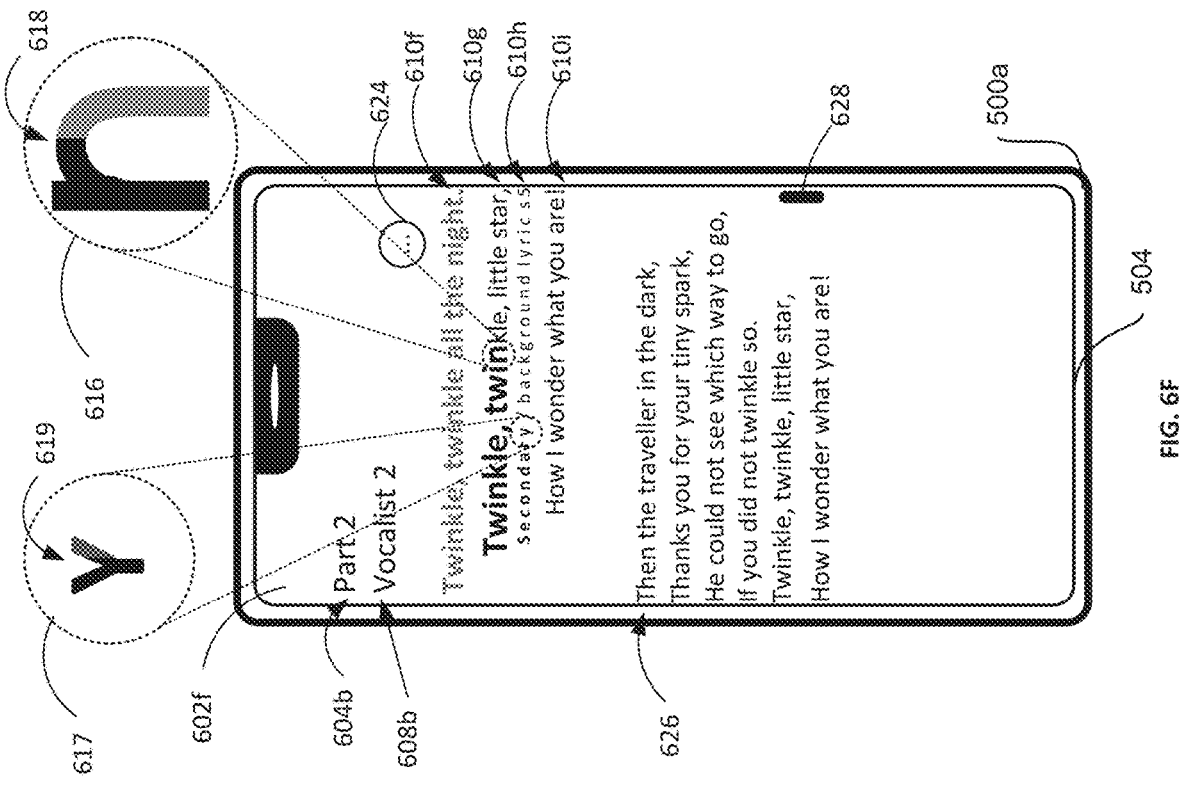
Figure 6E:
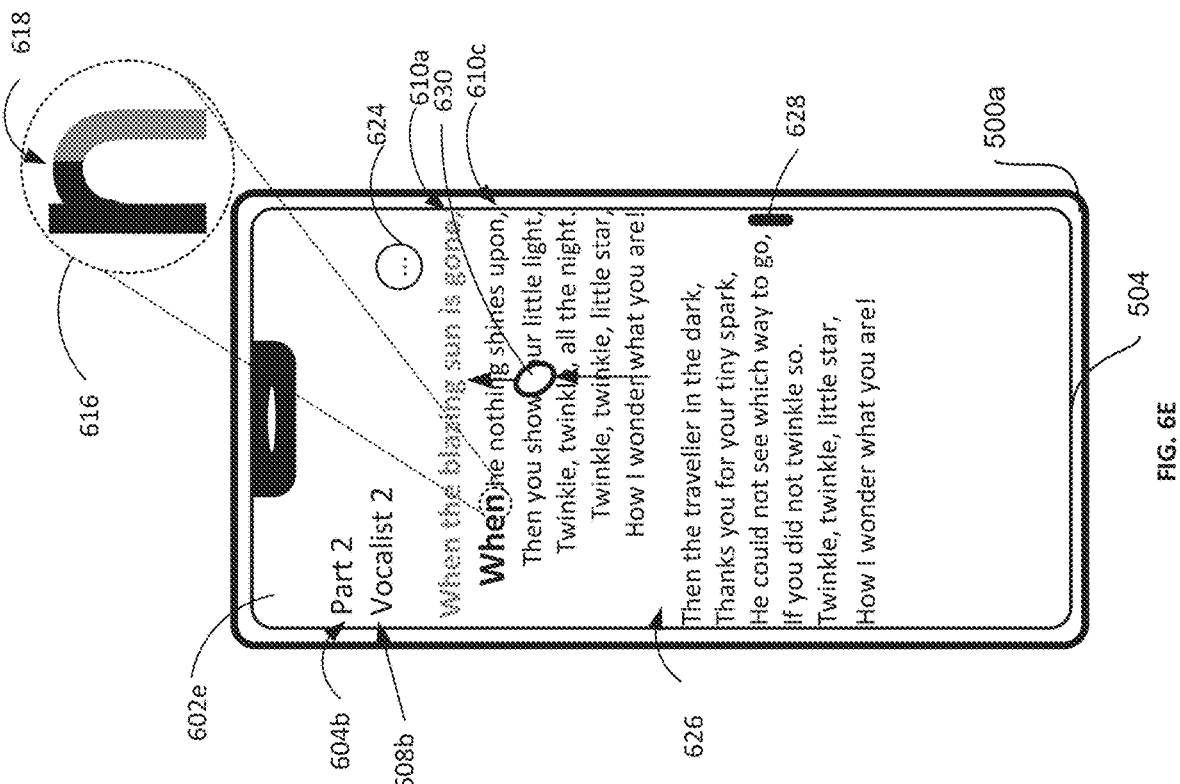

FIG. 6E illustrates an electronic device 500*a* displaying a lyrics user interface 602*e* during the scrolling operation initiated in FIG. 6D. In some embodiments, the electronic device ceases display of the backup/background line(s) of lyrics while scrolling, and then displays backup/background line(s) of lyrics while not scrolling. In FIG. 6E, the line 610*b* of FIG. 6D is hidden from display and electronic device 500*a* moves the first lyrics part 606 and the second lyrics part 610 in accordance with the scrolling operation, such as in a direction (natural or inverse), speed, and/or distance corresponding to the direction, speed, and/or distance of the movement of the contact 630. In FIG. 6E, the line 610*a* is no longer upcoming in playback, and the line 610*c* is in the focus line (e.g., the line 610*c* would be in playback if the scrolling operation ceased while the electronic device 500*a* displays the lyrics user interface 602*c*). In some embodiments, the electronic device 500*a* ceases display of the color gradient 618 of FIG. 6E during the scrolling operation, such as by displaying each respective line of lyrics with different color characteristics different from other displayed lines of lyrics, and/or by displaying all lines of lyrics with an identical color characteristic. In some embodiments, the electronic device 500a continues to display the color gradient 618, which is likewise moved in position in accordance with the scrolling operation, such as illustrated in FIG. 6E. In some embodiments, the electronic device 500a continues playback of the content item from the playback position at which the scrolling input was received in FIG. 6D without skipping to a playback position corresponding to the scrolling input while scrolling the lyrics. The scrolling operation continues until FIG. 6F.

FIG. 6F illustrates a lyrics user interface 602f, in which the scrolling operation initiated in FIG. 6D and continued in FIG. 6E is completed (e.g., stopped or finished). Playback of the song optionally begins (or continues) from a time-synced portion of the song that corresponds to the line of lyrics in playback, and optionally, more specifically, to the time-synced portion of the song that correspond to the word of the lyrics on which the color gradient 618 and the color gradient 619 are displayed. As shown in FIG. 6F, in response to detecting completion of the scrolling operation, the electronic redisplays background/back up lyrics (e.g., the line 610h) corresponding to primary lyrics line 610g (e.g., the line of lyrics that is currently in focus). Alternatively, in some embodiments all remaining background/backup lyrics are displayed in response to detecting completion of the scrolling operation. Further details regarding the scrolling operation and the various types of user interfaces that could be displayed during such operation are discussed below with reference to method 700. In some embodiments, if the electronic device 500a does not receive input for a threshold time (e.g., 0.5 s, 1 s, 5 s, 10 s, or another time threshold) after scrolling is detected, the electronic device 500a displays (e.g., scrolls back to) a portion of lyrics corresponding to the portion of the content item that is currently playing (e.g., that continued playing while scrolling occurred). In some embodiments, if the electronic device 500a does not receive input for the threshold time after scrolling is detected, the electronic device 500a displays a portion of lyrics that does not correspond to the portion of the content item that is currently playing (e.g., that continued playing while scrolling occurred), but rather, continues to display the portion of lyrics until the playback of the song becomes time-synced with the portion of lyrics, upon which the automatic scrolling of the content item, described above, continues. In some embodiments, electronic device 500a receives a selection of a line of lyrics that does not correspond to the portion of the content item that is currently playing, and in response to the selection, the electronic device 500a skips to playback to the portion of the content item corresponding to the selected lyrics.

Figure 6H:
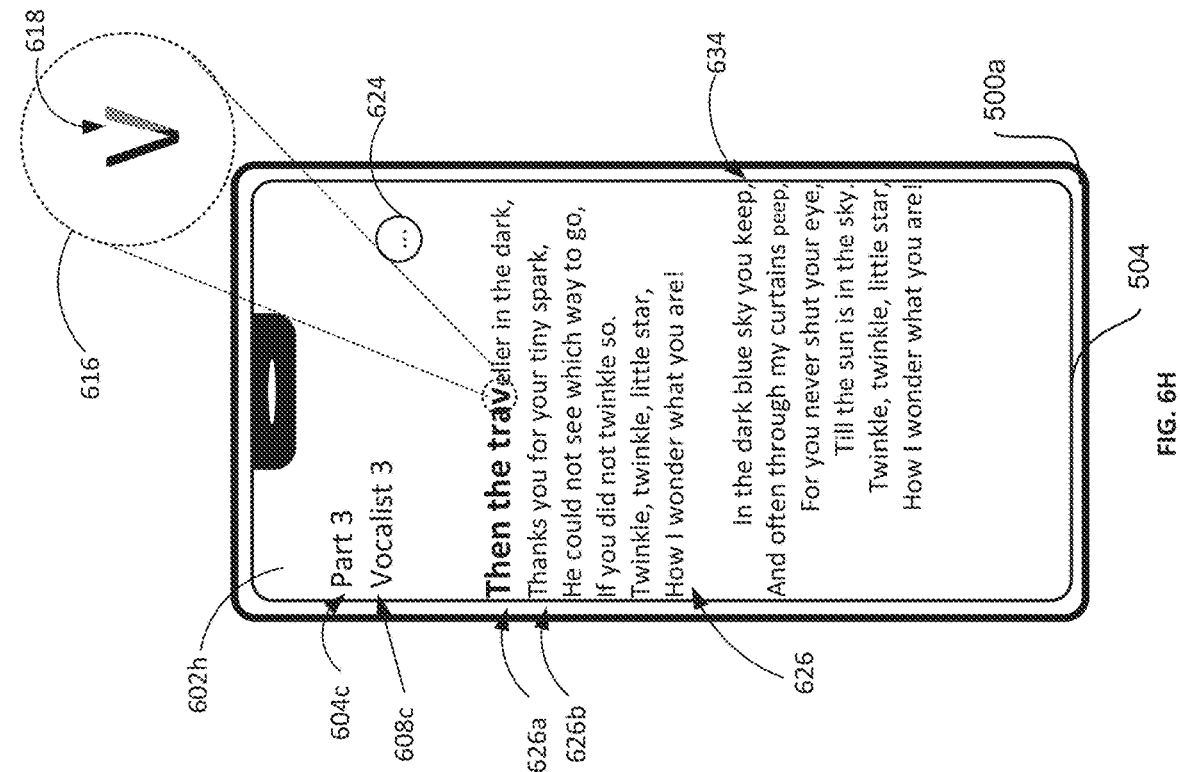
Figure 6G:
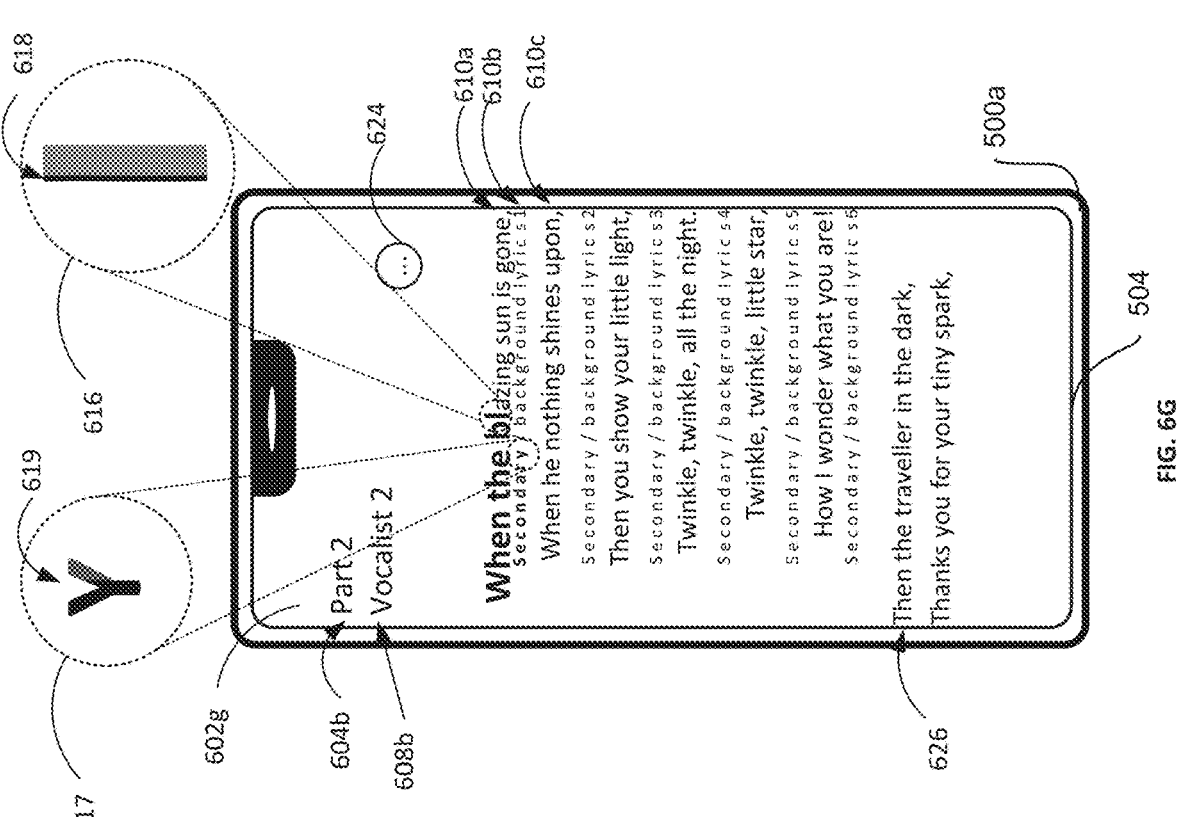

FIG. 6H illustrates an example of electronic device 500a displaying lyrics user interface 602h after playback of the portion of the song that is time-synced with the last line of the second part of lyrics 610 of FIG. 6B. For example, as the electronic device 500a plays the song (e.g., the content item described below with reference to the method 700), the electronic device 500a optionally scrolls (e.g., automatically) the time-synced lyrics of the song, including the first lyrics part 606 of FIG. 6B and the second lyrics part 610 of FIG. 6B, arriving at the third lyrics part 626 in FIG. 6H, such that the line 626a enters the focus line when playback is time synced with the line 606a.

In FIG. 6H, the lyrics user interface 602h includes, among other things, the third lyrics part 626, a fourth lyrics part 634, an indication 604c that a third part of the song is in playback and an indication 608c that the third lyrics part 626 is associated with a third performer (e.g., a third vocalist of primary lyrics). In some embodiments, one or both of the indications 604c and 608c are displayed before playback of the portion of the song time-synced with the lyrics of the third lyrics part 626 is in playback, such as during playback of the last line of lyrics of the second lyrics part 610 of FIG. 6B; such embodiments are described further below with reference to method 700.

In FIG. 6H, the third lyrics part 626 is displayed left-aligned (e.g., displayed with the first visual characteristic having the first value) and the fourth lyrics part 634 is displayed right-aligned (e.g., displayed with the first visual characteristic having the second value). The alignment of the third lyrics part 626 of FIG. 6H is different from the alignment of the second lyrics part 610 of FIG. 6B optionally because the performer of the second lyrics part 610 (e.g., the performer of the primary lyrics of second lyrics part 610) is different than the performer of the third lyrics part 626 (e.g., the performer of the primary lyrics lines 626a and 626b). As such, the electronic device 500a optionally changes the alignment of the lyrics (e.g., does not display the upcoming lyrics part with the same alignment as the current lyrics part) in response to detecting upcoming playback of a portion of the song that is time-synced with lyrics associated with a different performer than a current performer, optionally independent of an identity of any specific performer. For example, if the performer of the third lyrics part 626 is the same as the performer of the first lyrics part 606, and the performer of the second lyrics part 610 is different, the electronic device optionally will display the third lyrics part 626 with a different alignment that the second lyrics part 610. After playback of the portion of the song time-synced with the lyrics of the third lyrics part 626, the electronic device 500a displays the lyrics user interface 602i of FIG. 6I described below.

Figure 6J:
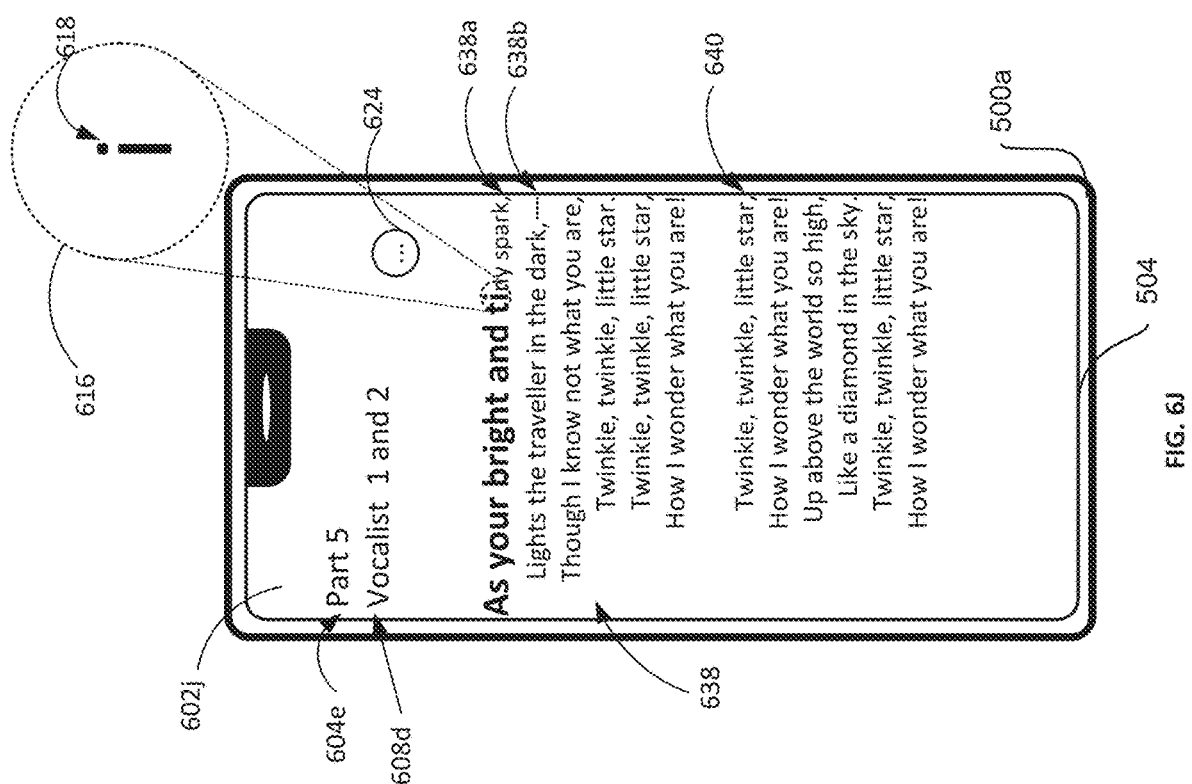
Figure 6I:
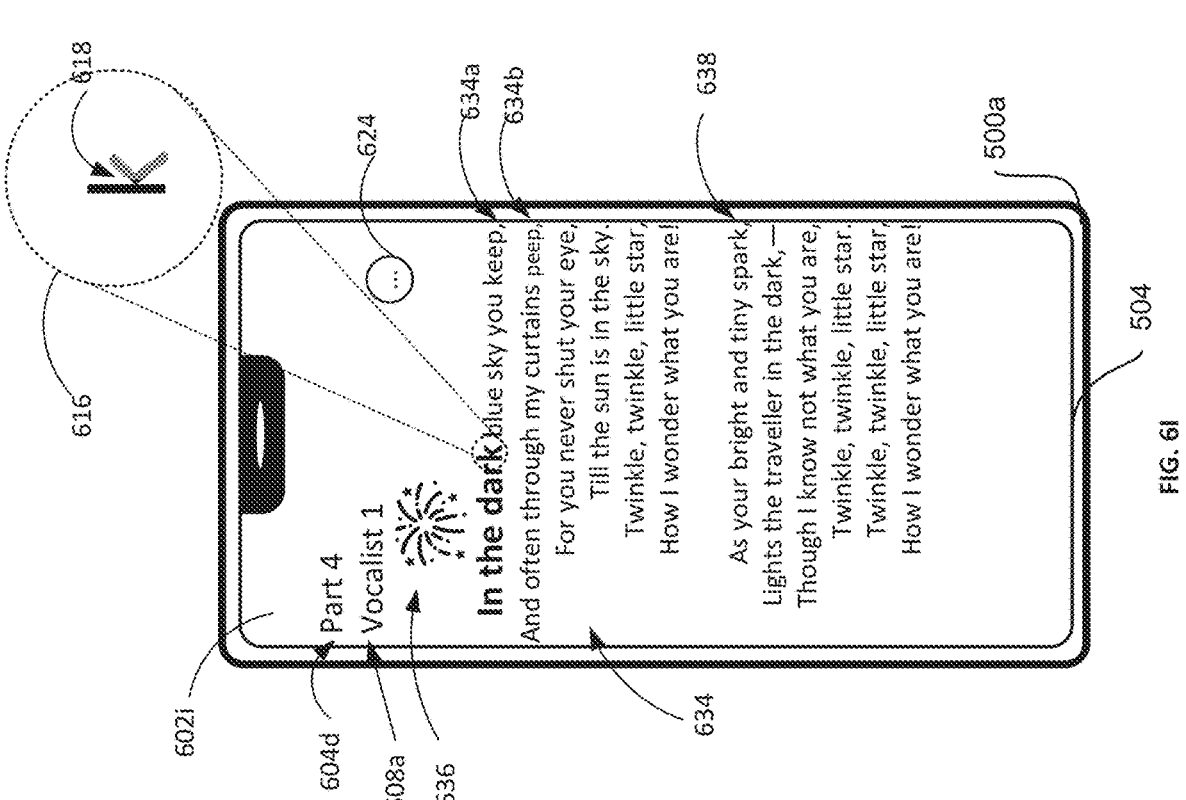

FIG. 6I illustrates an example of an electronic device 500a displaying a lyrics user interface 602i including an animation 636 (described in more detail below) corresponding to the time-synced lyrics. The electronic device 500a optionally displays lyrics user interface 602h in FIG. 6I after playback of the portion of the song that is time-synced with the last line of the third lyrics part 626 of FIG. 6H. For example, as the electronic device 500a plays the song (e.g., the content item described below with reference to the method 700), the electronic device 500a scrolls (e.g., automatically) the time-synced lyrics of the song, including the third lyrics part 626 of FIG. 6H, arriving at the fourth lyrics part 634b, such that the line 634a enters the focus line when playback of the song is time-synced with the line 634a.

In some embodiments, a particular appearance with which the electronic device 500a displays parts of lyrics is optionally not assigned to any particular performer. In FIG. 6I, the lyrics user interface 602h includes, among other things, the fourth lyrics part 634, an indication 604c that a fourth part of the song is in playback and the indication 608a that the fourth lyrics part 634 is associated with the first performer (e.g., the performer of primary lyrics), which for example, is the same performer of the first lyrics part 606 of FIG. 6A. Looking again at FIG. 6A, the first performer in FIG. 6A, as indicated by the indication 608a of FIG. 6A, is associated with the first lyrics part 606, which are left-aligned (e.g., displayed with the first visual characteristic having the first value). Returning to FIG. 6I, the first performer in FIG. 6A, as indicated by the indication 608a of FIG. 6A, is likewise associated with the fourth lyrics part 634, which is right-aligned (e.g., displayed with the first visual characteristic having the second value). Accordingly, in some embodiments, a particular value of the first visual characteristic is optionally not assigned to any particular performer. Rather, in some embodiments, the electronic device 500*a* optionally changes a value of the first visual characteristic in response to detecting a change in performer of lyrics, such as illustrated with the change in performers and corresponding changes in values of the first visual characteristic at which the various lyrics parts are displayed in FIGS. 6A-6I.

The lyrics user interface 602*i* of FIG. 6I also includes an animation 636 and a fifth lyrics part 638. The electronic device 500*a* optionally displays the animation 636 (optionally to increase in visual prominence a specific word in the line of lyrics) in response to a determination that the portion of the content item that is associated with the specific word satisfied one or more criteria. For example, electronic device 500*a* optionally displays the animation 636 in response to a determination that the portion of the content item that is associated with the word "dark" of the lyrics is larger than a threshold portion (e.g., a threshold data size) and/or that playback of the portion of the content item that is associated with the word "dark" of the lyrics will exceed or has exceeded a threshold time (e.g., 0.3, 0.5, 1, 2, 3, 5, 10, 20, or 30 seconds, or another time threshold). As shown in FIG. 6I, the animation 636 includes an animated firework, though other animations can be used without departing from the scope of the disclosure. Further details regarding the animation 636, including other possible types of animations, are discussed below with reference to the method 700. The fifth lyrics part 638 is displayed right-aligned and is discussed further below with reference to FIG. 6J.

FIG. 6J illustrates an example of an electronic device 500*a* displaying a lyrics user interface 602*j* including time-synchronized lyrics lines 638*a* and 638*b* associated with multiple performers. The lyrics user interface 602*j* is optionally displayed after playback of the song that is time-synced with the last line of the fourth lyrics part 634 of FIG. 6I. For example, as the electronic device 500*a* plays the song (e.g., the content item described below with reference to the method 700), the electronic device 500*a* scrolls (e.g., automatically) the time-synced lyrics of the song, including the fourth lyrics part 634 of FIG. 6I, arriving at the fifth lyrics part 638, such that the line 638*a* enters the focus line when playback of the song is time-synced with the line 638*a*.

In FIG. 6J, the lyrics user interface 602*j* includes, among other things, a sixth lyrics part 640, the fifth lyrics part 638, an indication 604*e* that a fifth part of the song (e.g., associated with the fifth lyrics part 638) is in playback, and the indication 608*d* that the fifth lyrics part 638 is associated with multiple performers (e.g., more than one performer is associated with the primary lyrics of the fifth lyrics part 638 or vocalist 1 and vocalist 2 are simultaneously performing the same lyrics of the fifth lyrics part 638). Specifically, the multiple performers of the fifth lyrics part 638 include the first performer (e.g., the first vocalist), such as indicated by the indication 608*a* of FIG. 6I and the second performer (e.g., the second vocalist), such as indicated by the indication 608*b* of FIG. 6D.

In some embodiments, the electronic device 500*a* displays the fifth lyrics part 638 with the same alignment as the fourth lyrics part 634 illustrated in FIG. 6I, optionally because the fifth lyrics part 638 and the fourth lyrics part 634 share a common performer. More particularly, the fifth lyrics part 638 of FIG. 6J, which is (at least in part) associated with the first performer, is right-aligned (e.g., displayed with the first visual characteristic having the second value) just like the fourth lyrics part 634 of FIG. 6I, which is likewise associated with the first performer is likewise right-aligned. In some embodiments, the electronic device 500*a* displays a lyrics part with a different value of the first visual characteristic when any part of a set of performers of an adjacent lyrics part is different from an immediately displayed previous lyrics part. Further details regarding operations of the electronic device 500*a* involving multiple performers of a lyrics part are described below with reference to method 700.

Figure 6K:
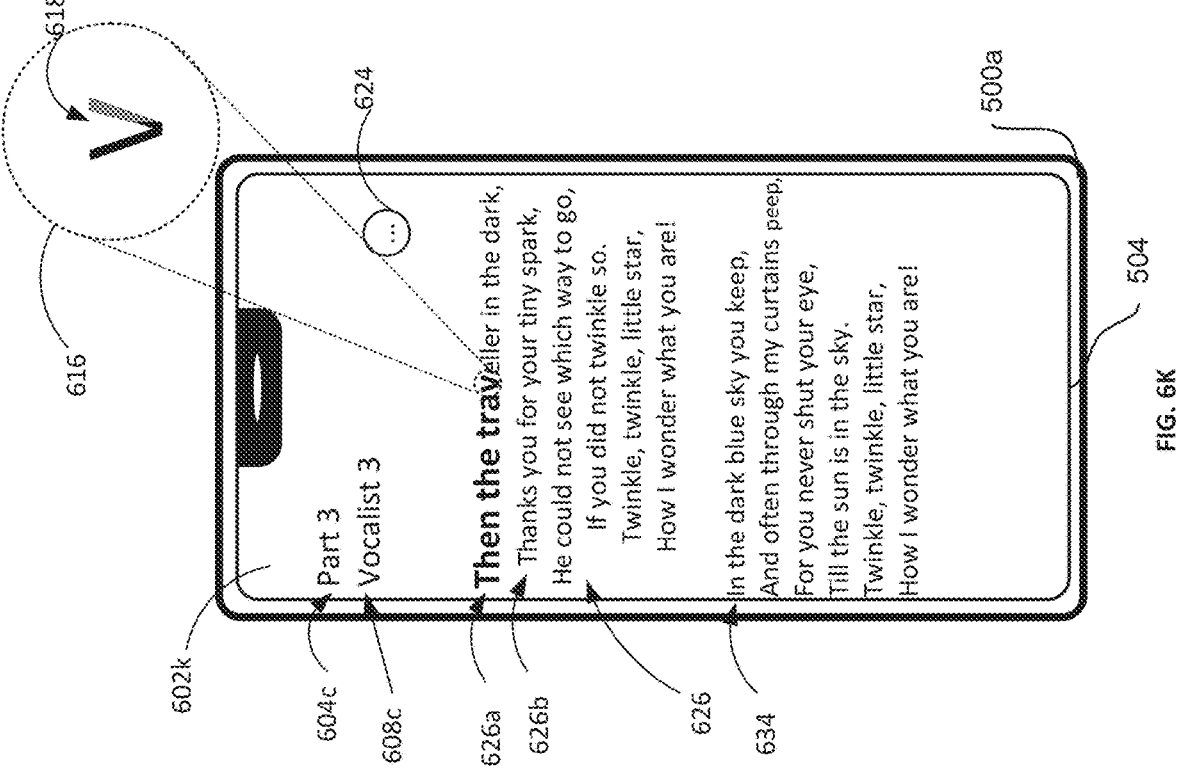

In some embodiments, a particular value of the first visual characteristic, different from a color characteristic, is optionally assigned to performers, such as illustrated in FIGS. 6A and 6K. In an example, in FIG. 6A, the first lyrics part 606 is displayed left-aligned optionally because of its association with the first performer indicated by the indication 608*a*, and in FIG. 6K, the fourth lyrics part 634 in lyrics user interface 602*k* is displayed left-aligned optionally because of its association with the first performer, as revealed by the indication 608*a* of FIG. 6I. Such embodiments are further described below with reference to the method 700.

Further, in some embodiments, a particular value of the first visual characteristic, different from a color characteristic, is optionally assigned to no more than one performer, such as illustrated in FIGS. 6A and 6K. In an example, in FIG. 6A, the first lyrics part 606 is displayed left-aligned optionally because of its association with the first performer indicated by the indication 608*a*, the second lyrics part 610 is displayed right-aligned optionally because of its association with the second performer, and in FIG. 6K, the third lyrics part 626 is displayed center-aligned optionally because of its association with the third performer, as revealed by the indication 608*c* of FIG. 6K. Such embodiments are further described below with reference to the method 700.

FIG. 7 is a flow diagram illustrating a method of changing a value of a first visual characteristic with which lyrics are displayed in response to detecting a change in a performer of lyrics associated with a song in accordance with some embodiments of the disclosure. The method 700 is optionally performed at electronic devices such as device 100, device 300, device 500, device 500*a*, and/or device 500*b*, such as described above with reference to FIGS. 1A-1B, 2-3, 4A-4B and 5A-5C. Some operations in method 700 are, optionally combined and/or order of some operations is, optionally, changed.

As described below, the method 700 provides ways in which electronic devices display time-synced lyrics with different values for a first visual characteristic with which lyrics are displayed in response to detecting a change in a performer associated with lyrics of a song. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component. For example, the electronic device is optionally a mobile device (e.g., a tablet, a smartphone, a media player, or a wearable device) including wired and/or wireless communication circuitry. The one or more input devices optionally includes a mouse (e.g., external), a trackpad (optionally integrated or external), a touchpad (optionally integrated or external), remote control device (e.g., external), another mobile device (e.g., separate from the electronic device), a handheld device (e.g., external), a controller (e.g., external), and/or a touch screen. a computer including. The display generation component is optionally a display integrated with the electronic device (optionally a touch screen display), external display such as a monitor, projector, television, or a hardware component (optionally integrated or external) for projecting a user interface or causing a user interface to be visible to one or more users. In some embodiments, the display is integrated with the electronic device as a touch screen display that includes a touch sensitive surface. The electronic device is optionally a set-top box in communication with a display and a remote control device or a computer including one or more of a keyboard, mouse, trackpad, and touch screen, and optionally in communication with a display.

In some embodiments, while playing a first portion of a content item (702*a*), such as shown by the indication 604*a* of FIG. 6A, which optionally includes playback of the instrumental content and/or non-verbal content associated with a first part of a song (or video that optionally includes or does not include audio, or another type of content item), while optionally playing verbal content at a default volume level, an attenuated vocal volume level, or without playing verbal content of the song, such as in a karaoke experience, even if the song does or does not include verbal content (e.g., the first portion is optionally instrumental content and/or non-verbal content associated with a first part of a song that optionally includes verbal (e.g., vocal) content), in accordance with a determination that the first portion of the content item is associated with (e.g., time-synced with) first verbal content (e.g., a first portion of lyrics of a song) associated with a first performer (702*b*), such as shown by the indication 604*a* associated with the first lyrics part 606 associated with the indication 608*a* of FIG. 6A, (e.g., associated with a first user of the electronic device, such as a first user in a karaoke experience, and/or a first singer or vocalist associated with the content item, such as a first original vocalist of the content item whose vocals are optionally used for the first verbal content), optionally including a determination that the first portion of the content item, which optionally includes first instrumental content, non-verbal content, and/or faint background verbal content (e.g., a first part of an instrumental version of a song), maps to first verbal content of a first performer of the content item or to first verbal content of a first performer of a second content item, different from the content item, that includes the first verbal content, in addition to the first instrumental content, non-verbal content, and/or faint background verbal content of the content item (e.g., maps to first vocals of the second content item that is a version of the song that includes the vocals of the song)), the electronic device displays (702*c*), via the display generation component, one or more first lines of text representations of verbal content (e.g., one or more lines of the first portion of lyrics, optionally including text representations of punctuation symbols associated with the first portion of lyrics, such as commas, periods, exclamation points, and other punctuation symbols) associated with the first portion of the content item with one or more first colors and a first visual characteristic having a first value, such as shown by the first lyrics part 606 of FIG. 6A having a left alignment of text, wherein the first visual characteristic is different from the one or more first colors.

The content item is optionally a song that includes instrumental content and/or non-verbal content associated with verbal content. Playing the first portion optionally includes playback of the instrumental content and/or non-verbal content associated with the first part of the song, while playing the verbal content at a default volume level, an attenuated vocal volume level or without playing the verbal content of the song. In some embodiments, the content item includes instrumental content and/or non-verbal content, without including any verbal content (e.g., instrumental version of a song that includes verbal content). In some embodiments, the verbal content corresponds to lyrics that include words and/or text that are the words included in the verbal content of the content item. In some embodiments, the content item is video content that includes audio.

In some embodiments, the first verbal content associated with the first performer is a first portion of a song sung by the first performer. In some embodiments, playback of the content item includes playback of the first performer singing the first verbal content. In some embodiments, playback of the content item does not include playback of the first performer singing the first verbal content. For example, the electronic device optionally reduces or mutes the playback volume of the vocal part of the first portion of the content item in accordance with one or more steps of method 900.

The one or more first lines of text representations of verbal content are optionally lyrics. Specifically, the display generation component optionally displays lyrics associated with the first portion of the content item. The first portion of the content item is optionally content(s) of a song within a specific time period of playback of content item. For example, the content item is optionally a 4 minute song. The first portion is optionally the contents of the song within the first 30 seconds of the song, the contents of the song within the first 2 minutes of the song, or the contents of the song within the time period between the time position of 2 minute to 2 minutes and 28 seconds within the song. The first portion is optionally a line (or lines) in the song, and the song optionally includes a plurality of lines of lyrics in which a first line of lyrics of the plurality of lines of lyrics includes a first time duration and/or a first number of words and a second line of lyrics of the plurality of lines of lyrics includes a second time duration and/or a second number of words, optionally different from the first time duration and/or first number of words.

The first visual characteristic is optionally a type of alignment of the one or more first lines of lyrics on the display generation component and/or relative to each other, a font style, text styling (e.g., bold, italic, strikethrough, and/or underline) text size, translucency, and/or placement, or any other visual characteristic other than color. For example, the first visual characteristic having the first value is optionally a left—alignment on the display. In such a case, the one or more first lines of lyrics are optionally aligned left on the display generation component (e.g., in a user interface) and/or relative to each other.

In some embodiments, while playing a second portion of the content item (702*d*), such as shown by the indication 604*b* of FIG. 6D, (which optionally includes playback of the instrumental content and/or non-verbal content associated with a second part of the song, while playing the verbal content at a default volume level, an attenuated vocal volume level, or without playing the verbal content of the song, such as in the karaoke experience, even if the song does or does not include verbal content), different from the first portion of the content item, wherein the second portion of the content item is associated with (e.g., time-synced with) second verbal content, such as shown by the second lyrics part 610 of FIG. 6D, (e.g., the second portion of the content item, which optionally includes second instrumental content, non-verbal content, and/or faint background verbal content (e.g., a second part of the instrumental version of the song), optionally maps to second verbal content of a performer of the content item or to second verbal content of a performer of the second content item that includes the second verbal content, in addition to the second instrumental content, non-verbal content, and/or faint background verbal content of the content item (e.g., maps to second vocals of the second content item that is the version of the song that includes the vocals of the song)), in accordance with a determination that the second verbal content is associated with the first performer (702e) (e.g., associated with the first user of the electronic device, such as the first user in the karaoke experience, and/or a first singer or vocalist associated with the content item, such as the first original vocalist of the content item whose vocals are optionally used for the first verbal content), optionally including a determination that the second verbal content is of the first performer of the content item or of the first performer of the second content item, as discussed above, including the second verbal content, optionally in addition to the second instrumental content, non-verbal content, and/or faint background verbal content of the content item (e.g., maps to second vocals of the second content item that is the version of the song that includes the vocals of the song), the electronic device displays (702f), via the display generation component, one or more second lines of text representations of the second verbal content (e.g., second lyrics) with the one or more first colors and the first visual characteristic having the first value. For example, if the second lyrics part 610 of FIG. 6D was associated with the vocalist indicated by the indication 608a of FIG. 6A instead of the vocalist indicated by the indication 608b of FIG. 6D, the electronic device would display the second lyrics part 610 having a left alignment of text. In some embodiments, the second verbal content associated with the first performer is a second portion of the song sung by the first performer. In some embodiments, playback of the content item includes playback of the first performer singing the second verbal content. In some embodiments, playback of the content item does not include playback of the first performer singing the second verbal content. For example, the electronic device optionally reduces the playback volume of the vocal part of the second portion of the content item in accordance with one or more steps of method 900.

In some embodiments, while playing the second portion of the content item (702d), such as shown by the indication 604b of FIG. 6D, and in accordance with a determination that the second verbal content is associated with a second performer (e.g., associated with a second user of the electronic device, such as a second user in the karaoke experience, and/or a second singer or vocalist associated with the content item, such as a second original vocalist of the content item whose vocals are optionally used for the second verbal content), different from the first performer (702g), such as shown by the indication 608b of FIG. 6D, optionally including a determination that the second verbal content is of a second performer of the content item or of a second performer of the second content item, as discussed above, including the second verbal content, optionally in addition to the second instrumental content, non-verbal content, and/or faint background verbal content of the content item (e.g., maps to second vocals of the second content item that is the version of the song that includes the vocals of the song), the electronic device displays (702h), via the display generation component, the one or more second lines of text representations of the second verbal content (e.g., one or more second lines of lyrics, optionally including text representations of punctuation symbols associated with the first portion of lyrics, such as commas, periods, exclamation points, and other punctuation symbols, second lyrics performed by a different performer composition than the performer composition of the first lyrics) with one or more second colors (that are optionally different from or the same as the one or more first colors) and the first visual characteristic having a second value that is different from the first value, such as shown by the second lyrics part 606 of FIGS. 6A and 6D having a right alignment of text. In some embodiments, the second verbal content associated with the second performer is a portion of a song sung by the second performer. In some embodiments, playback of the content item includes playback of the second performer singing the second verbal content. In some embodiments, playback of the content item does not include playback of the second performer singing the second verbal content. For example, the electronic device reduces the playback volume of the vocal part of the second portion of the content item in accordance with one or more steps of method 900.)

The first visual characteristic having the second value is optionally an alignment, a font style, text styling (e.g., bold, italic, strikethrough, and/or underline) text size, translucency, and/or placement, that is different from the first visual characteristic of the one or more first lines of lyrics having the first value, or any other visual characteristic other than color. For example, when the first visual characteristic having the first value is a left-alignment, the first visual characteristic having the second value is optionally a right-alignment or another alignment different from the left-alignment.

In some embodiments, the display generation component displays the one or more second lines of lyrics associated with the second portion of the content item while playing the first portion of the content item. As such, one or more of the one or more first lyrics are displayed on the display generation component concurrent with the display of the one or more second lines of lyrics. It should be noted that the term "of", as used herein, includes the meaning of "associated with". For example, a vocal part of a first performer of a song includes the vocals of the first performer and the vocals of the first performer, as computer-modified such as computer-modified with AUTO-TUNE technology. In some embodiments, as the electronic device plays the content item and displays text corresponding to verbal content associated with the content item, the electronic device changes the value of the first visual characteristic in accordance with the performer associated with a respective portion of the content item changing as playback continues.

In some embodiments, the content item includes instrumental content and/or non-verbal content, without including any verbal content (e.g., instrumental version of a song that includes verbal content). In some embodiments, the verbal content corresponds to lyrics that include words and/or text that are the words included in the verbal content of the content item. In some embodiments, the content item is video content that includes audio.

Displaying lyrics associated with a portion of a content item with distinct characteristics enables a user to determine which lyrics are being sung by which vocalist, thereby reducing errors in karaoke performances and in vocalist association, and reducing inputs to correct such errors.

In some embodiments, while playing a third portion of the content item (which optionally includes playback of the instrumental content and/or non-verbal content associated with a third part of the content item, while playing the verbal content at a default volume level, an attenuated vocal volume level, or without playing the verbal content of the song, such as in the karaoke experience, even if the content item does or does not include verbal content) associated with (e.g., time-synced with) third verbal content, wherein the third portion is different from the first portion and the second portion, such as shown by the indication 604c of FIG. 6K, and in accordance with a determination that the third verbal content is associated with a third performer, such as shown by the indication 604c associated with the third lyrics part 626 associated with the indication 608c of FIG. 6K, (e.g., associated with a third user of the electronic device, such as a third user in a karaoke experience, and/or a third singer or vocalist associated with the content item, such as a third original vocalist of the content item whose vocals are optionally used for the third verbal content), different from the first performer and the second performer, optionally including a determination that the third verbal content is of the third performer of the content item or of a third performer of the second content item, as discussed above with reference to step(s) 702, including the third verbal content, optionally in addition to the third instrumental content, non-verbal content, and/or faint background verbal content of the content item (e.g., maps to third vocals of the second content item that is the version of the content item that includes the vocals of the content item), the electronic device displays, via the display generation component, one or more third lines of text representations of the third verbal content (e.g., one or more lines of the third portion of lyrics, optionally including text representations of punctuation symbols associated with the first portion of lyrics, such as commas, periods, exclamation points, and other punctuation symbols) with one or more third colors (that are optionally different from or the same as the one or more first colors and/or the one or more second colors) and the first visual characteristic having a third value, different from the first value and the second value, such as shown by the third lyrics part 626 of FIG. 6K having a center alignment of text, which is different from the right and left alignment of text illustrated in FIG. 6A. The third value of the first visual characteristic optionally an alignment, a font style, text styling (e.g., bold, italic, strikethrough, and/or underline) text size, translucency, and/or placement, that is different from the first value and the second value of the first visual characteristic. For example, when the first visual characteristic having the first value corresponds to a left-alignment of lyrics and the first visual characteristic having the second value is corresponds to a right-alignment of lyrics, the first visual characteristic having the third value optionally corresponds to a center alignment or justified alignment of lyrics. Other combinations and aspects of the first visual characteristic, such as the first visual characteristic including a font style, text styling (e.g., bold, italic, strikethrough, and/or underline) text size, translucency, and/or placement, and values that are based on the first visual characteristic are contemplated and are possible. In some embodiments, the third portion of the content item associated with the third verbal content optionally includes third instrumental content, non-verbal content, and/or faint background verbal content (e.g., a third part of the instrumental version of the content item). In some embodiments, the third portion of the content item associated with the third verbal content optionally includes third verbal content of a performer of the content item or third verbal content of a performer of the second content item (discussed with reference to step(s) 702) that includes the third verbal content, in addition to the third instrumental content, non-verbal content, and/or faint third verbal content of the content item (e.g., maps to third vocals of the second content item that is the version of the content item that includes the vocals of the content item). In some embodiments, the third verbal content associated with the third performer is a portion of a content item sung by the third performer. In some embodiments, playback of the content item includes playback of the third performer singing the third verbal content. In some embodiments, playback of the content item does not include playback of the third performer singing the third verbal content. For example, the electronic device optionally reduces the playback volume of the third vocal part of the second portion of the content item in accordance with one or more steps of method 900. In some embodiments, if the content item includes four or more performers of respective vocal portions of respective parts of the content item, the electronic device displays the lyrics associated with the different respective performers with different respective values for the visual characteristic. Displaying lyrics associated with a portion of a content item with distinct characteristics enables a user to determine which lyrics are associated with which vocalist, thereby reducing errors in karaoke performances and in vocalist association, and reducing inputs to correct such errors.

In some embodiments, while playing a third portion of the content item associated with third verbal content, wherein the third portion is different from the first portion and the second portion, such as described above, such as shown in FIG. 6H with the indication 604c associated with the third lyrics part 626, in accordance with a determination that the third verbal content is associated with a third performer, different from the first performer and the second performer, such as described above, such as shown in FIG. 6H with the third lyrics part 626 being associated with the indication 608c, and the third portion of the content item is (e.g., immediately, such as the second portion not separated from the third portion by another performer and/or other verbal content) after the second portion of the content item, such as shown in FIG. 6D with the third lyrics part 626 being after the second lyrics part 610, the electronic device 500a displays, via the display generation component, one or more third lines of text representations of the third verbal content, such as described above, with one or more third colors (that are optionally different from or the same as the one or more first colors and/or the one or more second colors) and the first visual characteristic having the first value, such as shown in FIG. 6D with the third lyrics part 626 being left-aligned. For example, when the first visual characteristic having the first value corresponds to a right alignment or a first font type, the third lyrics are optionally displayed with a right alignment or the first font type. Other combinations and aspects of the first visual characteristic having the first value, such as the first visual characteristic including a font style, text styling (e.g., bold, italic, strikethrough, and/or underline) text size, translucency, and/or placement, and values that are based on the first visual characteristic are contemplated and are possible. In some embodiments, the electronic device changes the value of the first visual characteristic between the first and second values in accordance with the performer associated with a respective portion of the content item being different from the performer associated with the (e.g., immediate previous portion of the content item, such as not separated from the previous portion of the content item by another performer and/or other verbal content), optionally independently of which performers are associated with the respective portions of the content item. Displaying lyrics associated with a portion of a content item with distinct characteristics, such as binary characteristics that change based on a performer, enables a user to determine which lyrics are associated with which vocalist, thereby reducing errors in karaoke performances and in vocalist association, and reducing inputs to correct such errors.

In some embodiments, while playing a fourth portion of the content item, which optionally includes playback of the instrumental content and/or non-verbal content associated with a fourth part of a song (or video that optionally includes or does not include audio, or another type of content item), while optionally playing verbal content at a default volume level, an attenuated vocal volume level, or without playing verbal content of the song, such as in the karaoke experience, even if the song does or does not include verbal content, associated with (e.g., time-synchronized with) fourth verbal content (e.g., a first portion of lyrics of a song), such as shown in FIG. 6I with the indication 604*d* associated with the fourth lyrics part 634, wherein the fourth portion is different from the first portion, second portion, and the third portion, in accordance with a determination that the fourth verbal content is associated with the first performer such as shown in FIG. 6I with the fourth lyrics part 634 being associated with the indication 608*a*, (e.g., the first user of the electronic device, such as the first user in the karaoke experience, and/or first singer or vocalist associated with the content item, such as the first original vocalist of the content item whose vocals are optionally used for the first and fourth verbal content) and the fourth portion of the content item is (immediately, such as the third portion not separated from the fourth portion by another performer and/or other verbal content) after the third portion of the content item, such as shown in FIG. 6H with the fourth lyrics part 634 being after the third lyrics part 626, the electronic device displays, via the display generation component, one or more fourth lines of text representations of the fourth verbal content (e.g., one or more fourth lines of fourth lyrics, optionally including text representations of punctuation symbols associated with the fourth portion of lyrics, such as commas, periods, exclamation points, and other punctuation symbols) with one or more third colors (that are optionally different from or the same as the one or more first colors and/or the one or more second colors) and the first visual characteristic having the second value, such as shown in FIG. 6I with the third lyrics part 626 being right-aligned. In some embodiments, although the electronic device displayed the lyrics corresponding to the first portion of the content item associated with the first performer with the first visual characteristic having the first value, in accordance with a determination that the previous portion of the content item is associated with a performer different from the first performer and the lyrics associated with the previous portion of the content item are displayed with the first visual characteristic having the first value, the electronic device displays the fourth lyrics with the first visual characteristic having the second value. As used herein, time-synced and time-synchronized are used interchangeably. Displaying lyrics associated with a portion of a content item with distinct characteristics, such that lyrics associated with a performer is not necessarily assigned to any specific characteristic, enables a user to determine when lyrics are associated with different performers, determine which lyrics are associated with which performer, thereby reducing errors in karaoke performances and in vocalist association, and reducing inputs to correct such errors.

In some embodiments, the first visual characteristic having the first value includes a first alignment of one or more lines of text representations of corresponding verbal content (e.g., left alignment, center alignment, right alignment, or justify alignment of lyrics), such as shown in FIG. 6A with the alignment of the first lyrics part 606 being left-alignment and the first visual characteristic having the second value includes a second alignment of one or more lines of text representations of corresponding verbal content (e.g., left alignment, center alignment, right alignment, or justify alignment of lyrics), different from the first alignment, such as shown in FIG. 6A with the alignment of the second lyrics part 610 being right-alignment. Displaying portions of lyrics with different alignments enables a user to more easily determine which lyrics are associated with which performer, thereby reducing errors in karaoke performances and in vocalist association, and reducing inputs to correct such errors.

In some embodiments, while playing a third portion of the content item associated with third verbal content, wherein the third portion is different from the first portion and the second portion, such as described above, such as shown in FIG. 6J with the indication 604*c* associated with the fifth lyrics part 638, in accordance with a determination that the third verbal content is associated with at least two performers, such as shown in FIG. 6J with the indication 608*d* (e.g., associated with at least two users of the electronic device, such as the first and second user in the karaoke experience, and/or the first and second singer or vocalist associated with the content item, such as the first and second original vocalist of the content item whose vocals are optionally used for the third verbal content), optionally including or excluding the first performer and/or the second performer, optionally including a determination that the third verbal content is of the third performer of the content item or of a third performer of the second content item, as discussed above with reference to step(s) 702, including the third verbal content, optionally in addition to the third instrumental content, non-verbal content, and/or faint background verbal content of the content item (e.g., maps to third vocals of the second content item that is the version of the song that includes the vocals of the song), the electronic device displays, via the display generation component, one or more third lines of text representations of the third verbal content, such as described above, with one or more third colors (that are optionally different from or the same as the one or more first colors and/or the one or more second colors) and the first visual characteristic having the first value or the second value, such as shown in FIG. 6J with the fifth lyrics part 638 displayed right-aligned. As such, during playback of a portion of the content item that is time-synced with lyrics associated multiple performers, the first characteristic optionally has the first value or the second value. Displaying portions of lyrics performed by at least two performers with the first visual characteristic having the first value or the second value enables the users to more easily visually determine that a set of lyrics is to be performed by at least two performers, thereby reducing errors in karaoke performances and in vocalist association involving dual performers, and reducing inputs to correct such errors.

In some embodiments, a value of the first visual characteristic displayed with the one or more third lines of text representations of the third verbal content is based on a value of the first visual characteristic with which a respective line of text representations of verbal content associated with a respective portion of the content item (which is optionally the lyrics displayed immediately before display of the third lyrics, such as the lyrics not separated from the third lyrics by another performer and/or other verbal content) prior to the third portion of the content item is displayed. For example, in FIG. 6J, the electronic device optionally displays the fifth lyrics part 638 right-aligned because the fourth lyrics part 634 of FIG. 6I is displayed right-aligned. For example, when the second lines of text representations of verbal content associated with the second portion of the content item is displayed with the first visual characteristic having a respective value, the one or more third lines of text representations of verbal content are optionally displayed with the first visual characteristic having the respective value. In some embodiments, when the second lines of text representations of verbal content associated with the second portion of the content item is displayed with the first visual characteristic having a respective value, the one or more third lines of text representations of verbal content are optionally displayed with the first visual characteristic having a value that is different than the respective value. As such, the value of the first visual characteristic associated with one or more displayed lines of lyrics is optionally based on the value of the first visual characteristics associated with one or more previously displayed lines of lyrics. Basing a value of the first visual characteristic with which to display the third portion of lyrics performed by the at least two performers on a value of the first visual characteristic with which a second portion of lyrics are displayed enables the users to more easily determine when a set of lyrics is to be performed by at least two performers, thereby reducing errors in karaoke performances and in vocalist association involving dual performers, and reducing inputs to correct such errors.

In some embodiments, the one or more third lines of text representations of the third verbal content (e.g., the one or more third lines of the third portion of lyrics, optionally including text representations of punctuation symbols associated with the first portion of lyrics, such as commas, periods, exclamation points, and other punctuation symbols) are displayed with the first visual characteristic having a respective value that is independent of a value of the first visual characteristic with which a respective line of text representations of verbal content associated with a respective portion of the content item (which is optionally the lyrics displayed immediately before display of the third lyrics, such as the lyrics not separated from the third lyrics by another performer and/or other verbal content) prior to the third portion of the content item is displayed. For example, the electronic device optionally determines an alignment value with which to display the fifth lyrics part 638 of FIG. 6J without regard to alignment value of the fourth lyrics part 634 of FIG. 6I. For example, while a first song (e.g., a first content item) is playing, and the one or more first lines of first lyrics discussed above with reference to step(s) 702 are displayed with the first visual characteristic having the first value, such as a right alignment, and the one or more second lines of second lyrics discussed above with reference to step(s) 702 are displayed with the first visual characteristic having the second value, such as a left alignment, the one or more third lines of third lyrics are optionally displayed with the first visual characteristic having the first value. In another example, while the first song (e.g., the first content item) is playing, and the one or more first lines of first lyrics discussed above with reference to step(s) 702 are displayed with the first visual characteristic having the first value, such as a right alignment, and the one or more second lines of second lyrics discussed above with reference to step(s) 702 are displayed with the first visual characteristic having the second value, such as a left alignment, the one or more third lines of third lyrics are optionally displayed with the first visual characteristic having the second value. As such, the third portion of the lyrics are optionally displayed with the first visual characteristic having a value, independent of the value of the first visual characteristic of previously displayed portions of the lyrics. For example, in some embodiments, alignment of the one or more lines of lyrics is natural alignment (e.g., left aligned), without regard to the alignment of previously displayed one or more lines of lyrics. Determining a value of the first visual characteristic with which to display the one or more third lines of third lyrics independent of (or without regard to) a value of the first visual characteristic that a prior portion of the lyrics were displayed enables users to more easily determine when a set of lyrics is to be performed by at least two performers, thereby reducing errors in karaoke performances and in vocalist association involving dual performers, and reducing inputs to correct such errors.

In some embodiments, while playing a third portion of the content item, such as described above, associated with third verbal content and fourth verbal content (e.g., associated with primary and secondary vocals or lyrics (e.g., background/backup vocals)), such as shown in FIG. 6D with the third lyrics part 610 including line 610*a* and line 610*b*, wherein the third portion is different from the first portion and the second portion, in accordance with a determination that the third verbal content is of a first type (in the content item, such as a main or primary vocals or lyrics), such as shown in FIG. 6D with the line 610*a* being a part of main or primary lyrics, the electronic device displays, via the display generation component, one or more third lines of text representations of the third verbal content, such as described above, with one or more third colors (optionally similar or different from the one or more first and second colors) and a second visual characteristic different from the first visual characteristic and different from the one or more third colors having a first value, such as shown in FIG. 6D with the size of the lyrics of line 610*a*. For example, the second visual characteristic is optionally alignment, font style, text styling (e.g., bold, italic, strikethrough, and/or underline), font size, translucency, and/or placement, or another visual characteristic other than color and other than the first visual characteristic. The one or more third lines of lyrics optionally are displayed with the first visual characteristic having the first value and the second visual characteristic having the first value, simultaneously.

In some embodiments, while playing a third portion of the content item, such as described above, associated with third verbal content and fourth verbal content (e.g., associated with primary and secondary vocals or lyrics (e.g., background/backup vocals)), such as shown in FIG. 6D with the third lyrics part 610 including line 610*a* and line 610*b*, wherein the third portion is different from the first portion and the second portion, in accordance with a determination that the fourth verbal content is of a second type different from the first type (in the content item, such as background or backup vocals or lyrics),), such as shown in FIG. 6D with the line 610*b* being a part of backup/background lyrics.

The electronic device displays, via the display generation component, a fourth line of text representations of the fourth verbal content (e.g., one or more fourth lines of the fourth portion of lyrics, optionally including text representations of punctuation symbols associated with the fourth portion of lyrics, such as commas, periods, exclamation points, and other punctuation symbols) with one or more fourth colors and the second visual characteristic having a second value different from the first value, such as shown in FIG. 6D with the size of the lyrics of line 610*b*. The one or more third lines of lyrics optionally are displayed with the first visual characteristic having the first value and the second visual characteristic having the second value, simultaneously. In some embodiments, the one or more third lines of lyrics and the fourth line of lyrics are displayed concurrently with their respective appropriate first and second visual characteristics having appropriate values. In some embodiments, the second type of verbal content has lower priority than the first type of verbal content. For example, the first type of verbal content is a main vocal part and the second type of verbal content is a backup vocal part. For example, when the second visual characteristic is font size the third verbal content is of the first type, and the fourth verbal content is of the second type, the one or more third lines of lyrics are optionally displayed greater in font size than the one or more fourth lines of lyrics. In some embodiments, the electronic device ceases to display the fourth line of lyrics (associated with the fourth verbal content of the second type) when electronic device ceases to display third line of lyrics (associated with third verbal content of the first type) even if the time-synced portion of the content item that is associated with the fourth line of lyrics is still in playback In some embodiments, the method 700 alternatively or additionally includes the embodiments, features, and/or operations disclosed with reference to the third portion of the content item associated with the third verbal content and fourth verbal content. For example, a content item is optionally associated with main vocals associated with a first performer, without being associated with vocals associated with a performer than is different than the first performer. In this example, the content item optionally includes the third and fourth lyrics displayed similarly as discussed above. Displaying main and backup lyrics with different visual characteristics assists users with visually disambiguating between the main and backup lyrics, which likewise may enable users to determine which lyrics are associated with which performer, thereby reducing errors in karaoke performances and in vocalist association, and reducing inputs to correct such errors.

In some embodiments, the third verbal content having the first type has higher priority than the fourth verbal content having the second type (e.g., the third verbal content is primary vocals (e.g., main vocals) and the fourth verbal content is backup vocals), such as shown in FIG. 6D with the greater visual emphasis (e.g., size) of the text of the line 610a compared to the text of the line 610b. In some embodiments, in accordance with a determination that the one or more third lines of text representations of the third verbal content are displayed with the first visual characteristic having the first value, the fourth line of text representations of fourth verbal content is displayed with the first visual characteristic having the first value. For example, in FIG. 6D, if the electronic device displays the line 610a left-aligned, the electronic device optionally displays the line 610b left-aligned. In some embodiments, in accordance with a determination that the one or more third lines of text representations of the third verbal content are displayed with the first visual characteristic having the second value, the fourth line of text representations of fourth verbal content is displayed with the first visual characteristic having the second value (such as described with reference to step(s) 702), such as shown in FIG. 6D with the line 610a and line 610b having the same alignment value. As such, backup vocal lyrics are optionally displayed with the first visual characteristic having the value that corresponds to main lyrics. In some embodiments, in accordance with a determination that a performer associated with verbal content having the first type is also associated with verbal content having the second type, the fourth line of lyrics is optionally displayed with the first visual characteristic having the value that is different than the value of the first visual characteristic of the one or more third lines of lyrics. For example, if the second performer is associated with the third verbal content of the first type and the first performer is associated with the fourth verbal content of the second type, the value of the first visual characteristic for the fourth line of lyrics is different from the value of the first visual characteristic for the third lines of lyrics. In some embodiments, when a third performer different from the first performer and second performer, who is optionally a performer that performs backup vocals without performing primary vocals, is associated with the fourth verbal content, the value of the first visual characteristic for the fourth line of lyrics is equal to the value of the first visual characteristic for the third lines of lyrics. Displaying time-synced main and backup lyrics with similar visual characteristics assists users with visually disambiguating between the main and backup lyrics during playback of the lyrics, thereby reducing errors in karaoke performances and in vocalist association, and reducing inputs to correct such errors.

In some embodiments, the third lines of text representations of the third verbal content and the fourth line of text representations of fourth verbal content are displayed with the first visual characteristic having a respective value, such as shown in FIG. 6D with the line 610a and line 610b having the same alignment value. In some embodiments, the electronic device displays the third lines of lyrics (e.g., associated with a main vocal part) and the fourth lines of lyrics (e.g., associated with a backup vocal part) with the same value for the first visual characteristic. As such, in some embodiments, the electronic device does not change the value of the first visual characteristic when displaying backup/background lyrics, from the value of the visual characteristic with which the electronic device displays the primary/main lyrics. Displaying time-synced main and backup lyrics with similar visual characteristics assists users with visually disambiguating between the main and backup lyrics during playback of the lyrics, thereby reducing errors in karaoke performances and in vocalist association, and reducing inputs to correct such errors.

In some embodiments, in accordance with a determination that the third verbal content having the first type has higher priority than the fourth verbal content having the second type (e.g., the third verbal content is primary vocals and the fourth verbal content is backup vocals), the one or more third lines of text representations of the third verbal content are visually emphasized relative to the fourth line of text representations of the fourth verbal content, such as shown in FIG. 6D with the greater visual emphasis (e.g., size) of the text of the line 610a compared to the text of the line 610b. As such, the third lines of lyrics (e.g., of the main vocals) are optionally visually distinct from the fourth line of lyrics (e.g., of the backup/background vocals), such as via the third lines of lyrics having a larger font size than the fourth lines of lyrics, a more easily readable font (e.g., a different font), or another visual emphasis relative to the third lines of lyrics. In some embodiments, the fourth lines of lyrics are optionally emphasized if the fourth lines of lyrics are primary and the third lyrics are backup. Displaying time-synced main and backup lyrics with the main lyrics visually emphasized relative to the backup lyrics assists users with visually disambiguating between the main and backup lyrics during playback of the lyrics, thereby reducing errors in karaoke performances and in vocalist association that includes time-synced main and backup lyrics, and reducing inputs to correct such errors.

In some embodiments, while playing the second portion of the content item associated with the second verbal content, the electronic device displays the one or more second lines of text representations of the second verbal content (e.g., displaying second lines of lyrics in playback, about to play, and/or previously in playback, optionally concurrently with third lines of lyrics about to play after playback of the second lines of lyrics), such as shown in FIG. 6C with the first lyrics part 606. In some embodiments, while playing the second portion of the content item associated with the second verbal content, the electronic device foregoes displaying the fourth line of text representations of the fourth verbal content (e.g., background or backup lyrics), such as shown in FIG. 6C with the display of the second lyric part 610 not including backup/background lyrics. In some embodiments, while playing the third portion of the content item associated with the third verbal content and the fourth verbal content, the electronic device displays the one or more third lines of text representations of the third verbal content (e.g., displaying third lines of lyrics in playback, about to play, and/or previously in playback, optionally concurrently with fourth lines of lyrics about to play after playback of the third lines of lyrics)), such as shown in FIG. 6D with the display of the second lyric part 610 including main or primary lyrics (e.g., the line 610*a*). In some embodiments, while playing the third portion of the content item associated with the third verbal content and the fourth verbal content, the electronic device displays the fourth line of text representations of the fourth verbal content (e.g., background or backup lyrics), such as shown in FIG. 6D with the display of the second lyric part 610 including backup/background lyrics (e.g., the line 610*b*). In some embodiments, a focus line and or a line of lyrics that is in focus means that the line of lyrics that is currently in playback on the electronic device. In some embodiments, the background or backup lyrics are not displayed when primary lyrics time-synced together with the background or backup lyrics are not being displayed and/or are not in focus (e.g., playback of the content item time-synced with the primary lyrics is not occurring) on the display generation component. In some embodiments, respective backup lyrics are displayed the primary lyrics associated with the respective backup lyrics is in focus. For example, in some embodiments, when a first line of primary lyrics is in focus on the display generation component, a first line of backup lyrics associated with the first line of primary lyrics is also displayed, without a second line of backup lyrics associated with a second line of primary lyrics not currently in focus being concurrently displayed. As another example, when the second line of primary lyrics is in focus on the display generation component, the second line of backup lyrics associated with the second line of primary lyrics is also displayed, without the first line of backup lyrics not currently in focus being concurrently displayed. In some embodiments, when a first line of primary lyrics is in focus, multiple lines of backup lyrics are displayed, including a second line of backup lyrics not yet in focus. In some embodiments, the background or backup lyrics are displayed with corresponding primary lyrics whenever the corresponding primary lyrics are displayed. As such, while a first line of primary lyrics (e.g., corresponding to main vocals) is not in focus (e.g., not in playback), a line of secondary lyrics (e.g., corresponding to secondary vocals) are optionally not displayed. Once the first line of primary lyrics is in focus, the line of secondary lyrics are optionally displayed. Displaying a line of backup lyrics in accordance with a determination that a first line of primary lyrics is in focus and forgoing displaying the line of backup lyrics in accordance with a determination that the first line of primary lyrics is not in focus reduces clutter in the display of lyrics and assists users with disambiguation between the primary lyrics and the secondary lyrics when the first line of primary lyrics is in focus.

In some embodiments, displaying the fourth line of text representations of the fourth verbal content while playing the third portion of the content item associated with the third verbal content and the fourth verbal content, such as shown by the line 610*b* of FIG. 6D, includes displaying an animation of the fourth line of text representations of the fourth verbal content emerge from a region of display of the one or more third lines of text representations of the third verbal content (e.g., the third lyrics). For example, in FIG. 6D, the line 610*b* optionally animates from under the line 610*a*. For example, the animation is optionally a visual effect of the fourth lyrics animating from the region, so as to appear to grow, mature, or fold out underneath from the region into a separate line on the display generation component that is optionally below the primary line in focus. In some embodiments, the animation occurs when a line of lyrics goes into focus. In some embodiments, the animation occurs when a line of lyrics goes into focus, and does not occur when a line of lyrics is not yet in focus. Displaying the background/backup lyrics emerging from the region of display of the primary line of lyrics in focus reduces clutter of elements in the display of lyrics and assists users with visual disambiguation between the main and backup lyrics when the first line of primary lyrics is in focus, which may reduce errors in karaoke performances including main and backup lyrics.

In some embodiments, while playing the third portion of the content item associated with the third verbal content and the fourth verbal content and while displaying the one or more third lines of text representations of the third verbal content and the fourth line of text representations of the fourth verbal content, such as shown in FIG. 6D with the second lyrics part 610 including primary line 610*a* and backup/background line 610*b*, the electronic device detects, via one or more input devices in communication with the electronic device, an input for scrolling through the text representations of verbal content associated with portions of the content item, such as shown in FIG. 6D with the contact 630. The input optionally includes one or more aspects of the inputs described in this present disclosure, such as inputs detected via a touch-sensitive surface, finger inputs, or other types of inputs. In some embodiments, while playing the third portion of the content item associated with the third verbal content and the fourth verbal content and while displaying the one or more third lines of text representations of the third verbal content and the fourth line of text representations of the fourth verbal content, such as shown in FIG. 6D with the second lyrics part 610 including primary line 610*a* and backup/background line 610*b*, in response to detecting the input for scrolling through the text representations of verbal content of associated with portions of the content item, the electronic device ceases display of the fourth line of text representations of the fourth verbal content, such as shown in FIG. 6E with the cease of display of the line 610*b*. In some embodiments, while playing the third portion of the content item associated with the third verbal content and the fourth verbal content and while displaying the one or more third lines of text representations of the third verbal content and the fourth line of text representations of the fourth verbal content, in response to detecting the input for scrolling through the text representations of verbal content of associated with portions of the content item, the electronic device maintains display of the one or more third lines of text representations of the third verbal content, such as shown in FIG. 6E with the maintaining of display of the line 610*a* or 610*c* (e.g., at the same location or at a different location in the user interface at which the third lines of text representations of the third verbal content were displayed when the input was detected). In some embodiments, the operations include ceasing display of or hiding from the display all background or backup lyrics while maintaining display of the main lyrics (e.g., non-background or non-backup lyrics). In some embodiments, while maintaining display of the main lyrics includes displaying main lyrics without displaying the main lyrics displayed on the display when the input for scrolling was received. For example, in response to scrolling past the main lyrics displayed when the input for scrolling was received, the operations optionally include, displaying main lyrics that are after (or before) the main lyrics displayed when the input for scrolling was received. In some embodiments, while playing the third portion of the content item associated with the third verbal content and the fourth verbal content and while displaying the one or more third lines of text representations of the third verbal content and the fourth line of text representations of the fourth verbal content, in response to detecting the input for scrolling through the text representations of verbal content of associated with portions of the content item, the electronic device scrolls through the text representations of verbal content associated with the portions of the content item in accordance with the input for scrolling through the text representations of verbal content of associated with portions of the content item, such as shown in FIG. 6E with the scrolling forward operation in accordance with the movement of the input 630*g*. In some embodiments, the method 700 includes, continuing playback of the content item while scrolling occurs, without changing a playback speed in accordance with the scrolling operation. In some embodiments, the method 700 includes, in response to selecting a respective portion of the one or more third lines of text representations of verbal content, skipping to the respective portion of the content item. In some embodiments, the method 700 includes, after scrolling concludes, if selection is not received, displaying a portion of lyrics that is time-synchronized with the current portion of the content item that is in playback. In some embodiments, the method 700 includes, displaying background or backup lyrics time-synced with the portion of the content item in playback immediately after scrolling concludes, such as directly after scrolling concludes. As such, during the scrolling operation, the electronic device optionally ceases displaying the backup/background lyrics while maintaining display of the main lyrics throughout the scrolling operation. Ceasing display of backup lyrics and maintaining display of primary lyrics while scrolling through lyrics in accordance with the input for scrolling reduces clutter of elements in the display of lyrics and assists users with scrolling to a desired place in the lyrics, which may reduce errors in karaoke performances including main and backup lyrics.

In some embodiments, while playing the first portion of the content item, in accordance with a determination that the first portion of the content item is associated with a first part of the content item (e.g., the portion of the first lyrics corresponds to the intro, verse, pre-chorus, chorus, bridge, or outro), such as shown in FIG. 6A with the indication 604*a* corresponding to the first lyrics part 606, which is optionally in playback, the electronic device displays an indication of the first part of the content item concurrently with display of the one or more first lines of text representations of verbal content (e.g., displaying "Intro", "Verse", Pre-chorus", "Chorus", "Bridge", or "Outro", corresponding to the playback of the portion of the song corresponding to the portion of the first lyrics). In some embodiments, while playing the first portion of the content item, in accordance with a determination that the first portion of the content item is associated with a second part of the content item, the electronic device displays an indication of the second part of the content item concurrently with display of the one or more first lines of text representations of verbal content. For example, in FIG. 6C, the electronic device optionally displays the indication 604*b* of FIG. 6D corresponding to the second lyrics part 610 instead of the indication 604*a* of FIG. 6C, while playback of the content item associated with the first lyrics part 606 is still in playback (e.g., a last line of the first lyrics part 606 is still in the focus line). Additionally, or alternatively, in some embodiments, the method 700 includes displaying a name associated with the content item (e.g., a song name) and/or name(s) of performer(s) of the content item concurrently with display of the lyrics (and the indication of the part of the content item associated with the first portion of the content item). As such, indications of the part of the content item are concurrently displayed with the lyrics. In some embodiments, the indication also includes names of performers who perform the part of the song, such as the first performer or the second performer. In some embodiments, the indication is displayed before the portion of the content item corresponding to the indication is in playback. In some embodiments, the operations include displaying an indication of the first part before the first portion of the content time is in playback. In some embodiments, the operations include displaying an indication of the second part before the second portion of the content time is in playback, optionally including ceasing to display the indication of the first part while playback of the first part is current and in response to satisfaction of one or more criteria, optionally a criterion that is satisfied when a threshold amount of time (e.g., 0.2 s, 0.6 s, 1.2 s, 5 s, or 10 s) until playback of the second part being in playback is reached. Displaying the indication of the part of the content item concurrent with display of lyrics corresponding to the part assists the user in knowing which part of the content item is currently in playback, which may reduce errors in karaoke performances.

In some embodiments, while playing a respective portion of the content item and while displaying one or more respective lines of text representations of respective verbal content associated with the respective portion of the content item, such as shown by the first lyrics part 606 of FIG. 6A, the electronic device displays a color gradient (e.g., a color differential and/or highlight differential (e.g., at the color differential and/or highlight differential, a first side of the color differential and/or highlight differential optionally includes a first color (or a first shade of the first color) or is highlighted and a second side of the color differential and/or highlight differential optionally includes a second color (or a second shade of the first color) or is not highlighted) at a first location between a first portion of a respective word and a second portion of the respective word (e.g., between a first portion (e.g., within a letter and/or between letters) of a respective word and a second portion of the respective word) in a respective line of the one or more respective lines of text representations of respective verbal content, such as shown in FIG. 6A with the color gradient 618. In some embodiments, the color gradient corresponds to a portion of the content item that the electronic device has played or is playing and a portion of the content item that the electronic device has not yet played. For example, the electronic device has played or is playing a portion of the content item corresponding to the first portion of the respective word and has not yet played the portion of the content item corresponding to the second portion of the respective word. In some embodiments, additionally or alternatively, the operations performed with reference to the color gradient are performed with reference to another visual characteristic gradient, such as an alignment gradient, font style gradient, text styling gradient (e.g., bold, italic, strikethrough, and/or underline), font size gradient, translucency gradient, and/or placement gradient. In some embodiments, while playing a respective portion of the content item and while displaying one or more respective lines of text representations of respective verbal content associated with the respective portion of the content item, the electronic device visually moves the color gradient from the first location between the first portion and the second portion of the respective word to a second location between a third portion of the respective word and a fourth portion of the respective word, wherein the second location is different from the first location, such as shown between FIGS. 6A and 6B with the movement of the color gradient 618 on the letter "n" of the word "twinkle". In some embodiments, the electronic device moves the color gradient from the first location to the second location to provide a visual demonstration of the rhythm of the song. In some embodiments, the content item includes timestamps for the beginning and end of each syllable in the song, which the electronic device optionally uses to generate the speed of the color gradient for the procession of the color gradient on the line of lyrics. In some embodiments, the electronic device visually moves the color gradient horizontally, vertically, or a combination thereof. In some embodiments, the electronic device anchors the color gradient to the focus line (e.g., the line of lyrics that is currently in playback on the electronic device), such that the color gradient moves along a first portion of the display generation component that includes the display area of the focus line and not along a second portion of the display generation component that does not include the focus line. In some embodiments, the color gradient begins at a first side of the focus line corresponding to a first text representation of verbal content and then proceeds to a second side of the focus line corresponding to another text representation of verbal content. In some embodiments, the method 700 includes, when the color gradient reaches the second side, displaying the color gradient at the first side of the focus line, and shifting the line of lyrics in the focus line, such that a next line of lyrics is displayed in the focus line, different than the line of lyrics. Visually moving the color gradient from the first location to the second location may assist performers with engaging in the karaoke experience, and further, may reduce errors in interaction with the karaoke user interface.

In some embodiments, visually moving the color gradient from the first location between the first portion of the respective word and the second portion of the respective word to the second location between the third portion of the respective word and the fourth portion of the respective word is performed in accordance with a time duration of playback of at least a part of the respective portion of the content item associated with a syllable of the respective word. For example, movement of the color gradient 618 on the letter "n" of the word "twinkle" between FIGS. 6A and 6B optionally occurs in accordance with a time duration of playback of at least a part of the respective portion of the content item that is associated with the first syllable of the word "twinkle". In some embodiments, the first location corresponds to the beginning of the syllable and the second location corresponds to the end of the syllable, and moving the color gradient in a time-synchronized manner with the playback of the content item includes moving the color gradient from the first location to the second location at a speed corresponding to the speed at which the electronic device plays the portion of the content item corresponding to the syllable. In some embodiments, an inverse relationship exists between the movement of the color gradient and the time duration of playback such as described in detail below. In some embodiments, the respective word additionally or alternatively includes punctuation and/or grammatical symbols (e.g., textual or grammatical indications) that represent the flow of the lyrics during playback of the content item. Visually moving the color gradient in accordance with a time duration of playback of a portion of the content item associated with a syllable of assists users in karaoke performances by showing where current playback of the content item corresponds to in the displayed lyrics, and thus, reduces errors in karaoke performances.

In some embodiments, while the time duration of the playback of the respective portion of the content associated with the syllable of the respective word is a first time duration, a rate of movement of the color gradient is a first rate. In some embodiments, the color gradient is located at a portion of the respective word corresponding to the syllable associated with the portion of the content item the electronic device is currently playing. For example, if the time duration is the first time duration, movement of the color gradient 618 on the letter "n" of the word "twinkle" between FIGS. 6A and 6B, and optionally more generally on the letters "twin" of the word "Twinkle", optionally occurs at the first rate.

In some embodiments, when the time duration of the playback of the respective portion of the content item associated with the syllable of the respective word is a second time duration, longer than the first time duration, the rate of movement of the color gradient is a second rate, slower than the first rate. For example, if the time duration is the second time duration, movement of the color gradient 618 on the letter "n" of the word "twinkle" between FIGS. 6A and 6B, and optionally more generally on the letters "twin" of the word "Twinkle", optionally occurs at a second rate slower than the first rate. In some embodiments, the color gradient is located at a portion of the respective word corresponding to the syllable associated with the portion of the content item the electronic device is currently playing. As such, the movement speed of the color gradient is inversely proportional to the time duration of playback of the respective portion of the content item associated with the syllable of the word. It should be noted that such features are likewise applicable to other textual or grammatical indications within the lyrics of the content item in some embodiments. For example, when the line of lyrics includes a period, a comma, an exclamation point, and/or other grammatical symbols, the time duration of the playback of the respective portion of the content item associated with said symbols are likewise inversely proportional to a rate of movement of the color gradient when the color gradient proceeds over the textual or grammatical indications within the displayed lyrics. Visually moving the color gradient in at a rate that is inversely proportional to the time duration of playback of the portion of the content item associated with the syllable of the word in the lyrics further assists users in karaoke performances by showing where current playback of the content item corresponds to in the displayed lyrics, and thus, reduces errors in karaoke performances.

In some embodiments, in accordance with a determination that the playback of the respective portion of the content item is associated with at least two syllables of the respective word, such as the word "twinkle" on which the color gradient 618 of FIGS. 6A and 6B appears, wherein playback of a portion of the content item associated with a first syllable of the respective word has a first time duration and playback of the portion of the content item associated with a second syllable of the respective word has a second respective time duration, different from the first respective time duration during playback of the portion of the content item associated with the first syllable of the respective word, the electronic device visually moves the color gradient from the first location between the first portion of the respective word and the second portion of the respective word to the second location between the third portion of the respective word and the fourth portion of the respective word at a first rate that is in accordance with the first time duration. For example, the electronic device optionally moves the color gradient 618 of FIG. 6A across "twin" of the word "twinkle" at the first rate. In some embodiments, the color gradient is located at a portion of the respective word corresponding to the syllable associated with the portion of the content item the electronic device is currently playing.

In some embodiments, in accordance with a determination that the playback of the respective portion of the content item is associated with at least two syllables of the respective word, such as the word "twinkle" on which the color gradient 618 of FIGS. 6A and 6B appears, wherein playback of a portion of the content item associated with a first syllable of the respective word has a first time duration and playback of the portion of the content item associated with a second syllable of the respective word has a second respective time duration, different from the first respective time duration, during playback of the portion of the content item associated with the second syllable of the respective word, the electronic device visually moves the color gradient from the second location between the third portion of the respective word and the fourth portion of the respective word to a third location between a fifth portion of the respective word and a sixth portion of the respective word at a second respective rate that is in accordance with the second time duration. For example, the electronic device optionally moves the color gradient 618 of FIG. 6A across "kle" of the word "twinkle" at the second respective rate. In some embodiments, the color gradient is located at a portion of the respective word corresponding to the syllable associated with the portion of the content item the electronic device is currently playing. As such, the color gradient optionally changes speed of progression through the line of lyrics at a rate that is based on a time duration of the syllables of the respective word. In some embodiments, if the first time duration and the second time duration is the same, the color gradient visual moves at the same speed during both time durations. In some embodiments, if the first time duration is longer than the second time duration, the color gradient visually moves at a slower speed in the first time duration compared with the speed in the second time duration. In some embodiments, if the second time duration is longer than the first time duration, the color gradient visually moves at a faster speed in the first time duration compared with its speed in the second time duration. Visually moving the color gradient in at a rate that is inversely proportional to the time duration of playback of the portion of the content item associated with the syllable of the word in the lyrics further assists users in karaoke performances by showing where current playback of the content item corresponds to in the displayed lyrics, and thus, reduces errors in karaoke performances.

In some embodiments, during playback of the respective portion of the content item associated with the respective word, the electronic device displays a text representation of the respective word with a first position, such as shown in FIG. 6A with the size of the "e" of the word "twinkle" in the line 606a (e.g., the second occurrence of twinkle in the line 606a. In some embodiments, the first position is a position along the horizontal or vertical axis. In some embodiments, during playback of the respective portion of the content item associated with the respective word, the electronic device displays a text representation of a second word in the respective line of text representations with a second position different from the first position such as shown in FIG. 6A with the size of the "e" of the word "Twinkle" in the line 606a (e.g., the first occurrence of twinkle in the line 606a). In some embodiments, the second word is in playback after the respective word, and the respective word and the second word are identical words, such as the second word and respective word being the word "Twinkle" occurring twice in a row. In some embodiments, the second word is in playback after the first word, the respective word and the second word are identical words, and the text representation of the second word with the second position is larger than the identical text representation of the respective word. In some embodiments, the operations of the method 700 additionally or alternatively include displaying the text representation of the second word with the first position (e.g., first size), when a portion of the respective word corresponding to the text representation of the second word is in playback, displaying the text representation of the second word with the second position (e.g., second size), and optionally when a portion of the respective word corresponding to the text representation of the respective word is in playback, displaying the text representation of the respective word with the second position (e.g., second size). In some embodiments, the method 700 includes visually shifting the respective word to distinguish the respective word from the lines of the text representations of respective verbal content other than the respective word that corresponds to the portion of the content item the electronic device is currently playing (and/or has played and in the focus line). In some embodiments, the method includes visually shifting a word in the line of lyrics in response to the color gradient progressing over at least a portion of the word. In some embodiments, the method 700 includes visually shifting a word in the line of lyrics immediately before the color gradient progresses over the at least the portion of the word. In some embodiments, the visual shift includes shifting and/or increasing an of pixels used to display the word, such as an increase of 2, 3, 5, or another amount of pixels. In some embodiments, the shifting occurs or is displayed when the word is in the focus line. In some embodiments, the method 700 includes visually shifting the respective word back to being displayed with the same amount of pixels the respective word was displayed with before the visual shift to distinguish the respective word was performed. In some embodiments, the method 700 includes forgoing visually shifting the respective word back to being displayed with the same amount of pixels the respective word was displayed with before the visual shift to distinguish the respective word was performed. Visually shifting words in response to playback of the portion of the content item time-synced with the word being current in playback clearly indicates to the user which word is time-synced with the portion of the content item that is currently in playback and thus reduces errors in karaoke performances.

In some embodiments, during playback of the first portion of content item, wherein the first portion of the content item is associated with a first word of the one or more first lines of text representations of verbal content (e.g., a portion of the first lyrics), in response to playback of the first portion of the content item associated with the first word, in accordance with a determination that the playback of the first portion of the content item associated with (e.g., time-synced with) the first word is above a threshold time duration (e.g., 0.5 s, 1 s, 5 s, 10 s, 20 s, or another time duration), the electronic device displays the first word with a second visual characteristic (such as a size related visual characteristic, a background animation (e.g., virtual fireworks) or visual effect that optionally occurs as the word is proceeded over by a color gradient, such as discussed above, a font style, text styling, or another type of visual characteristic that is optionally different than size related), different from the first visual characteristic, having a first value (e.g., a first size is associated with the word, a first font style, a first text style, a first type of background animation, or another value of a different type of visual characteristic described above). In some embodiments, during playback of the first portion of content item, wherein the first portion of the content item is associated with a first word of the one or more first lines of text representations of verbal content (e.g., a portion of the first lyrics), in response to playback of the first portion of the content item associated with the first word, in accordance with a determination that the playback of the first portion of the content item associated with the first word is below the threshold time duration, the electronic device displays the first word with the second visual characteristic having a second value (e.g., a second size is associated with the word, a second font style, a second text style, and/or without displaying the background animation (e.g., without displaying virtual fireworks) or the other visual effect discussed above) different from the first value. In some embodiments, the first value includes a first size that is larger than a second size included in the second value. In some embodiments, the first size is up to a maximum threshold size (e.g., 40, 60, 72 pixels, or another threshold size) and the second size is optionally no smaller than a threshold minimum size (e.g., 4, 14, 20, 30, or another threshold minimum size). In some embodiments, words in the focus line of lyrics on the display generation components have different sizes (e.g., font sizes) that are based on a length of the time-synced portion of the content item that is associated with the respective word of the lyrics. For example, the method 700 optionally includes displaying a first word in the focus line of lyrics at a first font size and displaying a second word in the focus line of lyrics at second size, different than the first font size, based on a determined playback time of the content item corresponding to the respective word. In some embodiments, words outside of the focus line of lyrics have different sizes that are optionally based on a length of the time-synced portion of the content item that is associated with the words. As such, words time-synced with playback of a longer portion of the content item (e.g., words that are in playback for a longer time) are optionally displayed with an animation or another visual effect (e.g., the word is displayed larger than other words, background animation is displayed as the color gradient proceeds over the word) to, for example, provide a visual clue to the user that the word is time-synced with playback of a longer portion of the content item. Emphasizing words that are associated with longer time-synced portions of the content item more than a visual emphasis of other words that are associated with a shorter time-synced portion of the content item assists users with determining a length of the time-synced portion of the content item that is associated with the displayed word of the lyrics and reduces errors in karaoke performances.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the user interfaces including time-synced lyrics displayed with different visual characteristics to indicate different performers associated with various portions of lyrics described above with reference to method 700 optionally have one or more of the characteristics of attenuating the vocal content playback volume of content items, described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, playing operations 706 and 712 and displaying operation 708 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Attenuating Playback Volume of Vocal/Verbal Portions of a Content Item

Users interact with electronic devices in many different manners. In some embodiments, an electronic device plays a content item, such as a song or other audio content, that includes vocal/verbal content. The embodiments described below provide ways in which an electronic device displays user interfaces for attenuating the playback volume of the vocal/verbal content relative to the overall playback volume of the content item. Enhancing interactions with a device reduces the amount of time needed by a user to customize the playback volume of the vocal/verbal portion of the content item relative to the overall playback volume of the content item, and thus reduces the power usage of the device and increases battery life for battery-powered devices. It is understood that people use devices. When a person uses a device, that person is optionally referred to as a user of the device.

Among other things, FIGS. 8A-8L illustrate electronic devices displaying a vocal attenuation control element and changing a vocal volume of a content item, such as a song, in response to input directed to the vocal attenuation control element. The embodiments in these figures are used to illustrate the processes described below, including the processes described with reference to FIG. 9. Although FIGS. 8A-8L illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8L.

A vocal attenuation mode optionally permits partial or full attenuation of vocal parts of a content item, such as a song. In a vocal attenuation mode, the vocal volume of the content item is optionally partially or fully attenuated, and is optionally changeable without changing volume levels of other audio parts of the content item that are different from the vocal parts. As such, when entering a vocal attenuation mode, a playback vocal volume level of the song optionally becomes a lower playback vocal volume level, while keeping the total playback volume level of the song constant and/or without modifying a volume level of non-vocal portions of the song. In some embodiments, a vocal attenuation mode permits for modification of a vocal volume level relative to a total volume level at which the parts of the content item is played (and/or relative to an unattenuated volume level of vocals of the content item at the particular total volume level a content item is played). In a vocal attenuation mode, the vocal volume level is optionally a percentage less than 100 percent of an unattenuated volume level of vocals of the content item. Further details are described below with reference to FIGS. 8A-9.

The total volume level is optionally governed by a total volume level slider. The vocal volume level is optionally governed by a vocal attenuation level slider, different from the total volume level slider. Changing a slider level of the vocal attenuation level slider optionally does not change a slider level of the total volume level slider. As such, for example, if the slider level of the vocal attenuation level slider is set to a minimum or mute level, an electronic device optionally continues to generate audio of the content item if the content item includes non-vocal parts. Changing a slider level of the total volume level slider optionally does not change a slider level of the vocal attenuation level slider; however, if the total volume level slider is set to a minimum or mute level, an electronic device optionally does not generate audio of the content item.

Some content item data sources support vocal attenuation; some content item data sources do not support vocal attenuation. Some embodiments of this disclosure include processes for changing from content item data sources that do not support vocal attenuation to content item data sources that support vocal attenuation in response to an electronic device detecting an input to operate in a vocal attenuation mode. Such processes are described more fully below, especially with reference to method 900.

Figure 8B:
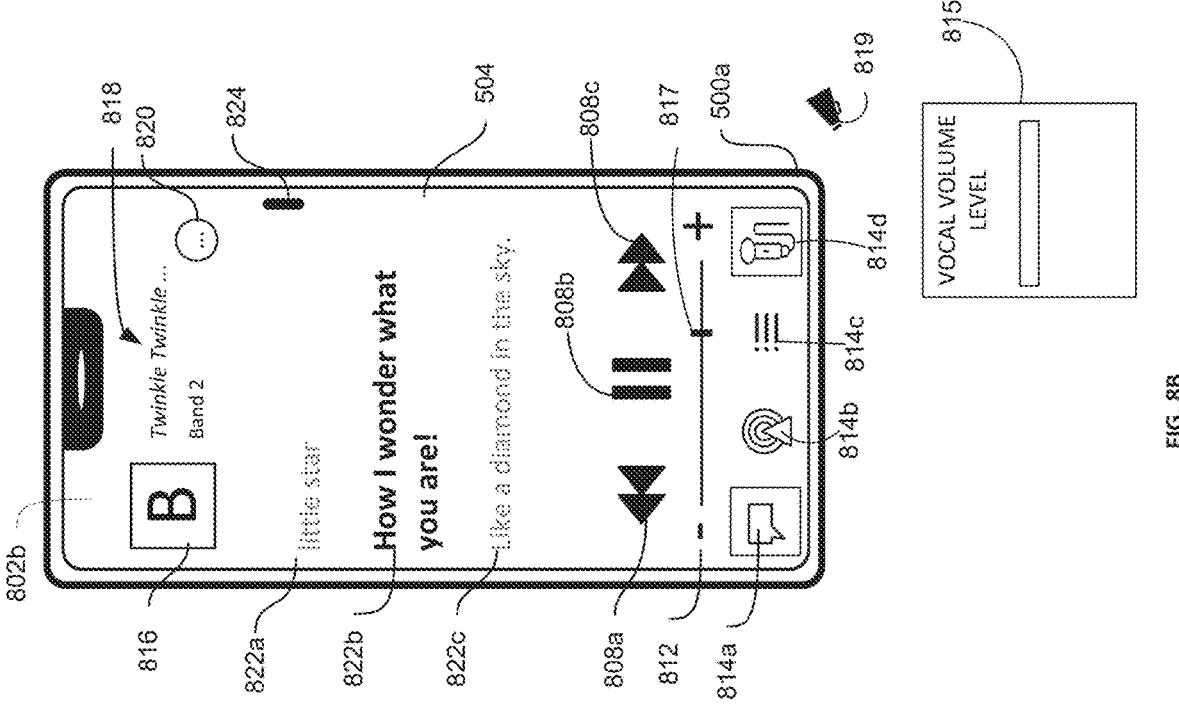
FIGS. 8A-8T illustrate electronic devices displaying a vocal attenuation control element and changing a vocal volume of a content item, such as a song, in response to input directed to the vocal attenuation control element in accordance with some embodiments of the disclosure.
Figure 8A:
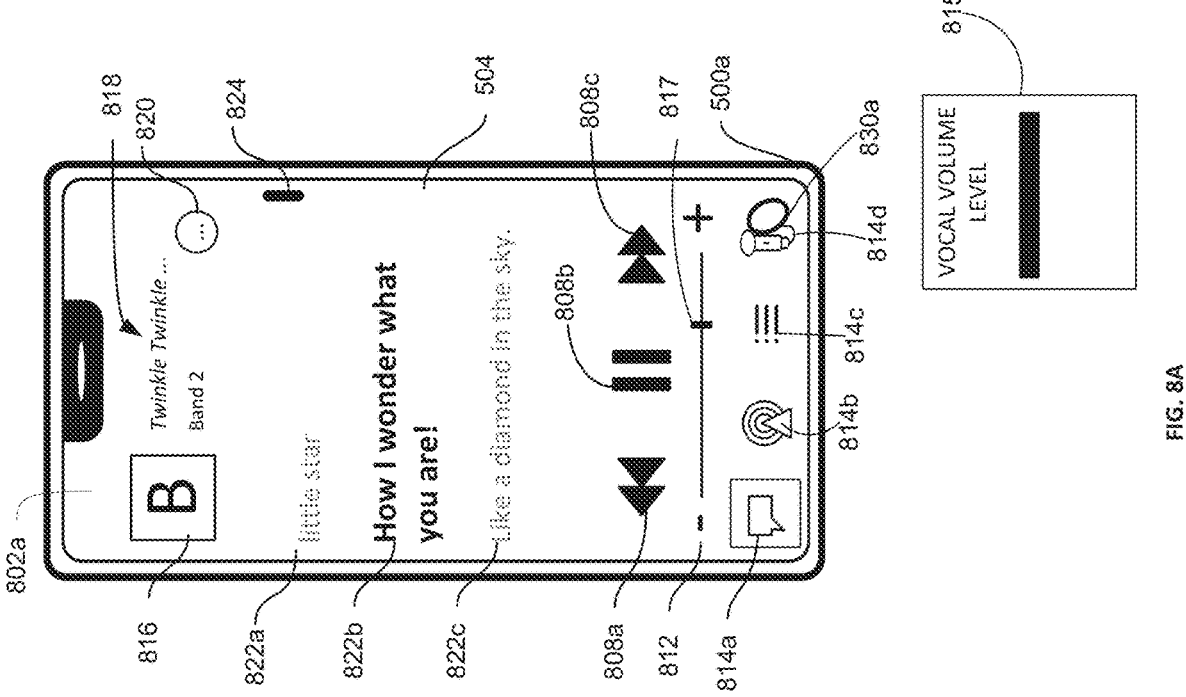

FIG. 8A illustrates an example of an electronic device 500a displaying, via display 504, a playback user interface 802a, in which a selectable lyrics mode option 814a is selected. In some embodiments, the electronic device displays the playback user interface 802a in response to an input corresponding to a request to display a content playback application and/or in response to selection of the selectable lyrics mode option 814a, which corresponds to a time-synced lyrics option. For example, the electronic device 500a optionally displays the playback user interface 802a while playing a content item such as a content item described above with reference to the method 700 and/or below with reference to method 900, such as a song. In some embodiments, the electronic device 500a displays the playback user interface 802a and generates audio corresponding to the song associated with the displayed lyrics, such as described below with reference to method 900. In some embodiments, the playback user interface 802a includes the time-synced lyrics functionality described above with reference to method 700.

In FIG. 8A, the playback user interface 802a includes album artwork 816 associated with a song that is playing on (e.g., on the command of) the electronic device 500a, an indication 818 of the title (which in FIG. 8A is abbreviated for "Twinkle, Twinkle Little Star") and artist of the song ("Band 2"), and selectable controls 808a through 808c (e.g., skip back option 808a, pause option 808b, and skip forward option 808c) for controlling playback of the content item. For instance, in response to detecting user selection of the skip back option 808a, the electronic device 500a optionally plays a previously played song. In another instance, in response to detecting user selection of the pause option 808b, playback of the song is paused. In another instance, in response to detecting user selection of the skip forward option 808c, the electronic device 500a plays a song that is next in a playback queue.

In FIG. 8A, the playback user interface 802a includes a selectable total volume control element 812 that is selectable or interactable (e.g., via the slider 817) to adjust the total playback volume of the song, and a lyrics navigation indicator 824. For example, in response to detecting user selection of the slider 817 including movement towards the "–" indication of the total volume control element 812, the electronic device 500a decreases the total volume of the playback of the song in accordance with the direction and amount of movement of the input, and in response to detecting user selection of the slider 817 including movement towards the "+" indication of the total volume control element 812, the total volume of the playback of the song is increased in accordance with the direction and amount of movement of the input. In FIG. 8A, the playback user interface 802a also includes a lyrics navigation indicator 824 that indicates a position within the set of lyrics of the song and for manual navigation of the set of lyrics. For example, the lyrics navigation indicator 824 is optionally interactive to navigate to specific lyrics in the set of lyrics associated with the song in playback, such as in response to an input selecting and moving the indicator 824.

Further, in FIG. 8A, the playback user interface 802a includes a menu option 820 that is selectable to present menu options including the functionality described above with reference to the selectable option 624 of FIG. 6A, a selectable lyrics mode option 814a to view time-synced lyrics of the content item (e.g., lines of lyrics 822a through 822c to be further described below) having characteristics of the user interfaces and/or lyrics functionalities described with reference to the method 700, a selectable option 814b to select an audio output device to play the song, a selectable option 814c to view representations of items of content in a playback queue that will play after the song, and a selectable vocal volume attenuation mode option 814d to enter or exit a vocal volume attenuation mode, which will be described in further detail in this disclosure, including with reference to FIG. 9.

The lines of lyrics 822*a* through 822*c* of FIG. 8A option-ally indicate a location of playback within the content item and are displayed with visual characteristics described with reference to FIGS. 6A-7. For example, a portion of the song with which the lyrics of line 822*a* is associated has option-ally already been in playback, the line 822*b* is optionally in current playback, and the line 822*c* is optionally upcoming in playback (e.g., after playback of the portion of the song associated with the line 822*b*).

In FIG. 8A, a vocal volume level glyph 815 shows a vocal volume level at which the song is currently configured for playback. The vocal volume level glyph 815 of FIG. 8A indicates that the vocal volume level is at a maximum level for the respective total volume level indicated by the slider 817 of the selectable total volume control element 812, such that the song is configured for playback without vocals of the song being attenuated (e.g., relative to non-vocal portions of the song), such as the song being configured for playback as published. Further details of playback of the song without vocal attenuation are described below with reference to method 900.

In FIG. 8A, a user selects (e.g., with contact 830*a*) the selectable vocal volume attenuation mode option 814*d* to enter a vocal volume attenuation mode. If the input in FIG. 8A is a tap input, in response to the tap input illustrated in FIG. 8A the electronic device 500*a* mutes the vocal playback volume as described below with reference to FIG. 8B. If the input in FIG. 8A is a long tap input (e.g., a tap and hold input), in response to the long tap input illustrated in FIG. 8A, the electronic device 500*a* updates the playback user interface 802*c* as described below with reference to FIG. 8C.

In one example, in response to electronic device 500*a* detecting the user's selection in FIG. 8A (e.g., a tap input or another type of input described herein), the electronic device 500*a* enters the vocal volume attenuation mode, as shown in FIG. 8B. Specifically, FIG. 8B illustrates an example of the electronic device 500*a* displaying the playback user inter-face 802*b* which visually indicates that the electronic device 500*a* is operating in the vocal volume attenuation mode in response to receiving a tap input in FIG. 8A. In response to the electronic device 500*a* detecting the contact 830*a* of FIG. 8A, the electronic device 500*a* continues displaying the slider 817 of the selectable total volume control element 812 and visually emphasizes and/or distinguishes the selectable vocal volume attenuation mode option 814*d* of FIG. 8B as selected (e.g., distinctly from the visual indication of the selectable vocal volume attenuation mode option 814*d* of FIG. 8A such as by the enclosure added to the display of the selectable vocal volume attenuation mode option 814*d* in FIG. 8B). Also, in response to the electronic device 500*a* detecting the contact 830*a* of FIG. 8A, the electronic device 500*a* mutes the vocal volume of the song in playback, such that the song is configured for playback on the electronic device 500*a* without vocals (e.g., without main vocals). In FIG. 8B, the electronic device 500*a* generates an audio notification 819 signifying that the electronic device 500*a* has entered the vocal volume attenuation mode. Other types of notifications for signifying that the electronic device 500*a* has entered the vocal volume attenuation mode are contem-plated and described further below with reference to method 900. Also, it should be noted that, in some embodiments, in response to electronic device 500*a* detecting the user's selection in FIG. 8A, the electronic device 500*a* fetches audio data, different from audio data for the song utilized before detecting the user's selection, that permits vocal attenuation during playback of the song, and such details are more fully described below with reference to method 900.

As shown in FIG. 8B, the vocal volume level glyph 815 indicates that the vocal volume level is at a minimum or muted level for the respective total volume level indicated by the slider 817 of the selectable total volume control element 812 of FIG. 8B, such that the song is configured for playback with vocals of the song being fully attenuated (e.g., relative to non-vocal portions of the song), such as the song being configured for playback without any vocals. Further details of playback of the song with vocal attenuation are described below.

Figure 8D:
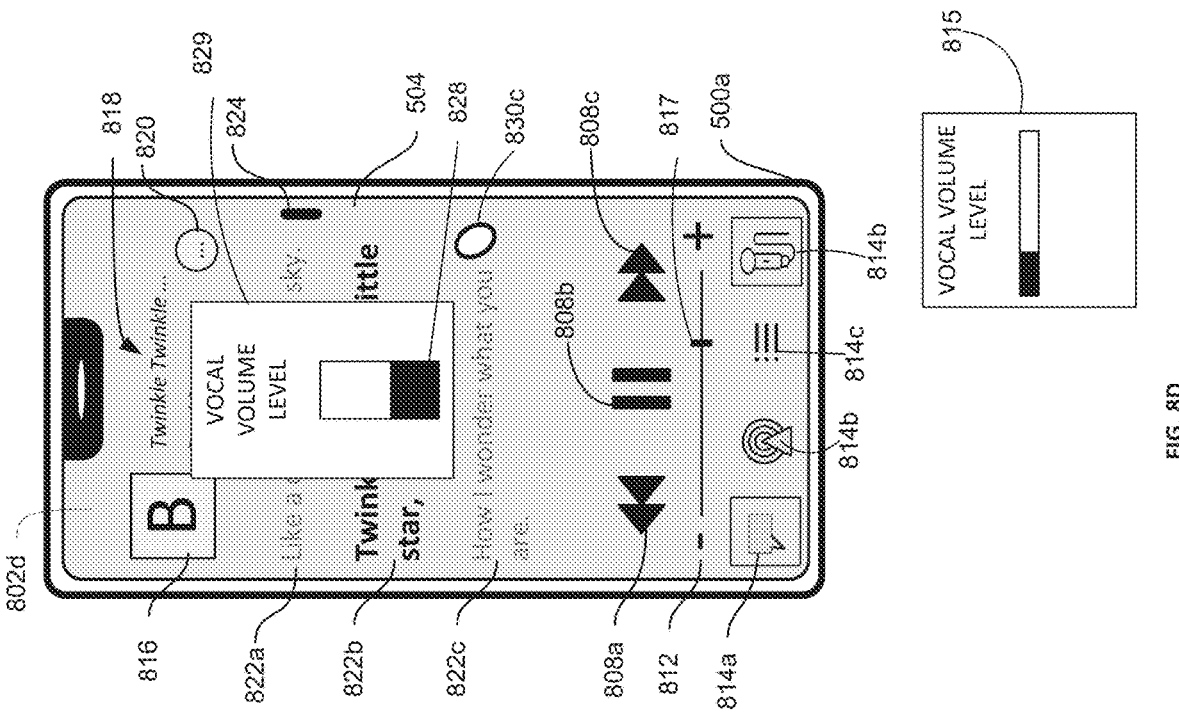
Figure 8C:
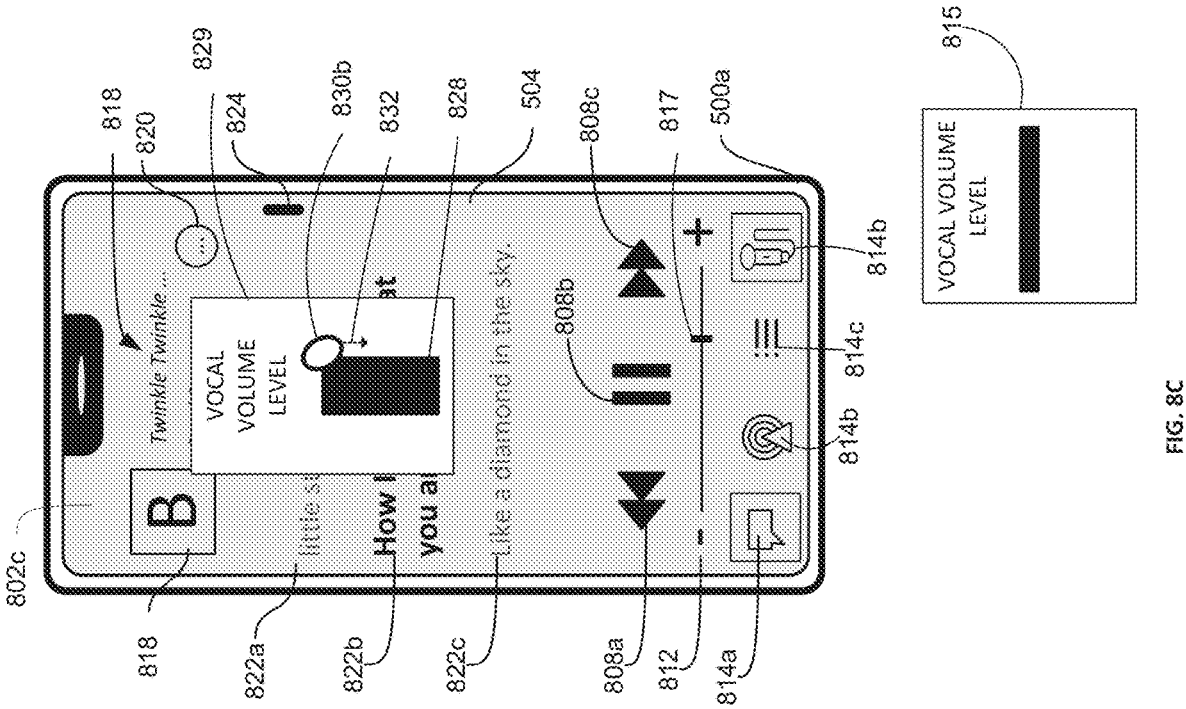

In another example, in response to the user's selection in FIG. 8A (e.g., a touch and hold input for a predetermined amount of time (e.g., 0.1, 0.5, 1, 3, 5, or 10 s, or another amount of time) or another type of input described herein), the electronic device 500*a* displays the playback user inter-face 802*c* of FIG. 8C, which includes a user interface element 829 including a selectable vocal volume level slider element 828, and changes a visual characteristic of portions of the display that are outside of the user interface element 829 (e.g., as compared with like portions in FIGS. 8A and/or 8B). For example, in FIG. 8C, the portions of the playback user interface 802*c* that are outside of the user interface element 829 are reduced in visual prominence (e.g., reduced in brightness or color saturation, darkened, or blurred).

In FIG. 8C, the electronic device 500*a* displays selectable vocal volume level slider element 828 at a maximum slider level because the vocal volume level is at a maximum when the input in FIG. 8A is received, as indicated by the vocal volume level glyph 815 in FIGS. 8A and 8C. Further, in FIG. 8C, a user selects (e.g., with contact 830*b*) the selectable vocal volume level slider element 828 to modify a volume level of vocals of the song relative to the total volume level (and/or relative to unattenuated volume level of vocals of the song). The contact 830*d* includes movement in the direction indicated by the arrow 832. In response to the input in FIG. 8C, the electronic device 500*a* updates the selectable vocal volume slider element 828 and the volume level of vocals of the song relative to the total volume level, as shown in FIG. 8D.

FIG. 8D illustrates an example of the electronic device 500*a* updating playback user interface 802*d* in response to the electronic device 500*a* detecting the input of FIG. 8C. In the playback user interface 802*d* of FIG. 8D, a slider level of selectable vocal volume level slider element 828 is reduced compared to the slider level of selectable vocal volume level slider element 828 of FIG. 8C. In particular, in FIG. 8C, the slider level of selectable vocal volume level slider element 828 is at a maximum slider level correspond-ing to no vocal volume attenuation of the song in playback, and in FIG. 8D, the slider level of selectable vocal volume level slider element 828 is reduced in accordance with the amount of movement of contact 830*b* in FIG. 8B. As shown in FIG. 8D, the slider level of the vocal volume level slider element 828 is between the maximum slider level and the minimum slider level and corresponds to an amount of vocal volume attenuation being applied to the song in playback relative to the total volume level of playback of the song. In FIG. 8D, the vocal volume level glyph 815 likewise indi-cates that the vocal volume level is at the level indicated by the slider 828, such that the song is configured for playback with vocals of the song being partially attenuated (e.g., relative to non-vocal portions of the song). In some embodi-ments, the electronic device 500*a* generates an audio noti-fication signifying that the electronic device 500*a* has entered the vocal volume attenuation mode, such as when the user slides the slider level from the maximum slider level. In some embodiments, the electronic device 500*a* fetches audio data, different from audio data for the song utilized before detecting the user's selection, that permits vocal attenuation during playback of the song and such details are more fully described below with reference to method 900. Also, further details of playback of the song with vocal attenuation are described below with reference to method 900.

In FIG. 8D, a user selects (e.g., with contact 830*c*) a portion of the playback user interface 802*d* that is outside of the user interface element 829. In response to the input in FIG. 8D, the electronic device 500*a* updates the playback user interface 802*d*, as shown in FIG. 8E, for example.

Figure 8F:
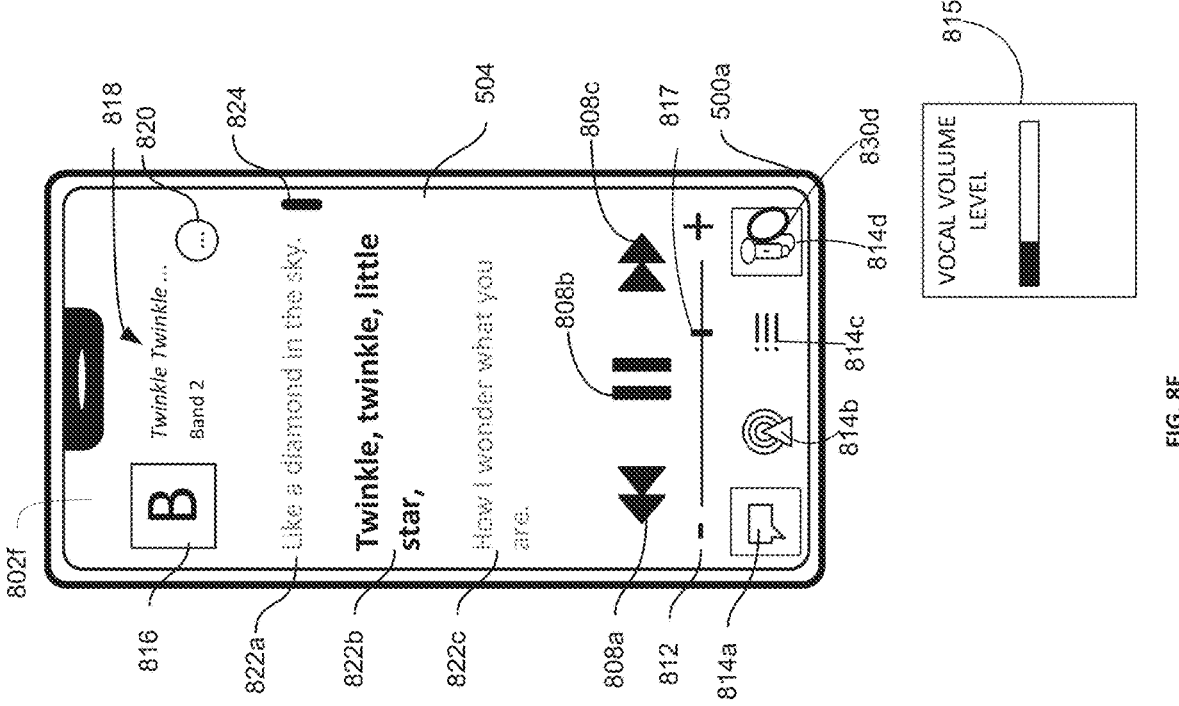
Figure 8E:
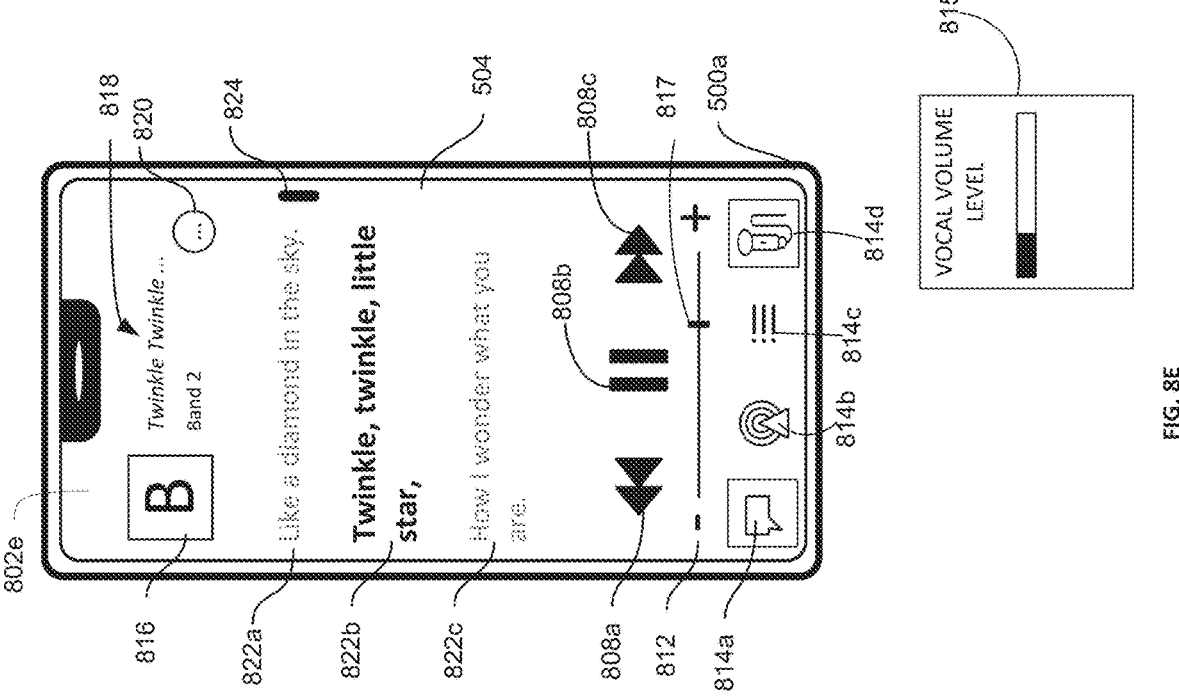

FIG. 8E illustrates an example of the electronic device 500*a* updating a playback user interface 802*d* (e.g., displaying playback user interface 802*e*) in response to the electronic device 500*a* detecting the contact 830*c* of FIG. 8D (e.g., a tap input or another type of input described herein). The playback user interface 802*e* includes visual indications about (e.g., around, on, or in) the selectable lyrics mode option 814*a* and about the selectable vocal volume attenuation mode option 814*d*, respectively visually indicating them as selected. For example, the visual indications about the selectable lyrics mode option 814*a* and the selectable vocal volume attenuation mode option 814*d* visually signify that the electronic device 500*a* is operating the lyrics mode and in the vocal volume attenuation mode. Further, compared with the playback user interface 802*d* of FIG. 8D, the playback user interface 802*e* of FIG. 8E does not include the user interface element 829 of FIG. 8D and increases the visual prominence of the areas of the playback user interface 802*d* outside of the user interface element 829 of FIG. 8D, among other things.

Moving on to FIG. 8F, while the selectable vocal volume attenuation mode option 814*d* is visually indicated as selected as discussed above and while the electronic device 500*a* is in the vocal attenuation mode, such as shown in the playback user interface 802*f*, the user selects (e.g., with contact 830*d*) the selectable vocal volume attenuation mode option 814*d*. The input of FIG. 8F optionally corresponds to a request to exit the vocal volume attenuation mode, for example. In response to the input in FIG. 8F, the electronic device 500*a* updates the playback user interface 802*e* as shown in FIG. 8G, for example.

Figure 8H:
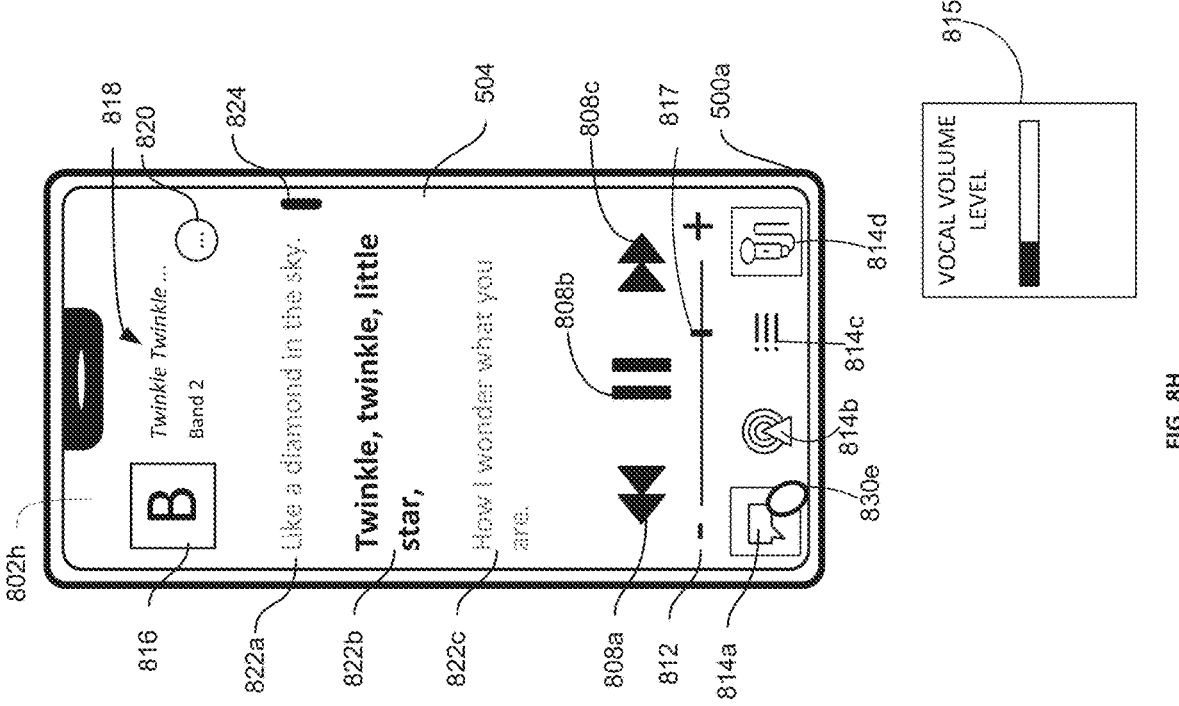
Figure 8G:
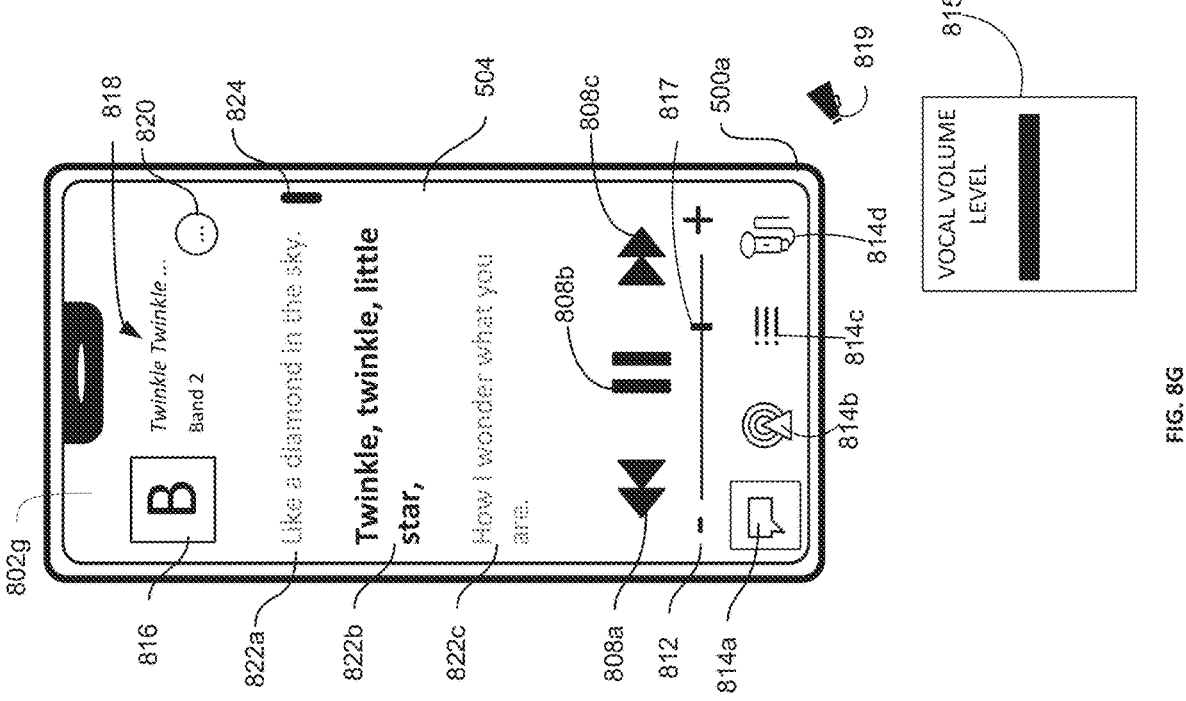

FIG. 8G illustrates an example of the electronic device 500*a* updating playback user interface 802*f* (e.g., displaying the playback user interface 802*g*) in response to the electronic device 500*a* detecting the contact 830*d* of FIG. 8F (e.g., a tap input or another type of input described herein). As shown in FIG. 8G, the electronic device 500*a* displays the playback user interface 802*g*, in which the selectable vocal volume attenuation mode option 814*d* is not indicated as selected and the vocal volume level is at a maximum level, as indicated by the glyph 815. In addition, in FIG. 8G, the electronic device 500*a* generates the audio notification 819 signifying that the electronic device 500*a* has exited the vocal volume attenuation mode. Again, it should be noted that other types of notifications for signifying that the electronic device 500*a* has exited the vocal volume attenuation mode are contemplated and described further below with reference to method 900.

FIG. 8H illustrates the electronic device 500*a* displaying playback user interface 802*h* while in the vocal attenuation mode. As shown in FIG. 8H, the selectable vocal volume attenuation mode option 814*d* is visually indicated as selected because the electronic device 500*a* is in the vocal attenuation mode. The vocal attenuation glyph 815 in FIG. 8H indicates that the amount of vocal attenuation in FIG. 8H is the same as the amount of vocal attenuation in FIG. 8F. In FIG. 8H, the electronic device 500*a* receives an input selecting (e.g., with contact 830*e*) the selectable lyrics mode option 814*a*. The input of FIG. 8H optionally corresponds to a request to exit the lyrics mode (e.g., the time-synced lyrics mode). In response to the input illustrated in FIG. 8H, the electronic device 500*a* displays the playback user interface 802*i*, exits the lyrics mode, and exits the vocal attenuation mode as shown in FIG. 8I.

Figure 8J:
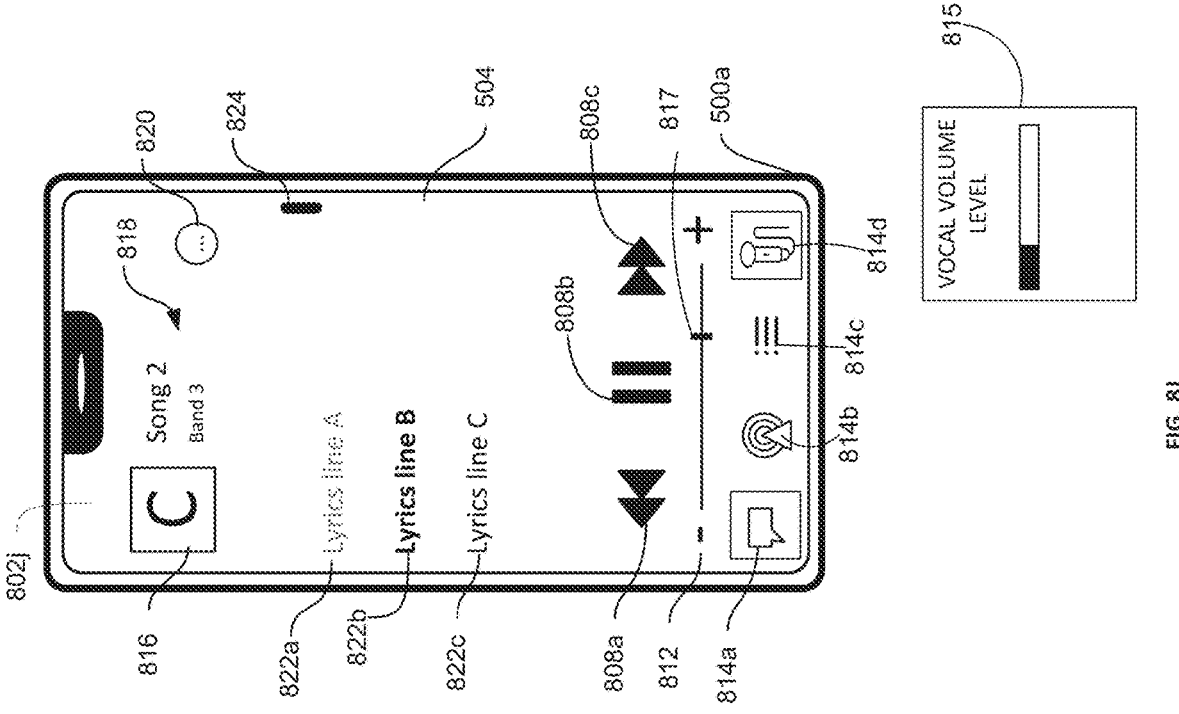
Figure 8I:
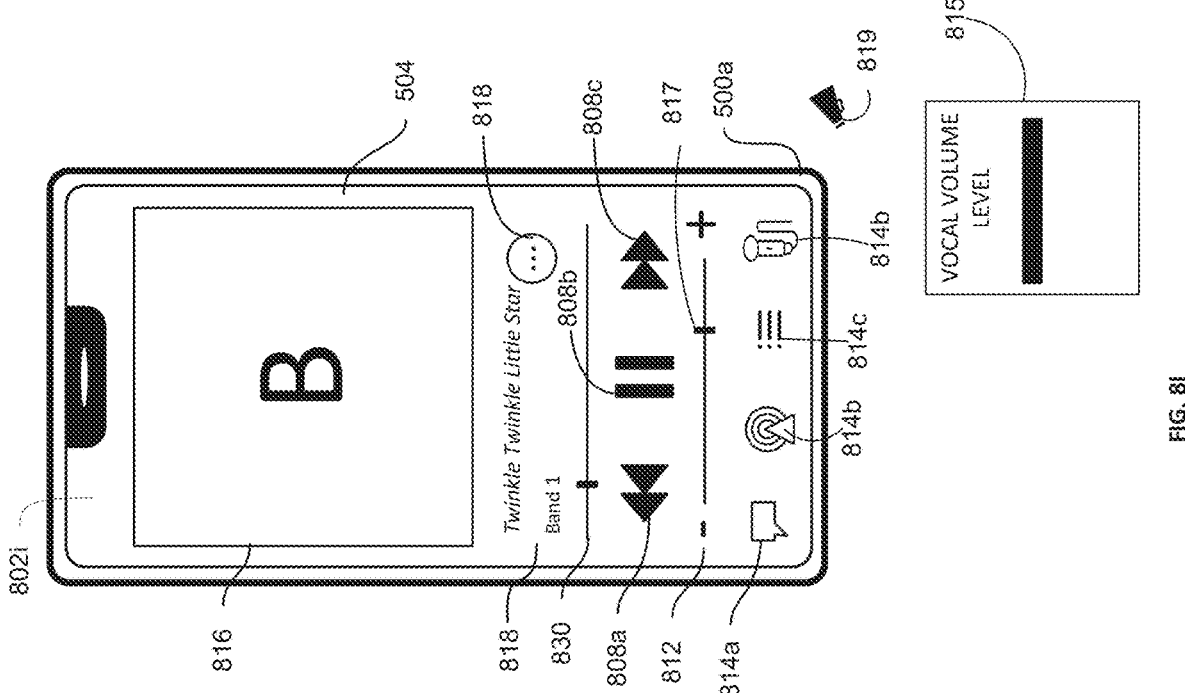

FIG. 8I illustrates an example of the electronic device 500*a* displaying a playback user interface 802*i* and operating without the vocal attenuation mode in response to the input illustrated in FIG. 8H. As shown in FIG. 8I, the electronic device 500*a* displays the playback user interface 802*i* in which the selectable lyrics mode option 814*a* is not indicated as selected because the electronic device 500*a* is not displaying the time-synced lyrics user interface shown, for example, in FIGS. 8A-8H. Also, in FIG. 8I, the selectable lyrics mode option 814*a* is not indicated as selected because the electronic device 500*a* is no longer in the vocal attenuation mode. Accordingly, in some embodiments, the electronic device 500*a* toggles off the selectable vocal volume attenuation mode (e.g., corresponding to the selectable vocal volume attenuation mode option 814*d*) without receiving an input directed to the selectable vocal volume attenuation mode option 814*d*. Indeed, in an example, the electronic device 500*a* exits the vocal attenuation mode and toggles off selectable vocal volume attenuation mode option 814*d* in response to the input in FIG. 8H, which was directed to the selectable lyrics mode option 814*a*. In some embodiments, exiting the vocal attenuation mode in response to the input in FIG. 8H also increases the vocal volume level of the song, which is at the total playback volume level indicated by the slider 817, optionally to the total playback volume, as indicated by the vocal volume level glyph 815 in FIG. 8I, which corresponds to a maximum, unattenuated volume level. In addition, in FIG. 8I, the electronic device 500*a* generates the audio notification 819 signifying that the electronic device 500*a* has exited the vocal volume attenuation mode. Other types of notifications for signifying that the electronic device 500*a* has exited the vocal volume attenuation mode are contemplated and described further below with reference to method 900.

In addition, in FIG. 8I, the electronic device 500*a* ceases display of lyrics, enlarges the display size of album artwork 816 associated with the song that is playing on (e.g., on the command of) the electronic device 500*a*, moves the display of the indication 818 of the title and artist of the song to below the album artwork 816, and displays a scrubber bar 830 that indicates the current playback position in the song and that is selectable to move the playback position to a different part of the song. For example, in response to detecting user input on the scrubber bar 830 including movement to the right, the electronic device 500*a* scrubs playback of the content item forward until the user input on the scrubber bar 830 is no longer detected or until the end of the scrubber bar 830 is reached, and in response to detecting user input on the scrubber bar 830 including movement to the left, the electronic device 500*a* scrubs playback of the content item backwards until the user input on the scrubber bar 830 is no longer detected or until the end of the scrubber bar 830 is reached.

In some embodiments, while in the vocal attenuation mode, the electronic device 500*a* transitions from playing a first content item to playing a second content item. For example, the electronic device 500*a* finishes playing the first content item and automatically plays the second content item next because the second content item is next in a playback queue or the electronic device 500a ceases playback of the first content item in response to detecting an input corresponding to a request to play the next content item in the playback queue and initiates playback of the second content item. In some embodiments, when transitioning from the first content item to the second content item while in the vocal attenuation mode, the electronic device 500a maintains the amount of vocal attenuation applied to the first content item when playing the second content item.

For example, FIG. 8J illustrates an example of the electronic device 500a displaying a playback user interface 802j, in which a song different than the song indicated in FIGS. 8A-8I is in playback. For example, the electronic device 500a initiates playback of the content item in FIG. 8J after playing the content item in FIGS. 8A-8I while in the vocal attenuation mode described above with reference to FIG. 8E. In FIG. 8J, the electronic device 500a displays album artwork 816 associated with the song "Song 2" that is playing on (e.g., on the command of) the electronic device 500a and the indication 818 of the title "Song 2" and artist "Band 3" of the song. As indicated by vocal volume level glyph 815 in FIG. 8J, the electronic device 500a attenuates the vocal portion of the content item in FIG. 8J by the same amount indicated in FIG. 8E.

In FIG. 8H, the electronic device 500a indicates the selectable vocal volume attenuation mode option 814d as selected because the vocal volume of the content item is partially attenuated in FIG. 8H because the vocal volume was attenuated in FIG. 8E when the electronic device 500a was playing the song previous to the song in FIG. 8E. In some embodiments, in response to detecting completion of playback of the song of FIG. 8E, the electronic device 500a proceeds to playing the song next in the playback queue, maintaining the configuration of the vocal volume attenuation mode, such that the vocal volume attenuation level of the song of FIG. 8J is the same as the vocal volume attenuation level of the song of FIG. 8E, as indicated by the vocal volume level glyph 815 of FIGS. 8E and 8J, which are identical. As such, the respective proportions of attenuation of the vocal volumes of the respective songs to the unattenuated volume level of the respective songs (e.g., at the identical total playback volume level indication e.g., the slider 817) are optionally identical. Further details regarding maintaining the configuration of the vocal volume attenuation mode in response to the detecting playback of a song next in queue are provided below with reference to method 900.

Figure 8L:
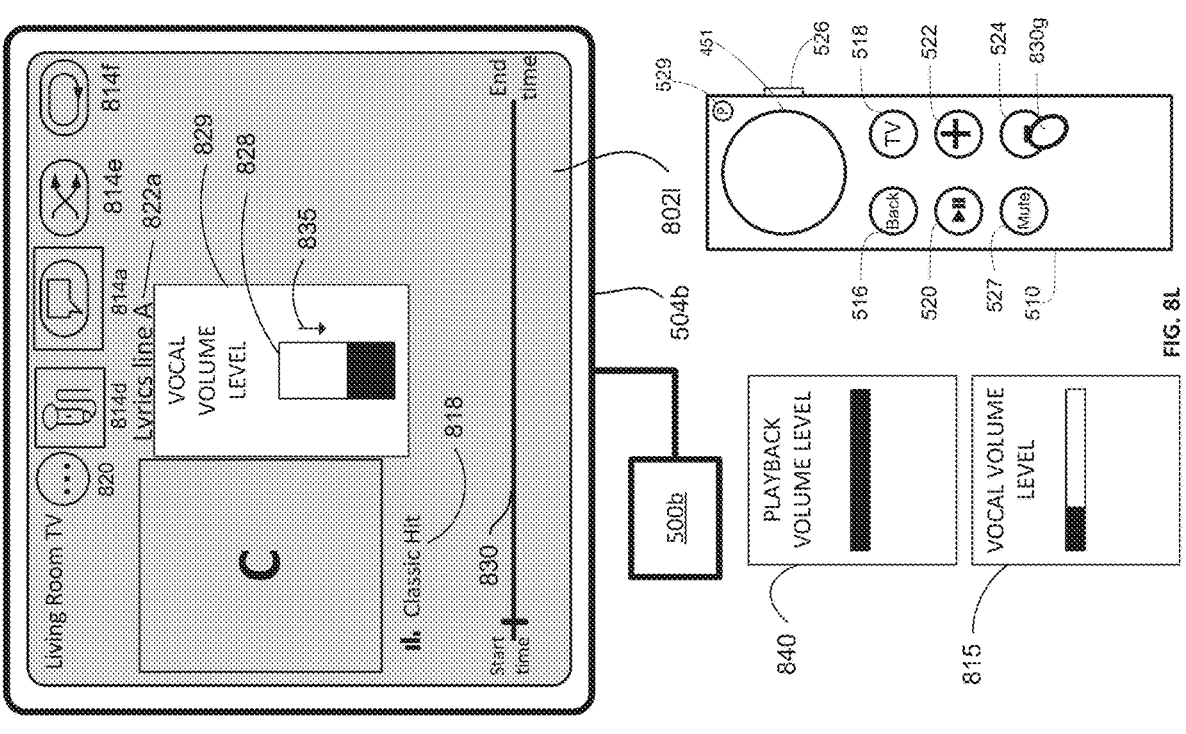
Figure 8K:
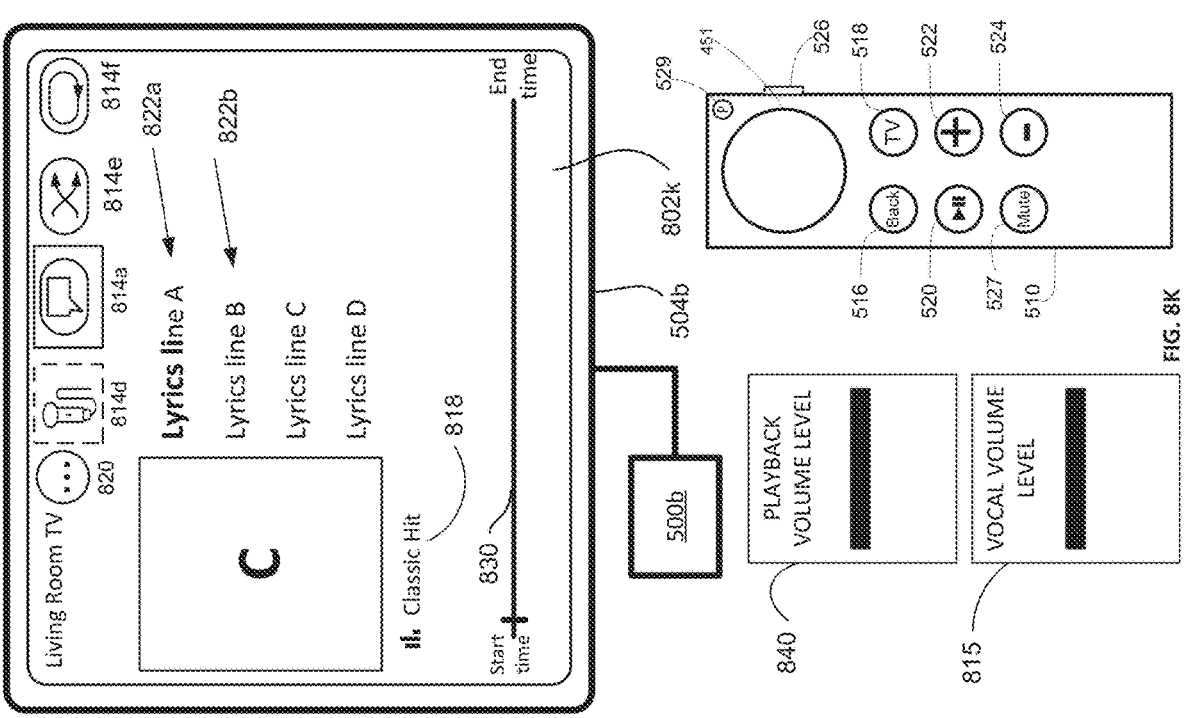

FIGS. 8K and 8L illustrate an example of an electronic device 500b (e.g., a second electronic device) operating in the vocal attenuation mode in accordance with some embodiments of this disclosure.

In FIG. 8K, the electronic device 500b is in communication with a display generation component 504b (e.g., of a TV or another electronic device) and the remote 510. The display generation component 504b displays a playback user interface 802k in FIG. 8K. The playback user interface 802k of FIG. 8K includes a menu option 820, a selectable lyrics mode option 814a, a selectable vocal volume attenuation mode option 814d, a shuffle option 814e, and a repeat option 814f. In the playback user interface 802k, the selectable lyrics mode option 814a is visually indicated as selected, such as described above with reference to FIG. 8E. FIG. 8K also includes a total playback volume level glyph 840. As shown, the total playback volume level is at a maximum total playback volume level. FIG. 8K also includes the vocal volume level glyph 815, which is illustrated at a maximum vocal volume level, indicating that the vocals of the song are not attenuated. In some embodiments, the playback user interface 802k in FIG. 8K includes lyrics lines 822a and 822b, which optionally are displayed with characteristics described above with reference to FIGS. 6A-7. In FIG. 8K, input focus is optionally on selectable vocal volume attenuation mode option 814d, and in response to detecting selection of selectable vocal volume attenuation mode option 814d while input focus is on selectable vocal volume attenuation mode option 814d, the electronic device optionally displays a playback user interface that includes a vocal volume slider element that is selectable to control a vocal volume, such as shown in FIG. 8L.

FIG. 8L illustrates an example of an electronic device 500b (e.g., a second electronic device) displaying a playback user interface 802l and entering the vocal attenuation mode in response to detecting selection (e.g., indicated by contact 830g) of volume down button 524 of remote 510 while displaying the playback user interface 802l. For example, the playback user interface 802l of FIG. 8L includes a user interface element 829 including a selectable and/or inter-actable and/or controllable vocal volume level slider element 828. While displaying the user interface element 829 in FIG. 8L, the electronic device 500b changes a visual characteristic of portions of the display that are outside of the user interface element 829, such as discussed above with reference to FIGS. 8C and 8D. In some embodiments, in response to entering the vocal attenuation mode in response to the input shown in FIG. 8L, the electronic device 500b generates an audio notification signifying that the electronic device 500b has entered the vocal volume attenuation mode when the playback user interface 802l is displayed, such as described further below with reference to method 900.

The input in FIG. 8L corresponds to a request to modify a playback vocal volume level of the song to become a lower playback vocal volume level, while keeping the total playback volume level of the song constant and/or without modification a volume level of non-vocal portions of the song. Specifically, in response to the electronic device 500b detecting the user input (e.g., the contact 830g), the electronic device 500b displays the slider level decreasing in accordance with the input, as illustrated with the arrow 835. For example, the longer the duration of contact 830g or the more repeated contacts 830g on volume down button 524, the more the electronic device 500b reduces the vocal playback volume. The total volume level (e.g., as indicated in the glyph 840) optionally does not change in response to the modification of the playback vocal volume level. In some embodiments, when in a vocal attenuation mode, in response to selection of volume up button 522 of remote 510, the electronic device increases the vocal volume level in accordance with the input. In some embodiments, while not in the lyrics mode (e.g., while the selectable lyrics mode option 814a of FIG. 8K is not selected), in response to selection of volume down button 524 or volume up button 522, the electronic device does not enter the vocal attenuation mode; instead, the electronic device changes the total volume level in accordance with the input.

FIGS. 8M-8T illustrate examples of the electronic device 500b displaying video content captured by another electronic device (e.g., electronic device 500a) concurrently with time-synchronized lyrics for a content item. In some embodiments, the electronic device 500b displays the video content and/or time-synchronized lyrics while playing the content item with vocal attenuation. In some embodiments, playing the content item with vocal attenuation includes modifying (e.g., reducing) a playback volume of a vocal portion of a content item (e.g., singing, rapping, speaking, and/or other vocal sounds) relative to the overall playback volume of the content item. For example, reducing the playback volume of a vocal portion of a content item provides the user with a karaoke experience. Further, in FIGS. 8M-8T, remote 510 optionally includes the functionalities (e.g., like buttons and like surfaces) described with reference to remote 510 in FIG. 5B, and optionally includes additional control buttons (or control surfaces), such as the buttons 455a through 455d, which optionally are a part of touch-sensitive surface (e.g., are touch-sensitive like touch-sensitive surface 451) and/or optionally are selectable to move a focus (e.g., an input focus 813) in a respective direction (e.g., up, down, left, or right), in the displayed user interface, corresponding to the direction that is optionally indicated by the buttons 455a through 455d (e.g., button 455a is optionally selectable to move the input focus leftward, button 455b is optionally selectable to move the input focus upward, button 455c is optionally selectable to move the input focus rightward, and button 455d is optionally selectable to move the input focus downward). In some embodiments, buttons 455a through 455d are not a part of a touch-sensitive surface. In some embodiments, buttons 455a through 455d are part of a touch-sensitive surface (e.g., are part of touch-sensitive surface 451 and can be used in inputs involving movement on a touch-sensitive surface).

Figures 8M, 8N:
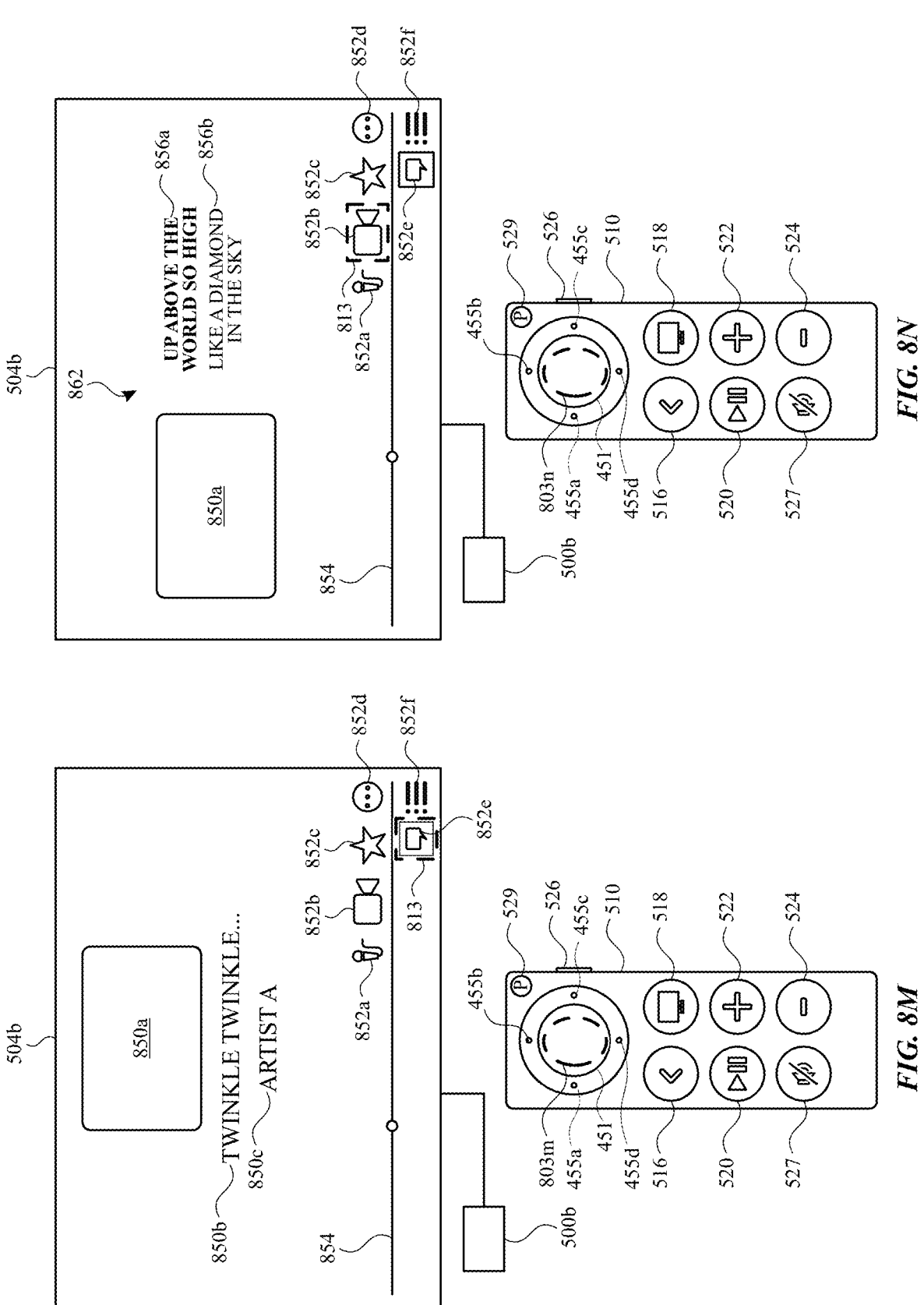

In FIG. 8M, the electronic device 500b plays a content item while displaying a user interface that includes an image 850a associated with the content item, an indication 850b of the title of the content item, an indication 850c of an artist of the content item, a scrubber bar 854, a vocal attenuation option 852a, a camera option 852b, an option 852c to add the content item to a list of "favorite" or "loved" content items, an option 852d to view more actions related to the content item, a lyrics option 852e, and a queue option 852f. In some embodiments, the image 850a is album artwork, playlist artwork, series artwork, or an audiobook cover corresponding to the content item. As shown in FIG. 8M, the electronic device 500a is currently not displaying time-synchronized lyrics for the content item and currently not displaying video content captured by another electronic device while playing the content item. In some embodiments, vocal attenuation and time-synchronized lyrics are available for the content item that is playing in FIG. 8M.

In FIG. 8M, the electronic device 500b receives an input via remote 510 (e.g., input device) selecting the lyrics option 852e. For example, the input focus 813 of the electronic device 500b is directed to the lyrics option 852e while the electronic device 500b detects a contact 803m with the input device 451. In response to the input illustrated in FIG. 8M, the electronic device 500b displays time-synchronized lyrics for the content item while continuing playback of the content item, as shown in FIG. 8N.

FIG. 8N illustrates the electronic device 500b displaying time-synchronized lyrics 856a and 856b in response to the input illustrated in FIG. 8M. In some embodiments, the electronic device 500b continues to play the content item while displaying the time-synchronized lyrics 856a and 856b. In some embodiments, the electronic device 500b displays the time-synchronized lyrics 856a and 856b in accordance with one or more steps of method 700 described above. For example, lyrics 856a corresponds to a portion of the content item that the electronic device 500b is currently playing and lyrics 856b corresponds to a portion of the content item that will play after the portion of the content item the electronic device 500b is currently playing. As shown in FIG. 8N, the electronic device 500b continues to display the image 850a associated with the content item while displaying the time-synchronized lyrics 856a and 856b.

As shown in FIG. 8N, the electronic device 500b receives an input selecting the camera option 852b. For example, the electronic device 500b receives a selection input (e.g., contact 803n in FIG. 8N) with the remote 510 (e.g., input device) while the input focus 813 (e.g., current focus) is directed to the camera option 852b. In some embodiments, between FIG. 8M and FIG. 8N, the electronic device 500b receives on or more inputs moving the input focus 813 from the lyrics option 852e to the camera option 852b, such as swipe inputs or other directional inputs detected with the remote 510 (e.g., input device). In response to receiving the input shown in FIG. 8N, the electronic device 500b displays the camera menu illustrated in FIG. 8O.

Figures 8O, 8P:
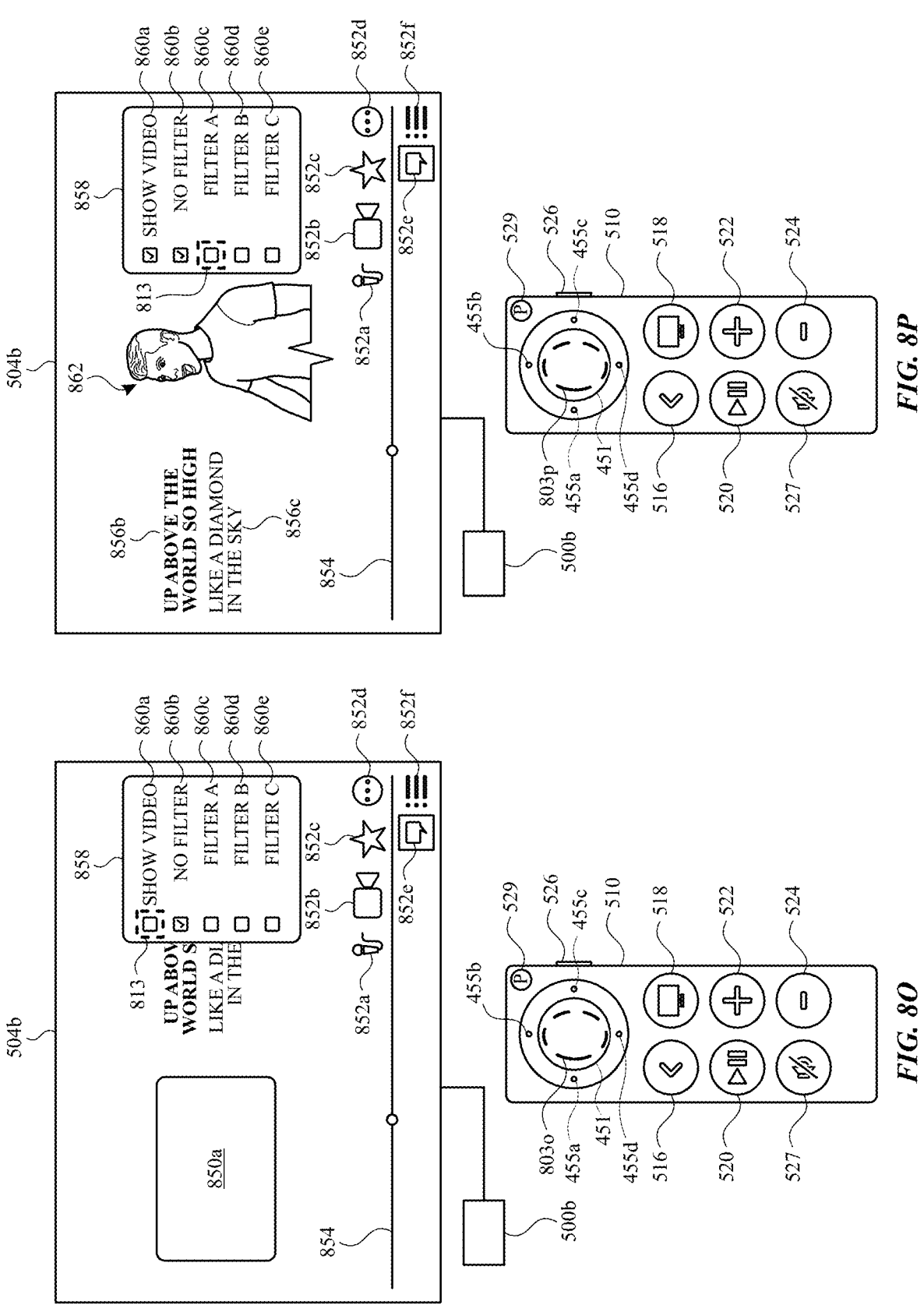

FIG. 8O illustrates an example of the electronic device 500b displaying a camera menu 858 in response to the input illustrated in FIG. 8N. In some embodiments, the electronic device 500 displays the camera menu 858 overlaid on the time-synchronized lyrics and/or the image 850a associated with the content item. In some embodiments, the camera menu 858 includes a plurality of options for controlling the presentation of (e.g., video or still image(s)) footage captured by a camera of another electronic device (e.g., electronic device 500a) in communication with electronic device 500b. For example, the camera menu 858 includes an option 860a for displaying the footage captured by the camera, an option 860b to display the footage with no filter (when displayed), and options 860c through 860e to display the footage with various filters (when displayed). In some embodiments, displaying the footage with a filter includes applying a visual effect to the footage, as described in more detail below with reference to method 900.

As shown in FIG. 8O, the electronic device 500b receives an input (e.g., contact 803o) selecting the option 860a to display the footage. The input optionally has one or more of the characteristics described above. In response to the input illustrated in FIG. 8O, the electronic device 500b, the electronic device 500b displays the footage as shown in FIG. 8P.

FIG. 8P illustrates an example of the electronic device 500b displaying footage 862 captured by a camera in response to the input illustrated in FIG. 8O. For example, footage 862 depicts the user singing along to the content item. In some embodiments, when displaying footage, 862 as shown in FIG. 8P, the electronic device 500b forgoes displaying the image 850a associated with the content item that was shown in FIG. 8O. As shown in FIG. 8P, the electronic device 500b continues to display the time-synchronized lyrics 856b and 856c while displaying the footage 862. In some embodiments, the electronic device 500b updates the position and/or text alignment of the time-synchronized lyrics 856b and 856c while displaying the footage 862. In some embodiments, the electronic device 500b displays the time-synchronized lyrics 856b and 856c overlaid on a gradient with a different color and/or translucency than a portion of the user interface without the lyrics 856b and 856c to increase the legibility of the time-synchronized lyrics overlaid on the footage 862.

In some embodiments, the electronic device 500b continues to display the camera menu 868 overlaid on the footage 862, as shown in FIG. 8P, in response to the input shown in FIG. 8O. In some embodiments, the electronic device 500b ceases display of the camera menu 858 in response to the input in FIG. 8O, and the electronic device 500b displays the camera menu 858 again in response to receiving another input selecting the camera option 852*b*. Additionally or alternatively, in some embodiments, between displaying the user interface in FIG. 8O and displaying the user interface in FIG. 8P, the electronic device 500*b* receives one or more inputs changing the position of the input focus 813 to be directed to filter option 860*c*. As shown in FIG. 8P, the electronic device 500*b* receives an input selecting filter option 860*c*. In some embodiments, the input is received using the remote 510 (e.g., input device), including detecting contact 803*p*, in a manner similar to the manner of detecting inputs described above. In response to the input shown in FIG. 8P, the electronic device 500*b* applies a visual effect to the footage 862 that corresponds to the filter of filter option 860*c*, as shown in FIG. 8Q.

Figures 8Q, 8R:
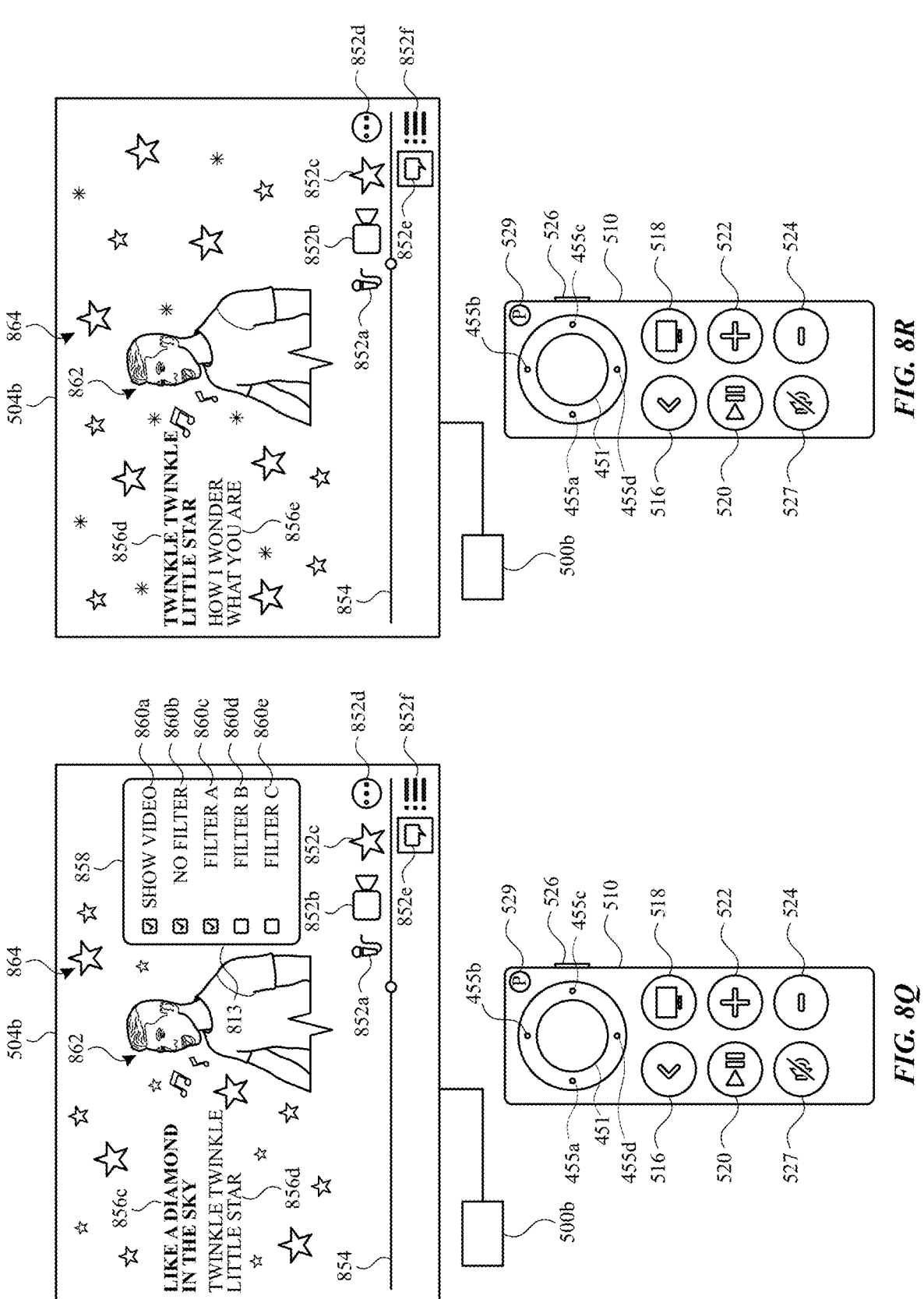

FIG. 8Q illustrates the electronic device 500*b* displaying the footage 862 with visual effect 864 in response to the input shown in FIG. 8Q. For example, the visual effect 864 includes displaying stars that are animated to change size, position, and/or color in accordance with audio of the content item, as described in more detail below with reference to method 900. In some embodiments, the colors included in the visual effect are based on the colors of the image 850*a* associated with the content item, shown in FIG. 8A, for example. In some embodiments, the colors of the visual effect 864 are different from the colors of the image 850*a* associated with the content item, but based on the colors of the image 850*a* associated with the content item, such as being generated with a random number generator seeded with the colors of the image 850*a* associated with the content item. In some embodiments, as shown in FIG. 8Q, in response to the input in FIG. 8P, the electronic device 500*b* continues to display the camera menu 858. In some embodiments, in response to the input in FIG. 8P, the electronic device 500*b* ceases display of the camera menu 858. In some embodiments, if the electronic device 500*b* received an input selecting option 860*d* or option 860*c*, the electronic device 500*b* would display the footage 862 with a different visual effect corresponding to the selected option.

In some embodiments, the visual effect 864 includes animation in accordance with the audio of the content item, as mentioned above and as described in more detail below with reference to method 900. As shown in FIG. 8R, as the content item continues to play, the electronic device 500*b* updates the appearance of the visual effect 864 the electronic device 500*b* applies to the footage 862. In some embodiments, the electronic device 500*b* also displays different time-synchronized lyrics 856*d* and 856*e* in FIG. 8R than time-synchronized lyrics in FIG. 8Q and updates scrubber bar 854 in accordance with the advancement of the playback position of the content item.

Figures 8S, 8T:
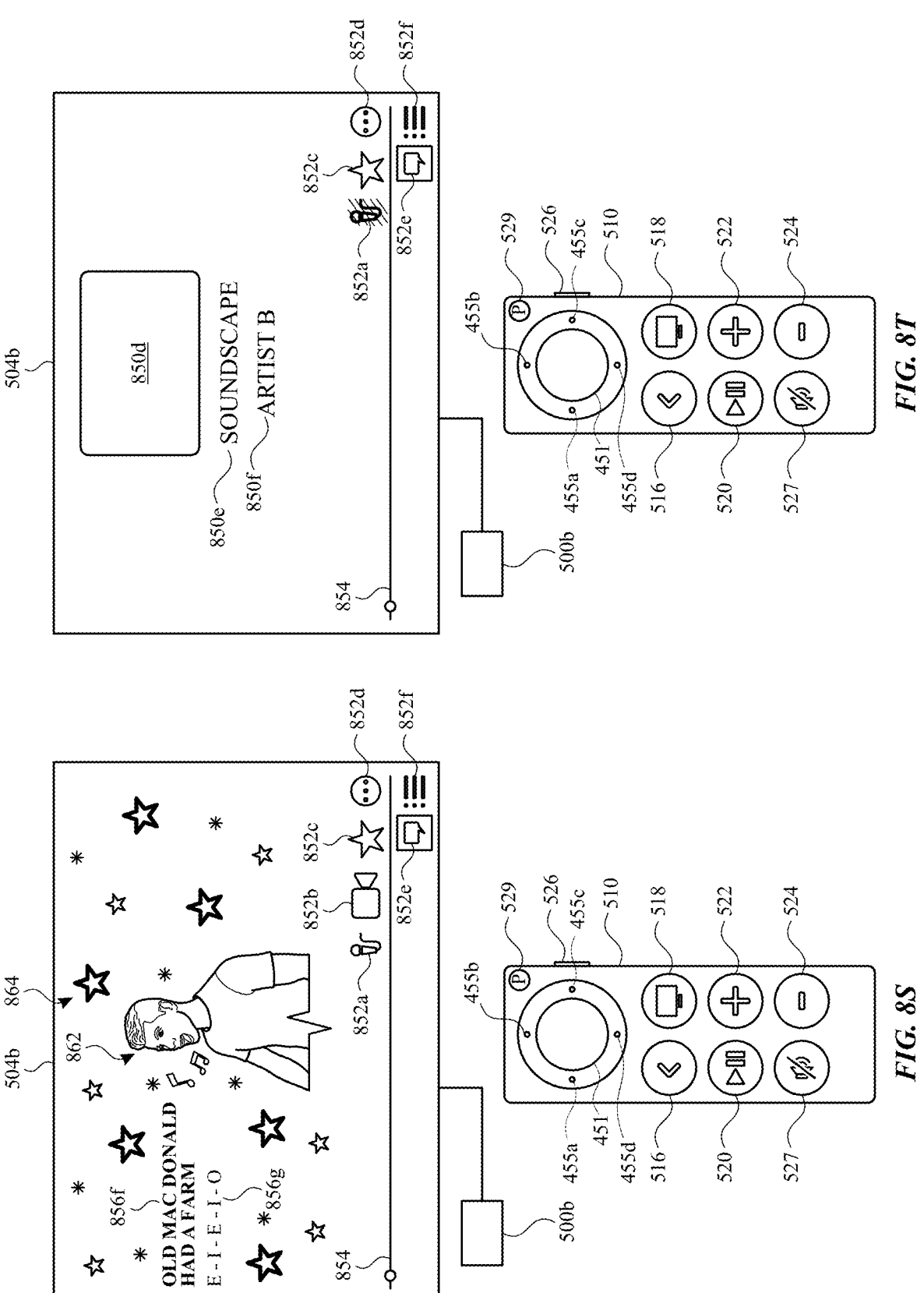

FIG. 8S illustrates the electronic device 500*b* displaying the footage 862 with the visual effect while playing a different content item from the content item that was playing in FIGS. 8M-8R. In FIG. 8S, the electronic device 500*b* displays time-synchronized lyrics 856*f* and 856*g*. In some embodiments, the electronic device 500*b* automatically plays the content item playing in FIG. 8S after finishing playing the content item playing in FIGS. 8M-8R and continues to display the footage 862 and the visual effect 864 unless the electronic device 500*b* receives one or more inputs requesting to cease displaying the footage 862 and the visual effect 864. In some embodiments, the electronic device 500*b* plays the content item in FIG. 8S in response to receiving one or more inputs requesting playback of the content item. In some embodiments, the electronic device 500*b* displays the footage 862 in FIG. 8S in response to receiving one or more inputs requesting the electronic device 500*b* to display the footage 862, similar to the input shown in FIG. 8O. In some embodiments, the electronic device 500*b* displays the visual effect 864 in FIG. 8S in response to receiving an input requesting the electronic device 500*b* apply the visual effect to the footage, such as the input shown in FIG. 8P. In some embodiments, because the colors of the visual effect are based on colors included in an image associated with the content item, if the content item playing in FIG. 8S is associated with a different image than the image associated with the content item playing in FIGS. 8M-8R, then the visual effect 864 in FIG. 8S includes different colors than the colors included in the visual effect 864 in FIG. 8R. For example, FIG. 8S illustrates the starts included in visual effect 864 with different line thickness than the line thickness of the stars included in visual effect 864 in FIG. 8R to represent using different colors for the visual effect 864 in FIG. 8S than the colors used for the visual effect 864 in FIG. 8R.

In some embodiments, vocal attenuation and/or time-synchronized lyrics are not available for all content items the electronic device 500*b* is able to play, as described in more detail below with reference to method 900. In some embodiments, if vocal attenuation is not available, the electronic device 500*b* does not display the camera option 852*b* and/or deactivates the vocal attenuation option 852*a*, as shown in FIG. 8T.

FIG. 8T illustrates an example of the electronic device 500*b* presenting a content item for which vocal attenuation is not available. As shown in FIG. 8T, the electronic device 500 displays an image 850*d* associated with the content item, an indication 850*e* of the name of the content item, and an indication 850*f* of the artist associated with the content item while playing the content item. While playing the content item for which vocal attenuation is not available, the electronic device 500*b* does not display the camera option 852*b* that was displayed in FIGS. 8M-8S and displays the vocal attenuation option 852*a* with a greyed out appearance, as shown in FIG. 8T. In some embodiments, while displaying the vocal attenuation option 852*a* with the greyed out appearance, the electronic device 500*b* forgoes modifying the playback volume of the vocal portion of the content item separately from the overall playback volume of the content item in response to receiving an input selecting the vocal attenuation option 852*a*.

Further details regarding features illustrated and described above with reference to FIGS. 8A-8L are provided below with reference to method 900.

Figure 9:
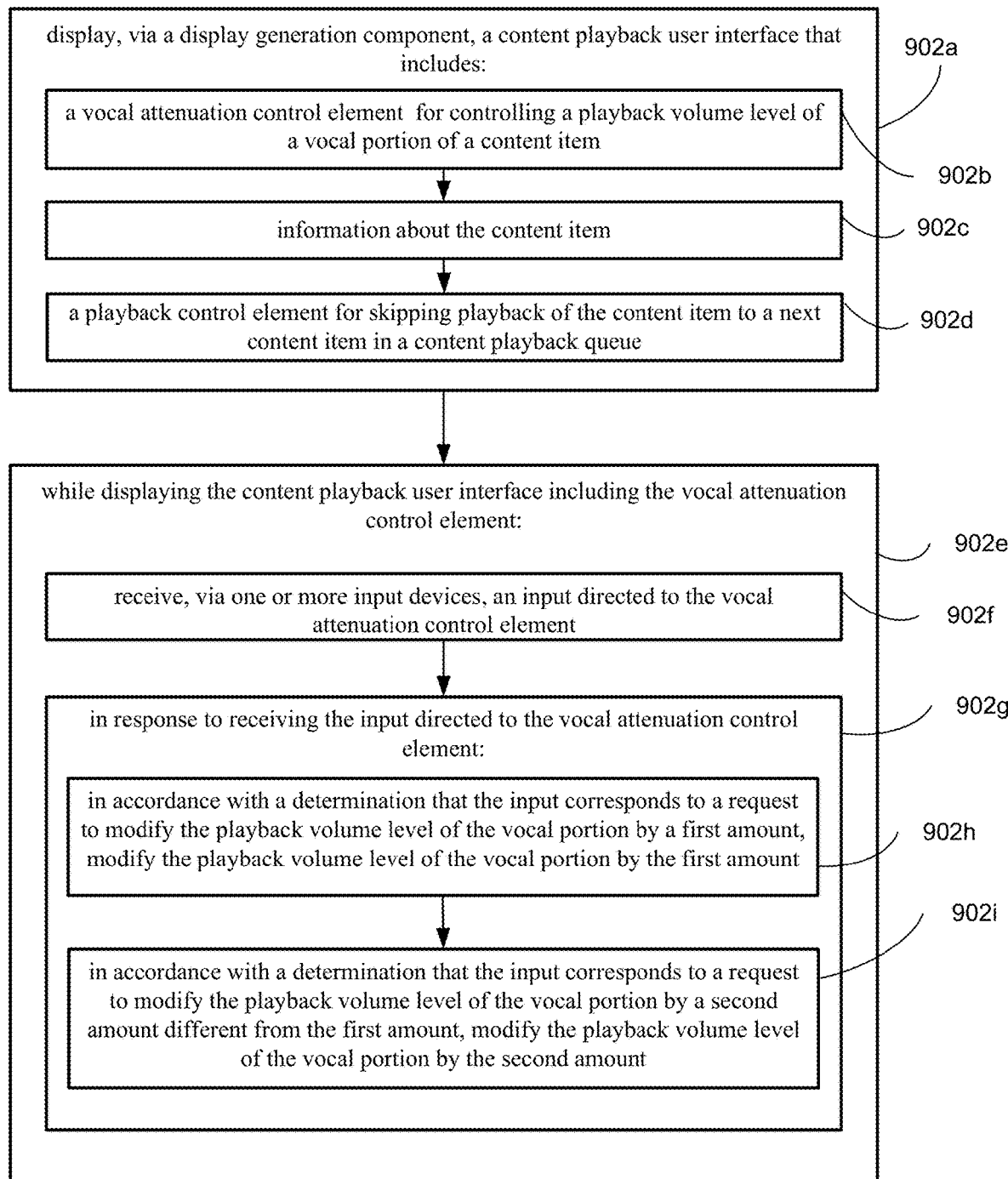
FIG. 9 is a flow diagram illustrating a method of displaying a vocal attenuation control element and changing a vocal volume of a content item, in response to input directed to the vocal attenuation control element in accordance with some embodiments of the disclosure.

FIG. 9 is a flow diagram illustrating a method 900 of displaying a vocal attenuation control element and changing a vocal volume of a content item, in response to input directed to the vocal attenuation control element in accordance with some embodiments of the disclosure. The method 900 is optionally performed at first/electronic devices such as device 100, device 300, device 500, device 500*a*, device 500*b*, device 500*c* or device 500*d*, such as described above with reference to FIGS. 1A-1B, 2-3, 4A-4B and 5A-5C. Some operations in method 900 are, optionally, combined and/or order of some operations is, optionally, changed.

As described below, the method 900 provides ways in which electronic devices mute or reduce the playback volume level of a vocal/verbal portion of a content item relative to the overall playback volume of the content item. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges. In some embodiments, method 900 is performed at an electronic device in communication with a display generation component and one or more input devices. For example, the electronic device described above with reference to method 700, the display generation component described above with reference to method 700, and/or the one or more input devices described above with reference to method 700.

In some embodiments, the electronic device displays (902*a*), via the display generation component, a content playback user interface, such as shown in FIG. 8A with the playback user interface 802*a*, (optionally including one or more characteristics of the user interfaces described with reference to step(s) 702 and/or illustrated in FIGS. 6A-6K) that includes a vocal attenuation control element (e.g., a slider, a dial, a toggle, a segmented control, or another type of control element) for controlling a playback volume level of a vocal portion of a content item (902*b*) (relative to an unattenuated playback volume level of the content item at a playback volume level of the content item on the electronic device), such as shown in FIG. 8A with the selectable vocal attenuation mode option 814*d* (e.g., vocal volume attenuation control element), information about the content item (902*c*) (e.g., an icon or photo corresponding to the content item, an indication of the current position within the content item, and/or names of musicians or artists of the content item), such as shown in FIG. 8A with the title and artist indication in indication 818 and album artwork 816, and a playback control element for skipping playback of the content item to a next content item (e.g., a fast-forward playback icon) in a content playback queue (902*d*), such as shown in FIG. 8A with the skip forward option 808*c* (e.g., without changing the volume level of an instrumental or any non-vocal portion of the content item). The content playback user interface is optionally a content control playback user interface. The vocal attenuation control element is optionally a vocal attenuation control icon. The content playback user interface optionally includes a plurality of user interface elements for controlling various aspects of playback of the content item, including the vocal attenuation control element for controlling a playback volume level of the focal portion of the content item and the playback control element for skipping playback of the content item. For example, the content playback user interface optionally includes a "play" user interface element, a volume user interface element, a fast-forward user interface element, a rewind user interface element, a "more info" user interface element, a thumbnail of a content item, an indication of a volume of the playback of the content item, a user interface element selectable to view queue information corresponding to a queue of playback of content items, and/or a user interface element selectable to view lyrics associated with the content item (e.g., in one or more of the ways described with reference to method 900). The plurality of user interface elements are optionally user-selectable for performing their respective functions. For example, in response to receiving selection of the playback control element for skipping playback of the content item to the next content item in the content playback queue, the electronic device optionally replaces display of the information about the content item and displays information about the next content item and/or ceases playback of the content item and begins playback of the next content item.

In some embodiments, while displaying the content playback user interface including the vocal attenuation control element (902*e*), the electronic device receives (902*f*), via the one or more input devices, an input directed to the vocal attenuation control element, such as shown in FIG. 8A with the contact 830*a*. For example, a contact on a touch-sensitive display that displays the vocal attenuation control element at a location of the vocal attenuation control element (e.g., a tap and hold for longer than a time threshold, such as 0.1, 0.3, 0.5, 1, 3, 5 or 10 seconds), and/or (subsequent) movement of the contact on the touch-sensitive display that displays the vocal attenuation control element after the vocal attenuation control element has been displayed. In some embodiments, the input includes a directional input such as movement in a lateral direction along the touch-sensitive display, or selection of an arrow key of a keyboard in communication with the electronic device.

In some embodiments, in response to receiving the input directed to the vocal attenuation control element (902*g*), and in accordance with a determination that the input corresponds to a request to modify the playback volume level of the vocal portion by a first amount, the electronic device modifies (902*h*) the playback volume level of the vocal portion by the first amount (e.g., without changing the playback volume level of an instrumental or any non-vocal portion of the content item), such as shown between FIGS. 8A and 8B with changes in the vocal volume level as indicated by the glyphs 815 in FIGS. 8A and 8B. For example, the playback volume level of the vocal portion is optionally at a first playback volume level when the input directed to the vocal attenuation control element is received. The first playback volume level is optionally a default volume level (e.g., an unattenuated playback volume level) of the vocal portion relative to the volume level of other portions of the content item (e.g., an instrumental or any non-vocal portion of the content item) at the playback volume level of the content item on the electronic device). For example, the first playback volume level is optionally a volume level of the vocal portion that is not modified relative to other portions of the content item (e.g., the content item is in a state that does not include vocal attenuation, such as an unmodified state of the content-item). As another example, the first playback volume level optionally corresponds to 100% vocal volume level of the content item at a respective volume level of the content item on the electronic device. For example, when the electronic device (or another audio output device in communication with the electronic device) plays audio (e.g., generates audio) corresponding to the content item at a maximum allowable volume level of the electronic device (or of the other audio output device in communication with the electronic device), the playback volume level of the vocal portion at the first playback volume level (e.g., at 100% vocal volume level of the content item) corresponds to an unattenuated playback volume level of the vocal portion of content item. Similarly, when the electronic device (or the other audio output device in communication with the electronic device) plays audio (e.g., generates audio) corresponding to the content item at an allowable volume level of the electronic device that is less than the maximum allowable volume level, such as 20%, 50%, or 70% of the maximum allowable volume level, the playback volume level of the vocal portion at the first playback volume level (e.g., at 100% vocal volume level of the content item) corresponds to an unattenuated playback volume level of the vocal portion of content item at the allowable volume level of the electronic device that is less than the maximum allowable volume level. For example, when the electronic device is playing audio of the content item at 20% of the maximum allowable volume level of the electronic device (or of the other audio output device in communication with the electronic device) and the playback volume level of the vocal portion is at the first playback volume level (e.g., at 100% vocal volume level of the content item), playing audio of the content item at 20% optionally includes the playback volume level of the vocal portion at the first playback volume level (e.g., at 100% vocal volume level of the content item) corresponding to the audio of the content item at 20%.

The request to modify the playback volume level of the vocal portion by the first amount is optionally a request to set the playback volume level of the vocal portion to an amount less than the first playback volume level of the vocal portion. For example, the request is optionally a request to change the first playback volume level of the vocal portion, as discussed above, from 100% vocal volume level of the content item at the respective volume level of the content item on the electronic device (e.g., at 20%, 50%, or 70% of the maximum allowable volume level on the electronic device (or of the other audio output device in communication with the electronic device)) to an amount that is less than 100% vocal volume level (e.g., 95%, 60%, 23%, 0%) at the respective volume level of the content item on the electronic device (e.g., at 20%, 50%, or 70% of the maximum allowable volume level on the electronic device (or of the other audio output device in communication with the electronic device)). In some embodiments, such as when the first playback volume level is less than 100% when the input is received, the request to modify the playback volume level of the vocal portion by the first amount is optionally a request to set the playback volume level of the vocal portion to an amount greater than the first playback volume level of the vocal portion. Playback of the content item optionally continues before, during, and/or after the request to modify the playback volume level is received. The magnitude of the first amount optionally corresponds to the magnitude corresponding to the input (when the input includes a magnitude component). Changing the overall content item volume changes both the vocal volume level and the non-vocal volume levels.

In some embodiments, in accordance with a determination that the input corresponds to a request to modify the playback volume level of the vocal portion by a second amount different from the first amount, the electronic device modifies (902i) the playback volume level of the vocal portion by the second amount (e.g., without changing the playback volume level of the instrumental or any non-vocal portion of the content item), such as shown between FIGS. 8F and 8G with changes in the vocal volume level as indicated by the glyphs 815 in FIGS. 8F and 8G. The second amount is optionally described as above with regard to the first amount, just with a different magnitude and/or direction than the first amount. The second amount is optionally greater than or less than the first amount. The second amount is optionally an amount corresponding to a partial or total attenuation (e.g., a mute of a vocal portion). In some embodiments, in response to the input corresponding to the request to modify the playback volume level of the vocal portion, the electronic device modifies the playback volume level of the vocal portion of the content item by an amount that is in accordance with the input.

Modifying a playback volume level of a vocal portion of a content item enhances karaoke performances and allows for an appropriate amount of vocal guidance during such performances.

In some embodiments, in accordance with a determination that the input directed to the vocal attenuation control element satisfies one or more criteria (e.g., the input is a tap on the vocal attenuation control element displayed via a touchscreen) and in accordance with a determination that the playback volume level of the vocal portion was not a mute playback volume level when the input directed to the vocal attenuation control element is detected, modifying the playback volume level of the vocal portion by the first amount includes muting the playback volume level of the vocal portion, such as shown between FIGS. 8A and 8B with the vocal volume level muted as indicated by the glyph 815 in FIG. 8B. In some embodiments, the playback volume level of the vocal portion that is not a mute playback volume level is a maximum playback volume level relative to the playback volume of the content item overall. For example, the vocal portion is not attenuated. In some embodiments, the playback volume level of the vocal portion that is not a mute playback volume level is an attenuated playback volume level that includes playback for the vocal part at a reduced volume level relative to playback of the content item overall. In some embodiments, muting the playback volume level of the vocal portion includes continuing to play portions of the content item other than the vocal portion, such as an instrumental portion. In some embodiments, muting the playback volume level of the vocal portion includes muting a main vocal portion and continuing to play one or more backup vocal portions of the content item. In some embodiments, muting the playback volume level of the vocal portion includes muting a main vocal portion and muting one or more backup vocal portions of the content item.

In some embodiments, in accordance with a determination that the input directed to the vocal attenuation control element satisfies one or more criteria (e.g., the input is a tap on the vocal attenuation control element displayed via a touchscreen), and in accordance with a determination that the playback volume level of the vocal portion was the mute playback volume level when the input directed to the vocal attenuation control element is received, modifying the playback volume level of the vocal portion by the second amount includes unmuting the playback volume level of the vocal portion. For example, if the electronic device receives an input is directed to the vocal attenuation control element while the vocal volume is muted such as the muted vocal volume level indicated by the glyph 815 in FIG. 8B, the electronic device optionally unmutes the vocal volume. In some embodiments, the one or more criteria includes a criterion that is satisfied when the input is a tap input (e.g., a touch on a touch-sensitive surface lasting for less than a threshold period of time (e.g., 0.1, 0.3, 0.5, 1, 3, 5 or 10 seconds, or another threshold period of time) and the corresponding release of the contact from touching the touch-sensitive surface). In some embodiments, when the one or more criteria are satisfied, including the criterion that is satisfied when the input is the tap input, one or more other criteria, including a slider criteria that is satisfied when the input is a touch and hold for longer than a threshold period of time (e.g., 0.1, 0.3, 0.5, 1, 3, 5 or 10 seconds, or another threshold period of time), is not satisfied. In some embodiments, unmuting the playback volume level of the vocal portion includes initiating playback of the vocal portion with the other portions of the content item. In some embodiments, unmuting the playback volume level of the vocal portion includes playing the vocal portion at a playback volume relative to the playback volume of the content item overall at the playback volume at which the electronic device was playing the vocal portion when the request to mute the vocal portion was received. For example, while playing the content item, including playing the vocal portion of the content item at a first attenuated volume level, the electronic device receives an input to mute the playback volume level of the vocal portion and then receives an input corresponding to a request to unmute the playback volume level of the vocal portion. In this example, in response to the input to unmute the playback volume level of the vocal portion, the electronic device plays the vocal portion of the content item at the first attenuated volume level. For example, while playing the content item, including playing the vocal portion of the content item at a second attenuated volume level different from the first attenuated volume level, the electronic device receives an input to mute the playback volume level of the vocal portion and then receives an input corresponding to a request to unmute the playback volume level of the vocal portion. In this example, in response to the input to unmute the playback volume level of the vocal portion, the electronic device plays the vocal portion of the content item at the second attenuated volume level. In some embodiments, unmuting the playback volume level of the vocal portion includes playing the vocal portion at a maximum playback volume relative to the playback volume of the content item overall. In some embodiments, in response to receiving the input directed to the vocal attenuation control element that satisfies the one or more criteria, the electronic device toggles the mute playback volume level of the vocal portion of the content item. Muting or unmuting a playback volume level of a vocal portion of a content item (optionally during the playback of the content item) in response to selection of the vocal attenuation control element simplifies vocal volume control.

In some embodiments, the vocal attenuation control element is a slider user interface element that includes a visual indication of the playback volume level of the vocal portion, such as shown in FIG. 8C with the slider 828 in the user interface element 829 indicating a top or maximum position. In some embodiments, the determination that the input corresponds to the request to modify the playback volume level of the vocal portion by the first amount corresponds to detecting a first amount of movement of the visual indication of the playback volume level of the vocal portion, such as shown between FIGS. 8C and 8D with vocal volume level decreasing to the slider level shown in FIG. 8D in accordance with contact 830*b* and movement thereof indicated by the arrow 832. In some embodiments, the determination that the input corresponds to the request to modify the playback volume level of the vocal portion by the second amount corresponds to detecting a second amount of movement of the visual indication of the playback volume level of the vocal portion. For example, in FIG. 8C, if the movement of the contact 830*b* on the slider 828 corresponds to a request to move the slider 828 to a level that is different the slider level shown in FIG. 8D, the electronic device optionally move the slider 828 to that different level. In some embodiments, the method 900 includes detecting an input including selection of the slider user interface element and/or one or more of movement, such as movement of a finger and/or contact on a touch-sensitive surface or another input device discussed in this present disclosure, and direction (e.g., up, down, to the right, to the left, or another direction across the touch-sensitive surface along the slider user interface element) and causing movement (in a direction) of the visual indication of the playback volume level within the slider user interface element to be in accordance with the detected movement (and direction). In some embodiments, the direction of the modification of the playback volume level of the vocal portion is optionally the same direction as the direction of the movement of the slider user interface element.

For example, sliding the slider up, to the right, or counter-clockwise optionally corresponds to a request to increase the playback volume level of the vocal portion, and sliding the slider down, to the left, or clockwise optionally corresponds to a request to decrease the playback volume level of the vocal portion. It should be noted that other directions and/or alternative directions are optionally correlated to the request to increase and/or decrease the playback volume level of the vocal portion; accordingly, the above-recited directions are non-limiting. As such, an amount of vocal attenuation is optionally adjusted via adjusting a slider of the vocal attenuation control element. In some embodiments, a lowest position of the slider user interface element corresponds to a mute vocal volume level, such as described in more detailed below. In some embodiments, a top or highest position of the slider user interface element corresponds to a maximum vocal volume level relative to a playback volume of a non-vocal part of the content item, such as described in more detailed below. In some embodiments, a visual indication position indicates an amount of attenuation based on relative distances from each end of the slider user interface element (e.g., the lowest position and the top position). In some embodiments, the slider user interface element is displayed in response to selection of the vocal attenuation control element, such as described in more detailed below. It should be noted that in some embodiments, a volume other than a vocal volume is based on an audio volume slider corresponding to a total audio volume level corresponding to playback of the content item. The audio volume slider is optionally concurrently displayed with the slider user interface element, is optionally different from the slider user interface element, and is optionally controlled independently of the slider user interface element. In some embodiments, the audio volume slider is not displayed concurrently with display of the slider user interface element. Adjusting the playback volume level of the vocal portion in response to detecting movement of the visual indication of the playback volume level of the vocal portion in the slider user interface element associates vocal volume control to the slider user interface element and reduces inputs involved with adjusting the playback volume level of the vocal portion.

In some embodiments, in response to receiving the input directed to the vocal attenuation control element, in accordance with a determination that the input corresponds to a request to move the visual indication of the playback volume level of the vocal portion to a position corresponding to a minimum amount of playback volume level of the vocal portion (e.g., to a fully down slider level, a lowest slider level, or another slider level that corresponds to maximum vocal attenuation and/or minimum vocal volume), the electronic device modifies the playback volume level of the vocal portion of the content item to a mute volume level while the playback volume level of a portion of the content item other than the vocal portion (e.g., an instrumental portion and/or a non-vocal portion) is not a mute volume level (and/or not attenuated). For example, in FIG. 8C, if the movement of the contact 830*b* on the slider 828 corresponds to a request to move the slider 828 to a lowest level, the electronic device optionally mutes the vocal volume. The playback volume level of the portion of the content item other than the vocal portion is optionally not changed or affected by the change in the playback volume level of the vocal portion of the content item. In some embodiments, playing the content item with the vocal portion muted is in accordance with one or more characteristics described above. As such, the method 900 optionally includes playing the content item without playing vocal of the content item when the vocal attenuation control slider is at a position that corresponds to maximum vocal volume attenuation (of the content item). In some embodiments, the method 900 includes visually moving the visual indication of the playback volume level of the vocal portion to a position corresponding to a minimum amount of playback volume level of the vocal portion (e.g., to the fully down slider level, the lowest slider level, or another slider level that corresponds to maximum vocal attenuation). In some embodiments, the method 900 includes receiving the request while operation in the vocal volume attenuation mode, in which the vocal volume level of the content item is attenuated. In some embodiments, the method 900 includes receiving the request while not operation in the vocal volume attenuation mode, in which the vocal volume level of the content item is not unattenuated. Playing the content item without playing vocals of the content item when the vocal attenuation control slider is fully down corresponds the vocal attenuation control slider position to the playback of the vocals of the content item and reduces inputs involved with muting the playback volume level of the vocal portion.

In some embodiments, in response to receiving the input directed to the vocal attenuation control element in accordance with a determination that the input corresponds to a request to move the visual indication of the playback volume level of the vocal portion to a position corresponding to a maximum amount of playback volume level of the vocal portion (e.g., to a fully up slider level, a highest slider level, or another slider level that corresponds to minimum or no vocal attenuation), the electronic device modifies the playback volume level of the vocal portion of the content item to be an unattenuated vocal volume level relative to the playback volume level of the portion of the content item other than the vocal portion (e.g., an instrumental portion and/or a non-vocal portion). For example, in FIG. 8D, if the electronic device receives an input directed to the slider 828 corresponding to move the slider 828 to the top level, the electronic device optionally moves the slider 828 to the top level, ceasing attenuation of the vocal volume. For example, while operation in a vocal volume attenuation mode, in which the vocal volume level of the content item is attenuated, the electronic device receives a request to move the visual indication of the vocal volume level of the content item to a position corresponding to an unattenuated vocal volume level. In this example, in response to receiving the request, the playback vocal volume level optionally changes to an unattenuated volume level, such as to a volume level that is in accordance with a vocal volume level (relative to non-vocal volume level) of the content item, as published. As such, the content item optionally plays without any vocal volume attenuation in response to the modification of the playback volume level of the vocal portion of the content item to be the unattenuated volume level. Accordingly, the method 900 optionally includes playing the content item without any vocal volume attenuation in response to the modification of the playback volume level of the vocal portion of the content item to be the unattenuated volume level. In some embodiments, the method 900 includes visually moving the visual indication of the playback volume level of the vocal portion to a position corresponding to a maximum amount of playback volume level of the vocal portion (e.g., to the fully up slider level, the highest slider level, or another slider level that corresponds to minimum vocal attenuation). In some embodiments, the method 900 includes receiving the request while operation in the vocal volume attenuation mode, in which the vocal volume level of the content item is attenuated. The playback volume level of the portion of the content item other than the vocal portion is optionally not changed or affected by the change in the playback volume level of the vocal portion of the content item. Modifying the playback volume level of the vocal portion of the content item to be an unattenuated playback volume level of the vocal portion of the content item in response to the request to move the visual indication to a position corresponding to the unattenuated playback volume level corresponds the vocal attenuation control slider position to the playback of the vocals of the content item and reduces inputs involved with removing playback of the vocal volume at which the content item plays from volume attenuation.

In some embodiments, the content item is a first content item and the vocal portion is a first vocal portion, such as shown in FIG. 8A with album artwork 816 and the indication 818. In some embodiments, in response to receiving the input directed to the vocal attenuation control element, in accordance with the determination that the input corresponds to a request to modify the playback volume level of the first vocal portion by the first amount, the electronic device modifies the playback volume level of the first vocal portion by the first amount (e.g., a first percentage relative to an unattenuated playback volume level of the vocal portion at a respective playback volume level of the content item on the electronic device (or on an audio output device in communication with the electronic device), such as discussed above with reference to step(s) 902), such as shown between FIGS. 8C and 8D with the reduction in vocal volume level as indicated by the glyph 815 in FIG. 8D, wherein modifying the playback volume level by the first amount includes generating audio of the vocal portion at a first playback volume level relative to a playback volume level of the first content item (e.g., relative to a total playback volume level of the first content item and/or relative to a non-vocal portion of the first content item). In some embodiments, modifying the playback volume level by the first amount includes playing the audio of the vocal portion at the first playback volume level.

In some embodiments, in accordance with a determination that playback of a second content item, such as shown in FIG. 8J with the album artwork 816 and the indication 818, different from the first content item, is upcoming (e.g., next in a playback queue or within a predetermined time of being in playback (e.g., 0 s, 0.5 s, 1.5 s, 5 s, 10 s, 1 min, or another predetermined period of time), the electronic device initiates a process to generate audio of a second vocal portion of the second content item at the first playback volume level relative to playback of the second content item (e.g., relative to a total playback volume level of the second content item and/or relative to a non-vocal portion of the second content item). For example, the electronic device initiates a process to cause the vocal volume level, such as indicated by the glyph 815 of FIG. 8J, for the second content item to be the same as the vocal volume level for the first content item, such as indicated by the glyph 815 of FIG. 8E. In some embodiments, the second content item is a content item that is a next content item in a content item queue that the electronic device will automatically play after playback of the first content item ends or in response to the electronic device detecting a user input to skip to the second content item, optionally while playback of the first content item is current. In some embodiments, the second content item is a content item that the electronic device will play in response to detecting user input to play the second content item, independent of whether the second content item in a content item queue with the first content item. The electronic device optionally automatically maintains the vocal attenuation level for the first content item for the second content item without user input configuring the vocal attenuation level for the second content item. For example, the electronic device optionally maintains the slider position of the slider user interface element discussed above, for the first content item for the second content item. In some embodiments, the process additionally or alternatively includes fetching first data of the second content item and second data of the second content item, such as generally described below. In an example, the playback volume level of the vocal portion of the content item is optionally a first playback volume level. The first playback volume level is optionally an attenuated vocal volume level or an unattenuated vocal volume level, such as described above, and a visual indication of the playback volume level of the vocal portion of the first content item is optionally displayed at a location that corresponds to the first playback volume level, such as the visual indication discussed above. In this example, when the electronic device initiates playback of a second content item, the electronic device optionally initiates playback of the second content item with a vocal portion of the second content item at the first playback volume level and/or the electronic device optionally displays the visual indication of the playback volume level of the vocal portion of the second content item at the same location that the visual indication was displayed when the first content item was in playback with the vocal portion of the first content item at the first playback volume level automatically. Accordingly, the method 900 optionally includes maintaining a vocal volume level and/or a position of a visual indication of the vocal volume level between different content items, such that while playing the first content item at a first playback volume level of the vocal portion of the first content item, in accordance with a determination that the visual indication is at a first position when playback of the second content item is upcoming, the display generation component displays the visual indication at the first position during playback of the second content item. It should be noted that the first playback volume level of the first vocal portion relative to the total playback volume of the first content item is optionally a different decibel level than the first playback volume level of the vocal portion of the second content item relative to the total playback volume of the second content item, though proportional and/or percentage-wise relative to the audio data associated with the content item, the playback volume levels are similar or the same. Indeed, the unattenuated vocal volume level of the first content item and the second content item are optionally different in decibel level amount, though proportional and/or percentage-wise relative to the audio data associated with the content item, the playback volume levels are similar or the same. For example, generating audio of the vocal portion at the first playback volume level relative to playback of the first content item that is 20% reduced relative to an unattenuated vocal volume level optionally corresponds to a first decibel level of playback of the first content item and generating audio of the vocal portion at the first playback volume level relative to playback of the second content item that is 20% reduced relative to an unattenuated vocal volume level optionally corresponds to a second decibel level of playback of the first content item, different or same as the first decibel level of playback of the first content item. Maintaining the visual indication of the playback volume level of the vocal portion of the content item in playback between playback of different content items automatically causes a content item upcoming in playback to initiate playback with vocal attenuation without further input.

In some embodiments, the vocal attenuation control element is a slider user interface element that includes a visual indication of the playback volume level of the first vocal portion, such as the slider user interface element described above, such as shown in FIG. 8C with the slider 828 in the user interface element 829 indicating a top or maximum position.

In some embodiments, in response to receiving the input directed to the vocal attenuation control element, the electronic device visually updates the visual indication of the playback volume level of the first vocal portion to a position corresponding to the first playback volume level relative to playback of the first content item, such as shown in FIG. 8D with the slider 828 level indicating a position between the top and bottom slider levels. In some embodiments, the operations include visually moving or shifting the position of the visual indication of the playback volume level of the vocal portion included in the slider user interface element in accordance with the input directed to the vocal attenuation control element.

In some embodiments, while playing the second content item, such as shown in FIG. 8J with the album artwork 816 and the indication 818, (optionally while displaying the slider user interface element or while the slider user interface element is ceased from display) and prior to receiving a second input directed to the vocal attenuation control element corresponding to a request to change the playback volume level of the second vocal portion from the first playback volume level to a second playback volume level, the electronic device displays, via the display generation component, the vocal attenuation control element with the visual indication of the playback volume level of the second vocal portion at the position corresponding to the first playback volume level relative to playback of the second content item (e.g., corresponding to the percentage of attenuation given by the first playback volume level relative to an unattenuated playback volume level of the first content item), such as discussed above. For example, the electronic device optionally displays the slider 828 for the second content item at the same level as in FIG. 8D. As such the slider 828 for the second content item is moveable from that same level. In some embodiments, while playing the second content item, the electronic device detects user input including a input directed to the vocal attenuation control element, such as an input discussed above with reference to steps 902(s), and in response, the electronic device displays the slider user interface element, including displaying the visual indication (e.g., the slider) at the position corresponding to the first playback volume level, which is the same position to which the visual indication is updated. In some embodiments, the method 900 includes receiving the second input, and in response, updating the visual indication of the playback volume level of the second vocal portion to a position corresponding to a playback volume level different from the first playback volume level and in accordance with the input. As such, the method 900 optionally includes displaying the visual indication of the playback volume level of the vocal portion of the second content item at the same position and as the position of the visual indication of the playback volume level of the first vocal portion of the first content item. Displaying the visual indication of the playback volume level of the second vocal portion of the second content item at the same position as the position at which the visual indication of the playback volume level of the first vocal portion of the first content item was displayed configures the visual indication (and corresponding playback volume level of the second vocal portion of the second content item) to be adjusted from the previous position (and corresponding playback volume level) and reduces abruptness with modifying the vocal volume level of the second vocal portion.

In some embodiments, in accordance with a determination that one or more first criteria are satisfied, the electronic device displays the content playback user interface includes the vocal attenuation control element, such as shown in FIG. 8A with the selectable vocal volume attenuation mode option 814*d* (e.g., operating the electronic device in a first playback mode, including displaying the content playback user interface including the vocal attenuation control element). The one or more first criteria optionally are satisfied when the electronic device displays time-synchronized lyrics while playing the content item, such as generally illustrated in FIGS. 6A-6K and described with reference to the method 700, and/or when a network speed is above a threshold speed, such as a download speed of 50 Mbps, 100 Mbps, 150 Mbps, 200 Mbps, 250 Mbps, or more, or another threshold download speed.

In some embodiments, in accordance with a determination that one or more first criteria are not satisfied, displaying the content playback user interface excludes the vocal attenuation control element (e.g., operating the electronic device in a second playback mode, including displaying the content playback user interface excluding the vocal attenuation control element). For example, the electronic device optionally displays the playback user interface 802*i* of FIG. 8I without the selectable vocal volume attenuation mode option 814*d*. The one or more first criteria optionally are not satisfied when the electronic device is not displaying the time-synchronized lyrics while playing the content item and/or when a network speed is below a threshold speed, or a network connectivity is weak. Additionally or alternatively, in some embodiments, the method 900 includes in accordance with a determination that one or more first criteria are satisfied, displaying the content playback user interface including the vocal attenuation control element, wherein the vocal attenuation control element is selectable for vocal attenuation control, and in accordance with a determination that the one or more first criteria are not satisfied, displaying the content playback user interface including the vocal attenuation control element, wherein the vocal attenuation control element is not selectable and/or not selectable for vocal attenuation control. Displaying the vocal attenuation control element in accordance with satisfaction of specific criteria allows for vocal attenuation control under specific conditions and may reduce system errors associated with vocal attenuation control.

In some embodiments, a first criterion of the one or more first criteria is satisfied when text representations of verbal content of the content item (e.g., lyrics such as time-synced lyrics according to one or more steps of method 700 and/or illustrated and described with reference to FIGS. 6A-6K) are displayed in the content playback user interface, such as discussed above regarding the lyrics playback mode. For example, the electronic device optionally displays the playback user interface 802*i* of FIG. 8I without the selectable vocal volume attenuation mode option 814*d* optionally because the electronic device is not operating in a lyrics mode. In some embodiments, the first criterion is not satisfied when the electronic device does not display text representations of verbal content of the content item. Displaying the vocal attenuation control element in accordance with satisfaction of specific criteria, including a criterion that is satisfied when lyrics of the content item in playback are displayed allows for vocal attenuation control under during a lyrics playback mode, may reduce system errors associated with vocal attenuation control, and may assist in karaoke performance.

In some embodiments, while displaying the content playback user interface including the vocal attenuation control element, and while a playback volume level of the vocal portion is attenuated, such as shown in FIG. 8H with the playback user interface 802*h* and the vocal volume level glyph 815, (at a level that is less than 100% vocal volume level (e.g., 95%, 60%, 23%, or 0%) at the respective volume level of the content item on the electronic device (e.g., at 20%, 50%, or 70% of the maximum allowable volume level on the electronic device (or of the other audio output device in communication with the electronic device)), such as described with reference to step(s) 902), the electronic device receives a second input corresponding to a request to cease display of the text representations of verbal content (e.g., lyrics) of the content item, such as shown in FIG. 8H with contact 830*e* directed to the selectable lyrics mode option 814*a*. The second input optionally includes one or more characteristics of the input described with reference to step(s) 902, but corresponding to the request to cease display of the text representations of verbal content of the content item. In some embodiments, the second input does not involve selecting the vocal attenuation control element. In some embodiments, the second input corresponds to a request to display a user interface of a content application that includes the content item other than a time-synchronized lyrics user interface while continuing to play the content item. For example, the user interface of the content application that includes the content item other than the time-synchronized lyrics user interface is a playback queue user interface, a content item browsing user interface, or a content library user interface. In some embodiments, the second user input corresponds to a request to display a user interface of a second application other than the application that is playing the content item. In some embodiments, the second user input corresponds to a request to display a system user interface, such as a home screen, a notifications user interface, or a settings user interface. In some embodiments, the second user input corresponds to a request to cause the display generation component to enter a sleep mode in which the display generation component does not display a user interface.

In some embodiments, in response to receiving the second input corresponding to a request to cease display of the text representations of verbal content of the content item the electronic device ceases display of the text representations of the verbal content of the content item, such as shown in FIG. 8I with the ceasing display of lyrics lines 822*a* through 822*c*. In some embodiments, ceasing display of the text representations of the verbal content of the content item includes initiating display of one of the user interfaces described above. In some embodiments, as described above, ceasing display of the text representations of the verbal content of the content item includes ceasing to display a user interface with the display generation component.

In some embodiments, the electronic device changes the playback volume level of the vocal portion to an unattenuated volume level relative to a playback volume level of the content item (e.g., relative to a total playback volume level of the content item and/or relative to a non-vocal portion of the content item, such as described above), such as shown in FIG. 8I with the vocal volume level glyph 815 indicating an unattenuated vocal volume level. As such, in response to receiving a request to exit a lyrics playback mode, the operations optionally include ceasing display of lyrics and exiting a vocal attenuation mode or resetting a level of vocal attenuation level to be an unattenuated volume level. In some embodiments, additionally or alternatively, the electronic device ceases display of the vocal attenuation control element. In some embodiments, the unattenuated volume level of the vocal portion is independent of the vocal volume level of the vocal attenuation control element (e.g., it is no longer based on the vocal attenuation control element, and instead based on the total playback volume level of the content item discussed above with reference to step(s) 902). In some embodiments, the method 900 additionally or alternatively includes, in response to receiving the second input corresponding to a request to cease display of the text representations of verbal content of the content item, maintaining the playback volume level of the vocal portion at the volume level of the vocal portion when the second input was received. As such, in some embodiments, the operations include, in response to receiving the second input corresponding to a request to cease display of the text representations of verbal content of the content item, ceasing display of the lyrics of the content item and forgoing changing the playback volume level of the vocal portion to the unattenuated volume level. Removing vocal attenuation in response to receiving a request to exit a lyrics playback mode reduces inputs involved with removing vocal attenuation because vocal attenuation is removed without further input.

In some embodiments, in response to receiving the input directed to the vocal attenuation control element in accordance with a determination that input corresponds to a request to transition between playing the vocal portion of the content item at an attenuated volume level and an unattenuated volume level (e.g., transitioning from the attenuated volume level to the unattenuated volume level or transitioning from the unattenuated volume level to the attenuated volume level), such as shown in FIG. 8F with contact 830*d* directed to selectable vocal volume attenuation mode option 814*d*, the electronic device generates an (e.g., audio, visual, and/or tactile (e.g., vibration or haptic)) indication, different from audio corresponding to the content item, signifying activation or deactivation of the vocal attenuation mode, such as shown in FIG. 8G with the audio notification 819. In some embodiments, the method 900 includes reducing a total playback volume of the content item while transitioning to or from a vocal attenuation mode and/or during playback of the content item. For example, the playback volume level optionally fades out, pauses, and/or fades in (optionally with an indication, such as the indications discussed above) while transitioning to or from a vocal attenuation mode and/during playback of the content item, and optionally concurrent with animation of the time-synced lyrics, such as illustrated in FIGS. 6A-6K and discussed with reference to the method 700. Accordingly, the operations optionally include generating the indication when the electronic device detects a request to transition between playing the vocal portion at the attenuated volume level and the unattenuated volume level. Generating an indication signifying activation or deactivation of the vocal attenuation mode clearly indicates to a user the state of the vocal attenuation mode and reduces errors in interaction with the electronic device.

In some embodiments, in accordance with a determination that one or more second criteria are satisfied, optionally including a criterion such as the first criterion discussed above, the electronic device concurrently displays the content playback user interface including the vocal attenuation control element, such as discussed above, and text representations of verbal content of the content item (e.g., time-synced lyrics such as discussed above), such as shown in FIG. 8A with the playback user interface 802*a* including lyrics lines 822*a* through 822*c*. The one or more second criteria optionally are satisfied when the electronic device is operating in a lyrics playback mode, such as generally illustrated in FIGS. 6A-6K and described with reference to the method 700. For example, operating in the lyrics playback mode includes displaying time-synchronized lyrics while playing the content item.

In some embodiments, in accordance with a determination that the one or more second criteria are not satisfied the electronic device displays the content playback user interface including the vocal attenuation control element without displaying the text representations of verbal content of the content item (e.g., time-synced lyrics such as discussed above), such as shown in FIG. 8I with the playback user interface 802*i* excluding the lyrics lines 822*a* through 822*c*. The one or more second criteria optionally are not satisfied when the electronic device is not operating in the lyrics playback mode and/or when the electronic device is operating in a mode other than the lyrics playback mode. As such, in some embodiments, the vocal attenuation control element is displayed and selectable regardless of the playback mode. In some embodiments, the vocal attenuation control element is included in one or more user interfaces of a content application playing the content item other than a time-synchronized lyrics user interface that includes the time-synchronized lyrics, such as the playback queue user interface or a now playing user interface. In some embodiments, the electronic device forgoes displaying the vocal attenuation control element while not displaying a user interface of the content application that is playing the content item, such as forgoing displaying the vocal attenuation control element while the electronic device displays a content item browsing user interface or a content library user interface. Displaying the selectable vocal attenuation control element regardless of the playback mode increases availability of vocal attenuation control of the vocal portion of a content item in different modes and reduces errors in interaction with the electronic device.

In some embodiments, while displaying the content playback user interface including the vocal attenuation control element and before receiving the input directed to the vocal attenuation control element, the electronic device generates, via the electronic device or an audio output device, such as described above with reference to step(s) 902, audio corresponding to the content item based on first data (e.g., a first audio source/stream) of the content item. For example, in FIG. 8A, the electronic device optionally generates audio of the content item associated with the title and artist indication in indication 818 and album artwork 816 based on first data. The electronic device optionally does not use the second data discussed below to generate the audio corresponding to the content item based on the first data.

In some embodiments, in response to receiving the input directed to the vocal attenuation control element, such as the contact 830*a* of FIG. 8A, in accordance with a determination that input corresponds to a request to transition from playing the vocal portion of the content item at an unattenuated volume level to playing the vocal portion of the content item at an attenuated volume level, the electronic device initiates a process to generate audio corresponding to the content item based on second data (e.g., a second audio source/stream) of the content item, different from the first data. For example, in response to detecting the contact 830*a* of FIG.

8A, the electronic device optionally initiates a process to generates audio of the content item associated with the title and artist indication in indication 818 and album artwork 816 based on second data. The electronic device optionally does not use the first data to generate the audio corresponding to the content item based on the second data. In some embodiments, the operations include changing an audio source/stream from a first audio source/stream (e.g., that is based on first data) to a second audio source/stream (e.g., that is based on second data) in response to receiving the input directed to the vocal attenuation control element. In some embodiments, one or more of the first audio source/stream and the second audio source/stream are streamed from outside of the electronic device, such as from an external server. In some embodiments, one or more of the first audio source/stream and the second audio source/stream are sourced from within storage or memory stored on the electronic device. In some embodiments, the first data is not configurable for vocal attenuation. In some embodiments, the second data is configurable for vocal attenuation. In some embodiments, the operations include, in response to receiving the input directed to the vocal attenuation control element and in accordance with a determination that the first data is not configurable for vocal attenuation, initiating the above process. In some embodiments, the first data is configurable for vocal attenuation. In some embodiments, the operations include, in response to receiving the input directed to the vocal attenuation control element and in accordance with a determination that the first data is configurable for vocal attenuation, forgoing initiating the above process. In some embodiments, the first data corresponds to a first type of encoding of audio data and the second data corresponds to a second type of encoding of audio data, different from the first type. In some embodiments, the process is initiated while audio corresponding to the content item based on the first data is being generated. Changing the audio source/stream to an audio source/steam that permits vocal attenuation in response to receiving the input directed to the vocal attenuation control element permits vocal attenuation, especially when vocal attenuation is unavailable during playback of a content item based on an audio source/stream in which vocal attenuation may be not permitted or may involve substantial increase of processing power.

In some embodiments, in response to receiving the input directed to the vocal attenuation control element in accordance with a determination that the input corresponds to the request to transition from playing the vocal portion of the content item at the unattenuated volume level to playing the vocal portion of the content item at the attenuated volume level the electronic device concurrently generates an (e.g., audio, visual, and/or tactile (e.g., vibration or haptic)) indication signifying activation of the vocal attenuation mode, such as discussed above, and fetches (e.g., retrieving from memory or storage, or a server, or downloading from a remote device or remote server) at least a portion of the second data of the content item. For example, in response to detecting the contact 830a of FIG. 8A, the electronic device optionally concurrently generates the audio notification 819 and fetches a portion of the second data of the content item associated with the title and artist indication in indication 818 and album artwork 816. In some embodiments, the operations additionally or alternatively include fetching the second data discussed above and generating the indication at different start times, such as a start time of the fetching operation occurring after a start time of generating the indication or the start time of generating the indication occurring after the start time of the fetching operation. In some embodiments, the operations include fetching a first amount of second data corresponding to 0.1 s, 1 s, 2 s, 10 s, 11 s, or another amount of time of playback of the content item (e.g., a first portion of (fetched) audio data) in a first fetching operation and/or at a first speed of download, and fetching the remaining amount of second data (e.g., a second portion of (fetched) audio data) in a second fetching operation after the first fetching operation and/or at a second speed of download, similar or different from the first speed of download. As such, the operations optionally include generating the indication (in the above-recited conditions). Further, in some embodiments, the first amount of second data discussed above corresponds to audio data for continuing playback of the content item (e.g., without interruption in audio generation), such as the first amount of second data corresponding to audio data that starts at a playback position of the content item following a playback position of the content item at the time the input was received). Also, in some embodiments, the operations include downloading or fetching the remaining amount of second data, such as discussed above, while playback the first amount of second data. Generating the indication signifying activation of the vocal attenuation mode clearly indicates to a user that the electronic device has entered the vocal attenuation mode and reduces errors in interaction with the electronic device.

In some embodiments, in response to receiving the input directed to the vocal attenuation control element the electronic device displays a slider user interface element that includes a visual indication of the playback volume level of the vocal portion, such as discussed above, such as shown in FIGS. 8A and 8C with the electronic device displaying the selectable vocal volume level slider element 828 in FIG. 8C in response to the input in FIG. 8A. In some embodiments, the visual indication is displayed at a position corresponding to a current vocal attenuation level of the vocal portion of the content item, such as described above. In some embodiments, the slider user interface element is displayed in accordance with a determination that one or more criteria involving the input is satisfied, such as a criterion that is satisfied when the input includes a touch and hold for a predetermined amount of time on the vocal attenuation control element (e.g. the slider criteria discussed above), such as discussed in this present disclosure and/or when the input corresponds to a request to increase or decrease an amount of vocal volume attenuation. In some embodiments, the operations include, in accordance with a determination that one or more criteria involving the input is not satisfied, forgoing displaying the slider user interface element. In some embodiments, the operations include, displaying the slider user interface element without regard or independent of the determination that one or more criteria involving the input is satisfied. In some embodiments, an input is directed to the slider user interface element, such as to the visual indication of the slider user interface element, and such embodiments are discussed in detail above. In some embodiments, the electronic device does not display the slider user interface element before receiving the input directed to the vocal attenuation control element. Displaying a slider including a visual indication of the playback volume level of the vocal portion in response to receiving the input directed to the vocal attenuation control element permits finer changes in vocal attenuation level and reduces errors with interaction with the electronic device.

In some embodiments, the content item includes the vocal portion (e.g., data corresponding to vocal audio) and a portion other than the vocal portion, (such as data corresponding to instrumental and/or a non-vocal audio), such as the content item associated with the title and artist indication in indication 818 and album artwork 816 in FIG. 8A including a vocal part and a non-vocal part. In some embodiments, modifying the playback volume level of the vocal portion by the first amount is performed without changing (e.g., while maintaining) the playback volume of the portion other than the vocal portion and wherein modifying the playback volume level of the vocal portion by the second amount is performed without changing the playback volume of the portion other than the vocal portion, such as described in detail above with reference to step(s) 902, such as shown in FIG. 8B with the slider 817 maintaining its level in response to the change in the vocal volume level via selection of the vocal attenuation mode option 814*d* of FIG. 8A. Also, in some embodiments, the electronic device displays an overall volume control element for controlling an overall playback volume level of the content item (e.g., of both the vocal and non-vocal portions of the content item), different from the vocal attenuation control element. The overall volume control element is optionally displayed with characteristics similar or different as the vocal attenuation control element for controlling the playback volume level of the vocal portion of the content item discussed in this present disclosure. For example, the overall volume control element is optionally a slider, a dial, a toggle, a segmented control, or another type of control element. In some embodiments, changing the overall playback volume level via the overall volume control element does not include changing a proportion of the playback volume level of the vocal portion to the overall playback volume level of the content item. In some embodiments, changing the vocal volume level via the vocal volume control element does not include changing the overall playback volume level of the content item. In some embodiments, changing the vocal volume via the vocal volume control element includes changing the overall playback volume level of the content item. Modifying the playback volume of vocals without modifying the playback volume of non-vocals of the content item maintains playback volumes of portions of the content item while modifying others, enhances karaoke performances, and allows for an appropriate amount of vocal guidance during such performances.

In some embodiments, while playing a second content item different from the content item, the electronic device displays, via the display generation component, the content playback user interface that includes the vocal attenuation control element (e.g., vocal attenuation option 852*a*), information about the second content item (e.g., 850*b* and 850*c*), and the playback control element (e.g., 854), such as in FIG. 8M. In some embodiments, the electronic device uses the same content application to play the second content item as the content application the electronic device uses to play the content item.

In some embodiments, in accordance with a determination that vocal attenuation is available for the second content item, the vocal attenuation control element is interactive to control the playback volume level of a second vocal portion of the second content item, such as vocal attenuation element 852*a* in FIG. 8M. In some embodiments, vocal attenuation is available for content items, such as the content item described above, when the electronic device has access to the vocal content of the content item separate from the instrumental content of the content item and is therefore able to control the playback volume of the vocal content independently from the playback volume of the instrumental content of the content item. In some embodiments, while the vocal attenuation control element is interactive, in response to receiving an input selecting the vocal attenuation control element, the electronic device adjusts the playback volume of the vocal content of the second content item independently from the playback volume of the instrumental content of the second content item as described above.

In some embodiments, in accordance with a determination that vocal attenuation is not available for the second content item, the vocal attenuation control element is not interactive, such as vocal attenuation element 852*a* in FIG. 8T. In some embodiments, vocal attenuation is not available for content items that do not include vocal content (e.g., instrumental content items or soundscapes). In some embodiments, vocal attenuation is not available for content items for which the electronic device does not have access to the vocal content separately from the instrumental content, and is therefore not able to control the playback volume of the vocal content independently from the playback volume of the instrumental content. In some embodiments, while the vocal attenuation control element is not interactive, the electronic device does not perform an action in response to receiving an input directed to the vocal attenuation control element. In some embodiments, while the vocal attenuation control element is not interactive, the electronic device is not able to direct the input focus to the vocal attenuation control element. In some embodiments, while the vocal attenuation control element is not interactive, the electronic device displays the vocal attenuation control element with a different appearance from the appearance of the vocal attenuation control element while the vocal attenuation control element is interactive. For example, the electronic device displays the vocal attenuation control element with different color(s), size(s), and/or translucencies (more generally, with different visual appearances) depending on whether or not the vocal attenuation control element is interactive. In some embodiments, the electronic device displays the vocal attenuation control element while playing a content item, with the vocal attenuation control element being interactive if the content item has vocal attenuation available and the vocal attenuation control element not being interactive if the content item does not have vocal attenuation available. Deactivating the vocal attenuation control element while playing a content item for which vocal attenuation is not available enhances user interactions with the electronic device by reducing user errors.

In some embodiments, an electronic device plays a first content item, followed by a second content item, followed by a third content item. In some embodiments, vocal attenuation is available for the first content item and the third content item, but not for the second content item. In some embodiments, the electronic device plays the first content item with vocal attenuation while displaying the footage. In some embodiments, when the electronic device plays the second content item, the electronic device ceases displaying the footage while playing the second content item. In some embodiments, while playing the second content item, the electronic device continues to display the footage. In some embodiments, the electronic device automatically plays the third content item with vocal attenuation and while displaying the footage because the electronic device played the first content item with vocal attenuation while displaying the footage. In some embodiments, if the electronic device ceases displaying the footage while playing the second content item, the electronic device does not display the footage while playing the third content item unless and until the electronic device receives an input requesting display of the footage. In some embodiments, if the electronic device ceases displaying the footage while playing the second content item, the electronic device displays of the footage while playing the third content item without receiving an input requesting display of the footage because the electronic device displayed the footage while playing the first content item.

In some embodiments, while playing a second content item different from the content item, displaying, via the display generation component, the content playback user interface that includes the vocal attenuation control element, information about the second content item, the playback control element, and time-synchronized lyrics for the second content item, in accordance with a determination that vocal attenuation is available for the second content item, the electronic device displays, via the display generation component, a user interface element that, when selected, causes the electronic device to display a menu including a respective option that, when selected causes the electronic device to display, via the display generation component, footage captured by a camera of a second electronic device in communication with the electronic device, such as camera option 852*b* in FIG. 8M. In some embodiments, the electronic device presents the time-synchronized lyrics in accordance with method 700. In some embodiments, the electronic device forgoes displaying the user interface element while time-synchronized lyrics are not displayed. In some embodiments, the electronic device displays the user interface element without displaying time-synchronized lyrics. In some embodiments, the electronic device displays options that, when selected, cause the electronic device to connect to one of a plurality of other electronic devices and to display footage captured by the selected electronic device and one or more options for applying visual effects to the captured footage, as described below. In some embodiments, while displaying the footage, the electronic device maintains display of the time-synchronized lyrics (e.g., overlaid on the footage). In some embodiments, while not displaying the footage, the electronic device displays the time-synchronized lyrics at a first location in the user interface and/or with a first text alignment. In some embodiments, while displaying the footage, the electronic device displays the time-synchronized lyrics at a second location different from the first location in the user interface and/or with a second text alignment different from the first text alignment. In some embodiments, while displaying the footage, the electronic device applies a color and/or translucency gradient at a portion of the user interface at which the electronic device displays the lyrics (e.g., behind or under the lyrics) to improve legibility of the lyrics overlaid on the footage. In some embodiments, the footage includes video footage. In some embodiments, the footage includes one or more still images.

In some embodiments, while playing a second content item different from the content item, displaying, via the display generation component, the content playback user interface that includes the vocal attenuation control element, information about the second content item, the playback control element, and time-synchronized lyrics for the second content item, in accordance with a determination that vocal attenuation is not available for the second content item, the electronic device forgoes displaying the user interface element, such as in FIG. 8T in which camera option 852*b* from FIG. 8M is not displayed. In some embodiments, if the electronic device was displaying footage from the camera in communication with the second electronic device while playing a content item for which vocal attenuation is available when the electronic device transitions to playing the content item for which vocal attenuation is not available, the electronic device continues to display the footage and displays an option to cease displaying the footage. In some embodiments, if the electronic device was displaying footage from the camera in communication with the second electronic device while playing a content item for which vocal attenuation is available when the electronic device transitions to playing the content item for which vocal attenuation is not available, ceases displaying the footage. In some embodiments, the electronic device displays the user interface element while playing content items for which vocal attenuation is available and forgoes displaying the user interface element while playing content items for which vocal attenuation is not available. Selectively displaying the user interface element based on whether or not vocal attenuation is available for the content item enhances user interactions with the electronic device by reducing erroneous inputs and user errors.

In some embodiments, while playing the content item, and while displaying, via the display generation component, the content playback user interface that includes the vocal attenuation control element, the information about the content item, the playback control element, a user interface element, and time-synchronized lyrics for the content item, the electronic device receives, via the one or more input devices, a second input selecting the user interface element, such as the input directed to camera option 852*b* in FIG. 8N. In some embodiments, the electronic device displays the time-synchronized lyrics according to method 700. In some embodiments, the electronic device forgoes displaying the user interface element while time-synchronized lyrics are not displayed. In some embodiments, the electronic device displays the user interface element without displaying time-synchronized lyrics.

In some embodiments, while playing the content item, and while displaying, via the display generation component, the content playback user interface that includes the vocal attenuation control element, the information about the content item, the playback control element, a user interface element, and time-synchronized lyrics for the content item, in response to receiving the second input, the electronic device displays a menu including a plurality of selectable options that, when selected, apply a respective visual effect to footage from a camera of a second electronic device in communication with the electronic device that is displayed via the display generation component, wherein the respective visual effect includes a characteristic that changes over time in accordance with a characteristic of audio of the content item that changes over time, such as menu 858 including options 860*c* through 860*e* in FIG. 8O. In some embodiments, the electronic device selectively displays the user interface element depending on whether or not the electronic device is playing content for which vocal attenuation is available, as described above. In some embodiments, the visual effect is a filter applied to the footage captured by the camera. In some embodiments, multiple different filters are available, and the electronic device displays a plurality of options corresponding to the plurality of available filters. Examples of available filters are described in more detail below. In some embodiments, the characteristic of the visual effect changes over time in accordance with a characteristic of audio of the content item that is playing, so the visual effect will appear differently depending on which content item is playing and/or which portion of a respective content item is playing. For example, while playing a first content item, a respective visual effect has a first characteristic and while paying a second content item different from the first content item, the respective visual effect has a second characteristic different from the first characteristic. Example characteristics of the visual effect, described in more detail below, include color(s), shape(s), movement and/or animation of the visual effect. Example characteristics of the audio of the content item include volume, timbre, and/or pitch, and in response to detecting change(s) to these characteristic(s) of the audio, the electronic device changes the characteristic of the visual effect, so the visual effect appears to change in time to the audio of the content item. Displaying options for applying visual effects to the footage based on audio characteristics of the content item that is playing enhances user interactions with the electronic device by efficiently providing a customized user experience.

In some embodiments, while playing the content item, and while displaying, via the display generation component, the content playback user interface that includes the vocal attenuation control element, the information about the content item, the playback control element, the user interface element, time-synchronized lyrics for the content item, and the menu including the plurality of selectable options, the electronic device receives, via the one or more input devices, a third input selecting a first option of the plurality of selectable options, such as the input directed to option 860c in FIG. 8P. In some embodiments, the electronic device displays the time-synchronized lyrics according to method 700. In some embodiments, the electronic device forgoes displaying the user interface element while time-synchronized lyrics are not displayed. In some embodiments, the electronic device displays the user interface element without displaying time-synchronized lyrics.

In some embodiments, while playing the content item, and while displaying, via the display generation component, the content playback user interface that includes the vocal attenuation control element, the information about the content item, the playback control element, the user interface element, time-synchronized lyrics for the content item, and the menu including the plurality of selectable options, in response to receiving the third input, the electronic device displays, via the display generation component, video footage from the camera of the second electronic device with a visual effect that includes animation based on changing the characteristic of the audio of the content item over time, such as displaying footage 862 with visual effect 864 in FIG. 8Q. In some embodiments, the animation includes changing colors, changing boundaries between colors, and/or changing the position, size, and/or contours of shapes and/or lines over time. In some embodiments, the amount (e.g., speed, duration, and/or distance) of the rate of these changes dynamically changes over time in accordance with changes to a characteristic of the audio content, as described above. Displaying a visual effect including animation based on audio characteristics of the content item that is playing enhances user interactions with the electronic device by efficiently providing a customized user experience.

In some embodiments, while playing the content item, and while displaying, via the display generation component, the content playback user interface that includes the vocal attenuation control element, the information about the content item, the playback control element, the user interface element, time-synchronized lyrics for the content item, and the menu including the plurality of selectable options, the electronic device displays, via the one or more input devices, a third input selecting a first option of the plurality of selectable options, such as the input directed to option 860c in FIG. 8P. In some embodiments, the electronic device displays the time-synchronized lyrics according to method 700. In some embodiments, the electronic device forgoes displaying the user interface element while time-synchronized lyrics are not displayed. In some embodiments, the electronic device displays the user interface element without displaying time-synchronized lyrics.

In some embodiments, while playing the content item, and while displaying, via the display generation component, the content playback user interface that includes the vocal attenuation control element, the information about the content item, the playback control element, the user interface element, time-synchronized lyrics for the content item, and the menu including the plurality of selectable options, in response to receiving the third input, the electronic device displays, via the display generation component, video footage from the camera of the second electronic device with a visual effect that changes color over time based on changing the characteristic of the audio of the content item over time, such as displaying footage 862 with visual effect 864 in FIG. 8Q. In some embodiments, the visual effect includes applying colorization to the video footage that changes over time. In some embodiments, the visual effect includes displaying shapes and/or lines that have colors that change over time. In some embodiments, changes of the colors include changes in the hue, saturation, and/or translucency of the colors. In some embodiments, the amount (e.g., speed, duration, and/or color difference) of changes of the colors changes over time in accordance with changes to a characteristic of the audio content, as described above. Displaying a visual effect including color changing based on audio characteristics of the content item that is playing enhances user interactions with the electronic device by efficiently providing a customized user experience.

In some embodiments, while playing the content item, and while displaying, via the display generation component, the content playback user interface that includes the vocal attenuation control element, the information about the content item, the playback control element, the user interface element, time-synchronized lyrics for the content item, and the menu including the plurality of selectable options, the electronic device receives, via the one or more input devices, a third input selecting a first option of the plurality of selectable options, such as the input directed to option 860c in FIG. 8P. In some embodiments, the electronic device displays the time-synchronized lyrics according to method 700. In some embodiments, the electronic device forgoes displaying the user interface element while time-synchronized lyrics are not displayed. In some embodiments, the electronic device displays the user interface element without displaying time-synchronized lyrics.

In some embodiments, while playing the content item, and while displaying, via the display generation component, the content playback user interface that includes the vocal attenuation control element, the information about the content item, the playback control element, the user interface element, time-synchronized lyrics for the content item, and the menu including the plurality of selectable options, in response to receiving the third input, the electronic device displays, via the display generation component, video footage from the camera of the second electronic device with a visual effect that includes animated movement of images based on changing the characteristic of the audio of the content item, such as displaying footage 862 in FIG. 8Q with visual effect 864. In some embodiments, the images include images added by the visual effect and not captured by the camera, such as shapes and/or lines. In some embodiments, movement of the images includes changing the boundaries and/or size and/or shape and/or position of the images. In some embodiments, the speed, distance, and/or duration of the movement changes in accordance with changes in the characteristics of the audio of the content item. Displaying a visual effect including movement based on audio characteristics of the content item that is playing enhances user interactions with the electronic device by efficiently providing a customized user experience.

In some embodiments, while playing the content item, displaying, via the display generation component, the content playback user interface that includes the vocal attenuation control element, the information about the content item, the playback control element, the user interface element, time-synchronized lyrics for the content item, and the menu including the plurality of selectable options, the electronic device receives, via the one or more input devices, a third input selecting a first option of the plurality of selectable options, such as the input directed to option 860c in FIG. 8P. In some embodiments, the electronic device displays the time-synchronized lyrics according to method 700. In some embodiments, the electronic device forgoes displaying the user interface element while time-synchronized lyrics are not displayed. In some embodiments, the electronic device displays the user interface element without displaying time-synchronized lyrics.

In some embodiments, while playing the content item, displaying, via the display generation component, the content playback user interface that includes the vocal attenuation control element, the information about the content item, the playback control element, the user interface element, time-synchronized lyrics for the content item, and the menu including the plurality of selectable options, in response to receiving the third input, the electronic device displays, via the display generation component, video footage from the camera of the second electronic device with a visual effect that includes, in accordance with a determination that an image associated with the content item includes a first plurality of colors, a second plurality of colors based on the first plurality of colors, such as the presentation of visual effect 864 in FIG. 8R. In some embodiments, the image associated with the content item is album artwork, series artwork, and/or an audiobook cover. In some embodiments, the second plurality of colors is the same as the first plurality of colors. In some embodiments, the second plurality of colors is different from the first plurality of colors, but based on the first plurality of colors. For example, the electronic device selects the second plurality of colors using a random number generator seeded with the first plurality of colors. In some embodiments, if a first content item and second content item are associated with the same image, then the colors used for the visual effect while playing the first content item or the second content item are the same. In some embodiments, the second plurality of colors are colors used for a color filter applied to the footage captured by the camera and/or colors used to display shapes and/or lines and/or images included in the visual effect as described above.

In some embodiments, while playing the content item, displaying, via the display generation component, the content playback user interface that includes the vocal attenuation control element, the information about the content item, the playback control element, the user interface element, time-synchronized lyrics for the content item, and the menu including the plurality of selectable options, in response to receiving the third input, the electronic device displays, via the display generation component, video footage from the camera of the second electronic device with a visual effect that includes, in accordance with a determination that the image associated with the content item includes a third plurality of colors different from the first plurality of colors, a fourth plurality of colors different from the second plurality of colors and based on the second plurality of colors, such as the presentation of visual effect 864 in FIG. 8S. In some embodiments, the fourth plurality of colors is the same as the third plurality of colors. In some embodiments, the fourth plurality of colors is different from the third plurality of colors, but based on the third plurality of colors. For example, the electronic device selects the fourth plurality of colors using a random number generator seeded with the third plurality of colors. In some embodiments, the fourth plurality of colors are colors used for a color filter applied to the footage captured by the camera and/or colors used to display shapes and/or lines and/or images included in the visual effect as described above. Displaying a visual effect including color based on colors included in an image associated with the content item that is playing enhances user interactions with the electronic device by efficiently providing a customized user experience.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the vocal/verbal content volume attenuation techniques described above with reference to method 900 optionally has one or more of the characteristics of the techniques for displaying time-synced lyrics described herein with reference to other methods described herein (e.g., methods 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 9 are, optionally, implemented by components depicted in FIGS. 1A-1B. For example, receiving operation 904 and initiating operation 906 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes presenting content items. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity can be used to suggest content to a user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking. In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content playback can proceed in accordance with the embodiments of the disclosure without tracking the content consumption activity of the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device in communication with a display generation component:

while playing a first portion of a content item:

in accordance with a determination that the first portion of the content item is associated with first verbal content associated with a first performer:

displaying, via the display generation component, one or more first lines of text representations of verbal content associated with the first portion of the content item with one or more first colors and a first visual characteristic having a first value, wherein the first visual characteristic is different from the one or more first colors;

while playing a second portion of the content item, different from the first portion of the content item, wherein the second portion of the content item is associated with second verbal content:

in accordance with a determination that the second verbal content is associated with the first performer:

displaying, via the display generation component, one or more second lines of text representations of the second verbal content with the one or more first colors and the first visual characteristic having the first value; and in accordance with a determination that the second verbal content is associated with a second performer, different from the first performer:

displaying, via the display generation component, the one or more second lines of text representations of the second verbal content with one or more second colors and the first visual characteristic having a second value that is different from the first value; and during playback of the first portion of content item, wherein the first portion of the content item is associated with a first word of the one or more first lines of text representations of verbal content, in response to playback of the first portion of the content item associated with the first word:

in accordance with a determination that the playback of the first portion of the content item associated with the first word is above a threshold time duration, displaying the first word with a second visual characteristic, different from the first visual characteristic, having a first value; and in accordance with a determination that the playback of the first portion of the content item associated with the first word is below the threshold time duration, displaying the first word with the second visual characteristic having a second value different from the first value.

2. The method of claim 1, comprising:

while playing a third portion of the content item associated with third verbal content, wherein the third portion is different from the first portion and the second portion:

in accordance with a determination that the third verbal content is associated with a third performer, different from the first performer and the second performer:

displaying, via the display generation component, one or more third lines of text representations of the third verbal content with one or more third colors and the first visual characteristic having a third value, different from the first value and the second value.

3. The method of claim 1, comprising:

while playing a third portion of the content item associated with third verbal content, wherein the third portion is different from the first portion and the second portion:

in accordance with a determination that the third verbal content is associated with a third performer, different from the first performer and the second performer and the third portion of the content item is after the second portion of the content item:

displaying, via the display generation component, one or more third lines of text representations of the third verbal content with one or more third colors and the first visual characteristic having the first value.

4. The method of claim 3, comprising:

while playing a fourth portion of the content item associated with fourth verbal content, wherein the fourth portion is different from the first portion, second portion, and the third portion:

in accordance with a determination that the fourth verbal content is associated with the first performer and the fourth portion of the content item is after the third portion of the content item:

displaying, via the display generation component, one or more fourth lines of text representations of the fourth verbal content with one or more third colors and the first visual characteristic having the second value.

5. The method of claim 1, wherein:

the first visual characteristic having the first value includes a first alignment of one or more lines of text representations of corresponding verbal content; and the first visual characteristic having the second value includes a second alignment of one or more lines of text representations of corresponding verbal content, different from the first alignment.

6. The method of claim 1, comprising:

while playing a third portion of the content item associated with third verbal content, wherein the third portion is different from the first portion and the second portion:

in accordance with a determination that the third verbal content is associated with at least two performers:

displaying, via the display generation component, one or more third lines of text representations of the third verbal content with one or more third colors and the first visual characteristic having the first value or the second value.

7. The method of claim 6, wherein a value of the first visual characteristic with which the one or more third lines of text representations of the third verbal content are displayed is based on a value of the first visual characteristic with which a respective line of text representations of verbal content associated with a respective portion of the content item prior to the third portion of the content item is displayed.

8. The method of claim 6, wherein the one or more third lines of text representations of the third verbal content are displayed with the first visual characteristic having a respective value that is independent of a value of the first visual characteristic with which a respective line of text representations of verbal content associated with a respective portion of the content item prior to the third portion of the content item is displayed.

9. The method of claim 1, comprising:

while playing a third portion of the content item associated with third verbal content and fourth verbal content, wherein the third portion is different from the first portion and the second portion:

in accordance with a determination that the third verbal content is of a first type:

displaying, via the display generation component, one or more third lines of text representations of the third verbal content with one or more third colors and a second visual characteristic different from the first visual characteristic and different from the one or more third colors having a first value; and in accordance with a determination that the fourth verbal content is of a second type different from the first type:

displaying, via the display generation component, a fourth line of text representations of the fourth verbal content with one or more fourth colors and the second visual characteristic having a second value different from the first value.

10. The method of claim 9, wherein:

the third verbal content having the first type has higher priority than the fourth verbal content having the second type;

in accordance with a determination that the one or more third lines of text representations of the third verbal content are displayed with the first visual characteristic having the first value, the fourth line of text representations of fourth verbal content is displayed with the first visual characteristic having the first value; and in accordance with a determination that the one or more third lines of text representations of the third verbal content are displayed with the first visual characteristic having the second value, the fourth line of text representations of fourth verbal content is displayed with the first visual characteristic having the second value.

11. The method of claim 9, wherein the third lines of text representations of the third verbal content and the fourth line of text representations of fourth verbal content are displayed with the first visual characteristic having a respective value.

12. The method of claim 9, wherein in accordance with a determination that the third verbal content having the first type has higher priority than the fourth verbal content having the second type, the one or more third lines of text representations of the third verbal content are visually emphasized relative to the fourth line of text representations of the fourth verbal content.

13. The method of claim 9, comprising:
while playing the second portion of the content item associated with the second verbal content:
displaying the one or more second lines of text representations of the second verbal content; and
foregoing displaying the fourth line of text representations of the fourth verbal content; and
while playing the third portion of the content item associated with the third verbal content and the fourth verbal content:
displaying the one or more third lines of text representations of the third verbal content; and
displaying the fourth line of text representations of the fourth verbal content.

14. The method of claim 13, wherein displaying the fourth line of text representations of the fourth verbal content while playing the third portion of the content item associated with the third verbal content and the fourth verbal content includes:
displaying an animation of the fourth line of text representations of the fourth verbal content emerge from a region of display of the one or more third lines of text representations of the third verbal content.

15. The method of claim 9, comprising:
while playing the third portion of the content item associated with the third verbal content and the fourth verbal content and while displaying the one or more third lines of text representations of the third verbal content and the fourth line of text representations of the fourth verbal content:
detecting, via one or more input devices in communication with the electronic device, an input for scrolling through the text representations of verbal content associated with portions of the content item; and
in response to detecting the input for scrolling through the text representations of verbal content of associated with portions of the content item:
ceasing display of the fourth line of text representations of the fourth verbal content;
maintaining display of the one or more third lines of text representations of the third verbal content; and
scrolling through the text representations of verbal content associated with the portions of the content item in accordance with the input for scrolling through the text representations of verbal content of associated with portions of the content item.

16. The method of claim 1, comprising:
while playing the first portion of the content item:
in accordance with a determination that the first portion of the content item is associated with a first part of the content item, displaying an indication of the first part of the content item concurrently with display of the one or more first lines of text representations of verbal content; and
in accordance with a determination that the first portion of the content item is associated with a second part of the content item, displaying an indication of the second part of the content item concurrently with display of the one or more first lines of text representations of verbal content.

17. The method of claim 1, comprising:
while playing a respective portion of the content item and while displaying one or more respective lines of text representations of respective verbal content associated with the respective portion of the content item:
displaying a color gradient at a first location between a first portion of a respective word and a second portion of the respective word in a respective line of the one or more respective lines of text representations of respective verbal content; and
visually moving the color gradient from the first location between the first portion and the second portion of the respective word to a second location between a third portion of the respective word and a fourth portion of the respective word, wherein the second location is different from the first location.

18. The method of claim 17, wherein:
visually moving the color gradient from the first location between the first portion of the respective word and the second portion of the respective word to the second location between the third portion of the respective word and the fourth portion of the respective word is performed in accordance with a time duration of playback of at least a part of the respective portion of the content item associated with a syllable of the respective word.

19. The method of claim 18, wherein:
while the time duration of the playback of the respective portion of the content item associated with the syllable of the respective word is a first time duration:
a rate of movement of the color gradient is a first rate; and
when the time duration of the playback of the respective portion of the content item associated with the syllable of the respective word is a second time duration, longer than the first time duration:
the rate of movement of the color gradient is a second rate, slower than the first rate.

20. The method of claim 18, comprising:
in accordance with a determination that the playback of the respective portion of the content item is associated with at least two syllables of the respective word, wherein playback of a portion of the content item associated with a first syllable of the respective word has a first time duration and playback of the portion of the content item associated with a second syllable of the respective word has a second respective time duration, different from the first respective time duration:
during playback of the portion of the content item associated with the first syllable of the respective word:

visually moving the color gradient from the first location between the first portion of the respective word and the second portion of the respective word to the second location between the third portion of the respective word and the fourth portion of the respective word at a first rate that is in accordance with the first time duration; and during playback of the portion of the content item associated with the second syllable of the respective word:

visually moving the color gradient from the second location between the third portion of the respective word and the fourth portion of the respective word to a third location between a fifth portion of the respective word and a sixth portion of the respective word at a second respective rate that is in accordance with the second respective time duration.

21. The method of claim 17, comprising:

during playback of the respective portion of the content item associated with the respective word:

displaying a text representation of the respective word with a first position; and displaying a text representation of a second word in the respective line of text representations with a second position different from the first position.

22. An electronic device, comprising:

one or more processors;

memory; and one or more programs, wherein the one or more programs are stored in the memory and configured to be executed by the one or more processors, the one or more programs including instructions for:

while playing a first portion of a content item:

in accordance with a determination that the first portion of the content item is associated with first verbal content associated with a first performer:

displaying, via a display generation component, one or more first lines of text representations of verbal content associated with the first portion of the content item with one or more first colors and a first visual characteristic having a first value, wherein the first visual characteristic is different from the one or more first colors;

while playing a second portion of the content item, different from the first portion of the content item, wherein the second portion of the content item is associated with second verbal content:

in accordance with a determination that the second verbal content is associated with the first performer:

displaying, via the display generation component, one or more second lines of text representations of the second verbal content with the one or more first colors and the first visual characteristic having the first value; and in accordance with a determination that the second verbal content is associated with a second performer, different from the first performer:

displaying, via the display generation component, the one or more second lines of text representations of the second verbal content with one or more second colors and the first visual characteristic having a second value that is different from the first value; and during playback of the first portion of content item, wherein the first portion of the content item is associated with a first word of the one or more first lines of text representations of verbal content, in response to playback of the first portion of the content item associated with the first word:

in accordance with a determination that the playback of the first portion of the content item associated with the first word is above a threshold time duration, displaying the first word with a second visual characteristic, different from the first visual characteristic, having a first value; and in accordance with a determination that the playback of the first portion of the content item associated with the first word is below the threshold time duration, displaying the first word with the second visual characteristic having a second value different from the first value.

23. The electronic device of claim 22, the one or more programs including instructions for:

while playing a third portion of the content item associated with third verbal content, wherein the third portion is different from the first portion and the second portion:

in accordance with a determination that the third verbal content is associated with a third performer, different from the first performer and the second performer:

displaying, via the display generation component, one or more third lines of text representations of the third verbal content with one or more third colors and the first visual characteristic having a third value, different from the first value and the second value.

24. The electronic device of claim 22, the one or more programs including instructions for:

while playing a third portion of the content item associated with third verbal content, wherein the third portion is different from the first portion and the second portion:

in accordance with a determination that the third verbal content is associated with a third performer, different from the first performer and the second performer and the third portion of the content item is after the second portion of the content item:

displaying, via the display generation component, one or more third lines of text representations of the third verbal content with one or more third colors and the first visual characteristic having the first value.

25. The electronic device of claim 24, the one or more programs including instructions for:

while playing a fourth portion of the content item associated with fourth verbal content, wherein the fourth portion is different from the first portion, second portion, and the third portion:

in accordance with a determination that the fourth verbal content is associated with the first performer and the fourth portion of the content item is after the third portion of the content item:

displaying, via the display generation component, one or more fourth lines of text representations of the fourth verbal content with one or more third colors and the first visual characteristic having the second value.

26. The electronic device of claim 22, wherein:

the first visual characteristic having the first value includes a first alignment of one or more lines of text representations of corresponding verbal content; and the first visual characteristic having the second value includes a second alignment of one or more lines of text representations of corresponding verbal content, different from the first alignment.

27. The electronic device of claim 22, the one or more programs including instructions for:
while playing a third portion of the content item associated with third verbal content, wherein the third portion is different from the first portion and the second portion:
in accordance with a determination that the third verbal content is associated with at least two performers:
displaying, via the display generation component, one or more third lines of text representations of the third verbal content with one or more third colors and the first visual characteristic having the first value or the second value.

28. The electronic device of claim 27, wherein a value of the first visual characteristic with which the one or more third lines of text representations of the third verbal content are displayed is based on a value of the first visual characteristic with which a respective line of text representations of verbal content associated with a respective portion of the content item prior to the third portion of the content item is displayed.

29. The electronic device of claim 27, wherein the one or more third lines of text representations of the third verbal content are displayed with the first visual characteristic having a respective value that is independent of a value of the first visual characteristic with which a respective line of text representations of verbal content associated with a respective portion of the content item prior to the third portion of the content item is displayed.

30. The electronic device of claim 22, the one or more programs including instructions for:
while playing a third portion of the content item associated with third verbal content and fourth verbal content, wherein the third portion is different from the first portion and the second portion:
in accordance with a determination that the third verbal content is of a first type:
displaying, via the display generation component, one or more third lines of text representations of the third verbal content with one or more third colors and a second visual characteristic different from the first visual characteristic and different from the one or more third colors having a first value; and
in accordance with a determination that the fourth verbal content is of a second type different from the first type:
displaying, via the display generation component, a fourth line of text representations of the fourth verbal content with one or more fourth colors and the second visual characteristic having a second value different from the first value.

31. The electronic device of claim 30, wherein:
the third verbal content having the first type has higher priority than the fourth verbal content having the second type;
in accordance with a determination that the one or more third lines of text representations of the third verbal content are displayed with the first visual characteristic having the first value, the fourth line of text representations of fourth verbal content is displayed with the first visual characteristic having the first value; and in accordance with a determination that the one or more third lines of text representations of the third verbal content are displayed with the first visual characteristic having the second value, the fourth line of text representations of fourth verbal content is displayed with the first visual characteristic having the second value.

32. The electronic device of claim 30, wherein the third lines of text representations of the third verbal content and the fourth line of text representations of fourth verbal content are displayed with the first visual characteristic having a respective value.

33. The electronic device of claim 30, wherein in accordance with a determination that the third verbal content having the first type has higher priority than the fourth verbal content having the second type, the one or more third lines of text representations of the third verbal content are visually emphasized relative to the fourth line of text representations of the fourth verbal content.

34. The electronic device of claim 30, the one or more programs including instructions for:
while playing the second portion of the content item associated with the second verbal content:
displaying the one or more second lines of text representations of the second verbal content; and
foregoing displaying the fourth line of text representations of the fourth verbal content; and
while playing the third portion of the content item associated with the third verbal content and the fourth verbal content:
displaying the one or more third lines of text representations of the third verbal content; and
displaying the fourth line of text representations of the fourth verbal content.

35. The electronic device of claim 34, wherein displaying the fourth line of text representations of the fourth verbal content while playing the third portion of the content item associated with the third verbal content and the fourth verbal content includes:
displaying an animation of the fourth line of text representations of the fourth verbal content emerge from a region of display of the one or more third lines of text representations of the third verbal content.

36. The electronic device of claim 30, the one or more programs including instructions for:
while playing the third portion of the content item associated with the third verbal content and the fourth verbal content and while displaying the one or more third lines of text representations of the third verbal content and the fourth line of text representations of the fourth verbal content:
detecting, via one or more input devices in communication with the electronic device, an input for scrolling through the text representations of verbal content associated with portions of the content item; and
in response to detecting the input for scrolling through the text representations of verbal content of associated with portions of the content item:
ceasing display of the fourth line of text representations of the fourth verbal content;
maintaining display of the one or more third lines of text representations of the third verbal content; and
scrolling through the text representations of verbal content associated with the portions of the content item in accordance with the input for scrolling through the text representations of verbal content of associated with portions of the content item.

37. The electronic device of claim 22, the one or more programs including instructions for:

while playing the first portion of the content item:

in accordance with a determination that the first portion of the content item is associated with a first part of the content item, displaying an indication of the first part of the content item concurrently with display of the one or more first lines of text representations of verbal content; and in accordance with a determination that the first portion of the content item is associated with a second part of the content item, displaying an indication of the second part of the content item concurrently with display of the one or more first lines of text representations of verbal content.

38. The electronic device of claim 22, the one or more programs including instructions for:

while playing a respective portion of the content item and while displaying one or more respective lines of text representations of respective verbal content associated with the respective portion of the content item:

displaying a color gradient at a first location between a first portion of a respective word and a second portion of the respective word in a respective line of the one or more respective lines of text representations of respective verbal content; and visually moving the color gradient from the first location between the first portion and the second portion of the respective word to a second location between a third portion of the respective word and a fourth portion of the respective word, wherein the second location is different from the first location.

39. The electronic device of claim 38, wherein:

visually moving the color gradient from the first location between the first portion of the respective word and the second portion of the respective word to the second location between the third portion of the respective word and the fourth portion of the respective word is performed in accordance with a time duration of playback of at least a part of the respective portion of the content item associated with a syllable of the respective word.

40. The electronic device of claim 39, wherein:

while the time duration of the playback of the respective portion of the content item associated with the syllable of the respective word is a first time duration:

a rate of movement of the color gradient is a first rate; and when the time duration of the playback of the respective portion of the content item associated with the syllable of the respective word is a second time duration, longer than the first time duration:

the rate of movement of the color gradient is a second rate, slower than the first rate.

41. The electronic device of claim 39, the one or more programs including instructions for in accordance with a determination that the playback of the respective portion of the content item is associated with at least two syllables of the respective word, wherein playback of a portion of the content item associated with a first syllable of the respective word has a first time duration and playback of the portion of the content item associated with a second syllable of the respective word has a second respective time duration, different from the first respective time duration:

during playback of the portion of the content item associated with the first syllable of the respective word:

visually moving the color gradient from the first location between the first portion of the respective word and the second portion of the respective word to the second location between the third portion of the respective word and the fourth portion of the respective word at a first rate that is in accordance with the first time duration; and during playback of the portion of the content item associated with the second syllable of the respective word:

visually moving the color gradient from the second location between the third portion of the respective word and the fourth portion of the respective word to a third location between a fifth portion of the respective word and a sixth portion of the respective word at a second respective rate that is in accordance with the second respective time duration.

42. The electronic device of claim 38, the one or more programs including instructions for:

during playback of the respective portion of the content item associated with the respective word:

displaying a text representation of the respective word with a first position; and displaying a text representation of a second word in the respective line of text representations with a second position different from the first position.

43. A non-transitory computer readable storage medium storing one or more programs, the one or more programs comprising instructions, which when executed by one or more processors of an electronic device, cause the electronic device to perform a method comprising:

while playing a first portion of a content item:

in accordance with a determination that the first portion of the content item is associated with first verbal content associated with a first performer:

displaying, via a display generation component, one or more first lines of text representations of verbal content associated with the first portion of the content item with one or more first colors and a first visual characteristic having a first value, wherein the first visual characteristic is different from the one or more first colors;

while playing a second portion of the content item, different from the first portion of the content item, wherein the second portion of the content item is associated with second verbal content:

in accordance with a determination that the second verbal content is associated with the first performer:

displaying, via the display generation component, one or more second lines of text representations of the second verbal content with the one or more first colors and the first visual characteristic having the first value; and in accordance with a determination that the second verbal content is associated with a second performer, different from the first performer:

displaying, via the display generation component, the one or more second lines of text representations of the second verbal content with one or more second colors and the first visual characteristic having a second value that is different from the first value; and during playback of the first portion of content item, wherein the first portion of the content item is associated with a first word of the one or more first lines of text representations of verbal content, in response to playback of the first portion of the content item associated with the first word:

in accordance with a determination that the playback of the first portion of the content item associated with the first word is above a threshold time duration, displaying the first word with a second visual characteristic, different from the first visual characteristic, having a first value; and in accordance with a determination that the playback of the first portion of the content item associated with the first word is below the threshold time duration, displaying the first word with the second visual characteristic having a second value different from the first value.

44. The non-transitory computer readable storage medium of claim 43, the method further comprising:

while playing a third portion of the content item associated with third verbal content, wherein the third portion is different from the first portion and the second portion:

in accordance with a determination that the third verbal content is associated with a third performer, different from the first performer and the second performer:

displaying, via the display generation component, one or more third lines of text representations of the third verbal content with one or more third colors and the first visual characteristic having a third value, different from the first value and the second value.

45. The non-transitory computer readable storage medium of claim 43, the method further comprising:

while playing a third portion of the content item associated with third verbal content, wherein the third portion is different from the first portion and the second portion:

in accordance with a determination that the third verbal content is associated with a third performer, different from the first performer and the second performer and the third portion of the content item is after the second portion of the content item:

displaying, via the display generation component, one or more third lines of text representations of the third verbal content with one or more third colors and the first visual characteristic having the first value.

46. The non-transitory computer readable storage medium of claim 45, the method further comprising:

while playing a fourth portion of the content item associated with fourth verbal content, wherein the fourth portion is different from the first portion, second portion, and the third portion:

in accordance with a determination that the fourth verbal content is associated with the first performer and the fourth portion of the content item is after the third portion of the content item:

displaying, via the display generation component, one or more fourth lines of text representations of the fourth verbal content with one or more third colors and the first visual characteristic having the second value.

47. The non-transitory computer readable storage medium of claim 43, wherein:

the first visual characteristic having the first value includes a first alignment of one or more lines of text representations of corresponding verbal content; and the first visual characteristic having the second value includes a second alignment of one or more lines of text representations of corresponding verbal content, different from the first alignment.

48. The non-transitory computer readable storage medium of claim 43, the method further comprising:

while playing a third portion of the content item associated with third verbal content, wherein the third portion is different from the first portion and the second portion:

in accordance with a determination that the third verbal content is associated with at least two performers:

displaying, via the display generation component, one or more third lines of text representations of the third verbal content with one or more third colors and the first visual characteristic having the first value or the second value.

49. The non-transitory computer readable storage medium of claim 48, wherein a value of the first visual characteristic with which the one or more third lines of text representations of the third verbal content are displayed is based on a value of the first visual characteristic with which a respective line of text representations of verbal content associated with a respective portion of the content item prior to the third portion of the content item is displayed.

50. The non-transitory computer readable storage medium of claim 48, wherein the one or more third lines of text representations of the third verbal content are displayed with the first visual characteristic having a respective value that is independent of a value of the first visual characteristic with which a respective line of text representations of verbal content associated with a respective portion of the content item prior to the third portion of the content item is displayed.

51. The non-transitory computer readable storage medium of claim 43, the method further comprising:

while playing a third portion of the content item associated with third verbal content and fourth verbal content, wherein the third portion is different from the first portion and the second portion:

in accordance with a determination that the third verbal content is of a first type:

displaying, via the display generation component, one or more third lines of text representations of the third verbal content with one or more third colors and a second visual characteristic different from the first visual characteristic and different from the one or more third colors having a first value; and in accordance with a determination that the fourth verbal content is of a second type different from the first type:

displaying, via the display generation component, a fourth line of text representations of the fourth verbal content with one or more fourth colors and the second visual characteristic having a second value different from the first value.

52. The non-transitory computer readable storage medium of claim 51, wherein:

the third verbal content having the first type has higher priority than the fourth verbal content having the second type;

in accordance with a determination that the one or more third lines of text representations of the third verbal content are displayed with the first visual characteristic having the first value, the fourth line of text representations of fourth verbal content is displayed with the first visual characteristic having the first value; and in accordance with a determination that the one or more third lines of text representations of the third verbal content are displayed with the first visual characteristic having the second value, the fourth line of text representations of fourth verbal content is displayed with the first visual characteristic having the second value.

53. The non-transitory computer readable storage medium of claim 51, wherein the third lines of text representations of the third verbal content and the fourth line of text representations of fourth verbal content are displayed with the first visual characteristic having a respective value.

54. The non-transitory computer readable storage medium of claim 51, wherein in accordance with a determination that the third verbal content having the first type has higher priority than the fourth verbal content having the second type, the one or more third lines of text representations of the third verbal content are visually emphasized relative to the fourth line of text representations of the fourth verbal content.

55. The non-transitory computer readable storage medium of claim 51, the method further comprising:

while playing the second portion of the content item associated with the second verbal content:

displaying the one or more second lines of text representations of the second verbal content; and foregoing displaying the fourth line of text representations of the fourth verbal content; and while playing the third portion of the content item associated with the third verbal content and the fourth verbal content:

displaying the one or more third lines of text representations of the third verbal content; and displaying the fourth line of text representations of the fourth verbal content.

56. The non-transitory computer readable storage medium of claim 55, wherein displaying the fourth line of text representations of the fourth verbal content while playing the third portion of the content item associated with the third verbal content and the fourth verbal content includes:

displaying an animation of the fourth line of text representations of the fourth verbal content emerge from a region of display of the one or more third lines of text representations of the third verbal content.

57. The non-transitory computer readable storage medium of claim 51, the method further comprising:

while playing the third portion of the content item associated with the third verbal content and the fourth verbal content and while displaying the one or more third lines of text representations of the third verbal content and the fourth line of text representations of the fourth verbal content:

detecting, via one or more input devices in communication with the electronic device, an input for scrolling through the text representations of verbal content associated with portions of the content item; and in response to detecting the input for scrolling through the text representations of verbal content of associated with portions of the content item:

ceasing display of the fourth line of text representations of the fourth verbal content;

maintaining display of the one or more third lines of text representations of the third verbal content; and scrolling through the text representations of verbal content associated with the portions of the content item in accordance with the input for scrolling through the text representations of verbal content of associated with portions of the content item.

58. The non-transitory computer readable storage medium of claim 43, the method further comprising:

while playing the first portion of the content item:

in accordance with a determination that the first portion of the content item is associated with a first part of the content item, displaying an indication of the first part of the content item concurrently with display of the one or more first lines of text representations of verbal content; and in accordance with a determination that the first portion of the content item is associated with a second part of the content item, displaying an indication of the second part of the content item concurrently with display of the one or more first lines of text representations of verbal content.

59. The non-transitory computer readable storage medium of claim 43, the method further comprising:

while playing a respective portion of the content item and while displaying one or more respective lines of text representations of respective verbal content associated with the respective portion of the content item:

displaying a color gradient at a first location between a first portion of a respective word and a second portion of the respective word in a respective line of the one or more respective lines of text representations of respective verbal content; and visually moving the color gradient from the first location between the first portion and the second portion of the respective word to a second location between a third portion of the respective word and a fourth portion of the respective word, wherein the second location is different from the first location.

60. The non-transitory computer readable storage medium of claim 59, wherein:

visually moving the color gradient from the first location between the first portion of the respective word and the second portion of the respective word to the second location between the third portion of the respective word and the fourth portion of the respective word is performed in accordance with a time duration of playback of at least a part of the respective portion of the content item associated with a syllable of the respective word.

61. The non-transitory computer readable storage medium of claim 60, wherein:

while the time duration of the playback of the respective portion of the content item associated with the syllable of the respective word is a first time duration:

a rate of movement of the color gradient is a first rate; and when the time duration of the playback of the respective portion of the content item associated with the syllable of the respective word is a second time duration, longer than the first time duration:

the rate of movement of the color gradient is a second rate, slower than the first rate.

62. The non-transitory computer readable storage medium of claim 60, the method further comprising:

in accordance with a determination that the playback of the respective portion of the content item is associated with at least two syllables of the respective word, wherein playback of a portion of the content item associated with a first syllable of the respective word has a first time duration and playback of the portion of the content item associated with a second syllable of the respective word has a second respective time duration, different from the first respective time duration:

during playback of the portion of the content item associated with the first syllable of the respective word:

visually moving the color gradient from the first location between the first portion of the respective word and the second portion of the respective word to the second location between the third portion of the respective word and the fourth portion of the respective word at a first rate that is in accordance with the first time duration; and during playback of the portion of the content item associated with the second syllable of the respective word:

visually moving the color gradient from the second location between the third portion of the respective word and the fourth portion of the respective word to a third location between a fifth portion of the respective word and a sixth portion of the respective word at a second respective rate that is in accordance with the second respective time duration.

63. The non-transitory computer readable storage medium of claim 59, the method further comprising:

during playback of the respective portion of the content item associated with the respective word:

displaying a text representation of the respective word with a first position; and displaying a text representation of a second word in the respective line of text representations with a second position different from the first position.

* * * * *